United States Patent [19]

Oikawa et al.

[11] Patent Number: 5,666,578

[45] Date of Patent: Sep. 9, 1997

[54] CAMERA AND PRINT INFORMATION CONTROL APPARATUS

[75] Inventors: Yoshiro Oikawa, Tokyo; Masaaki Kusano, Kawasaki; Hideaki Shimomura; Naotaka Shimamura, both of Yokohama; Kiyoshi Numazaki, Kawasaki, all of Japan

[73] Assignee: Nikon Corporation, Japan

[21] Appl. No.: 691,697

[22] Filed: Aug. 2, 1996

Related U.S. Application Data

[60] Continuation of Ser. No. 504,720, Jul. 20, 1995, abandoned, which is a division of Ser. No. 234,524, Apr. 28, 1994, abandoned.

[30] Foreign Application Priority Data

| Apr. 28, 1993 | [JP] | Japan | 5-102126 |
| Oct. 1, 1993 | [JP] | Japan | 5-247166 |
| Oct. 12, 1993 | [JP] | Japan | 5-254556 |
| Nov. 8, 1993 | [JP] | Japan | 5-278348 |

[51] Int. Cl.⁶ ............................. G03B 17/24; G03B 29/00
[52] U.S. Cl. ........................... 396/319; 396/429; 396/488
[58] Field of Search ...................... 354/75, 76, 105, 354/106, 219, 471, 474, 475; 348/333, 334, 64

[56] References Cited

U.S. PATENT DOCUMENTS

| 4,303,322 | 12/1981 | Someya | 354/31 |
| 4,742,369 | 5/1988 | Ishii et al. | 354/441 |
| 4,949,117 | 8/1990 | Van Hegningen et al. | 354/412 |
| 5,023,635 | 6/1991 | Nealon | 354/76 |
| 5,150,215 | 9/1992 | Shi | 358/209 |
| 5,164,751 | 11/1992 | Weger | 354/76 |

*Primary Examiner*—Safet Metjahic
*Assistant Examiner*—Daniel Chapik
*Attorney, Agent, or Firm*—Pennie & Edmonds

[57] ABSTRACT

A camera according to the present invention is so arranged that a half mirror is disposed in an optical path between a taking lens and a photographic film strip to be exposed so as to reflect a part of subject image incident thereinto. The thus reflected subject image is received by CCD, which converts it into electric image data. The image data is converted into binary codes, and the codes are written by a magnetic head in a magnetic layer provided on the back face of the photographic film strip. On the other hand, the image data received by the CCD is displayed for a photographer in a finder through a liquid crystal display at all times.

5 Claims, 55 Drawing Sheets

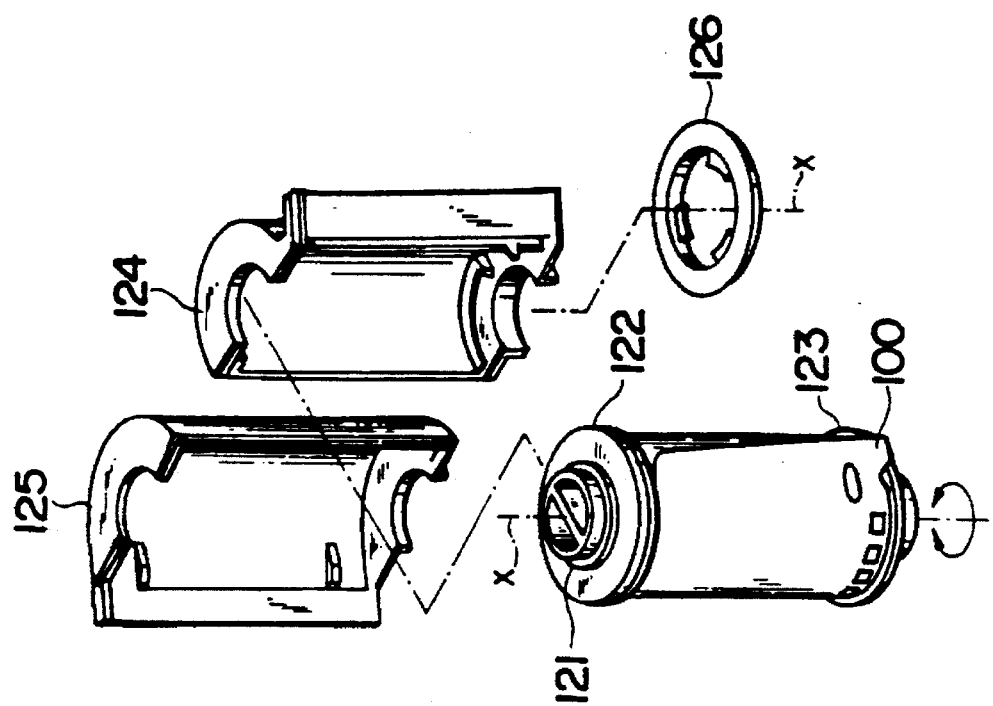
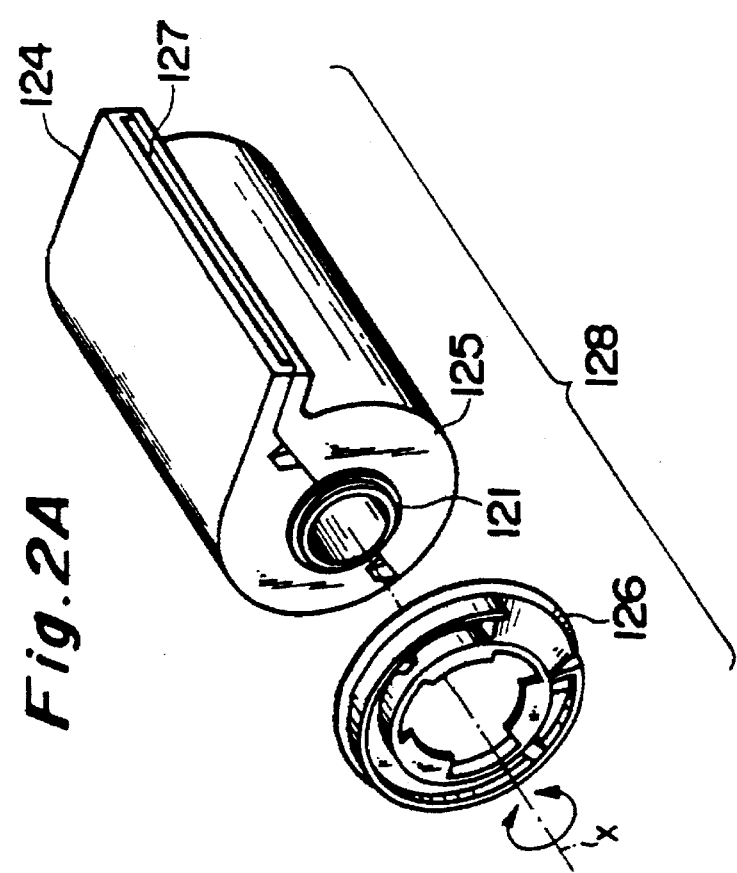

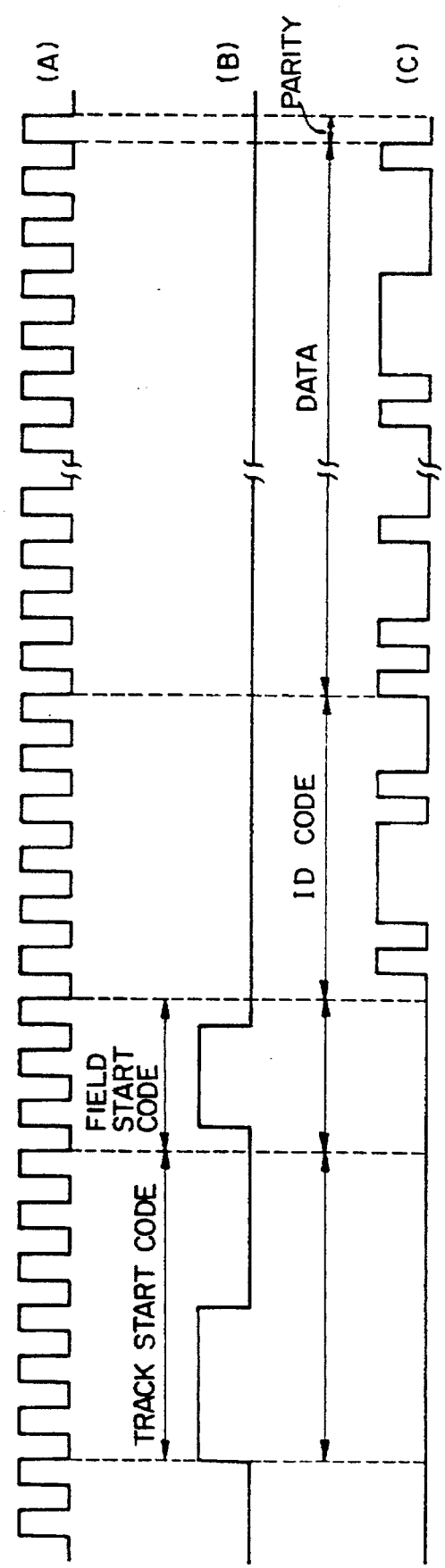

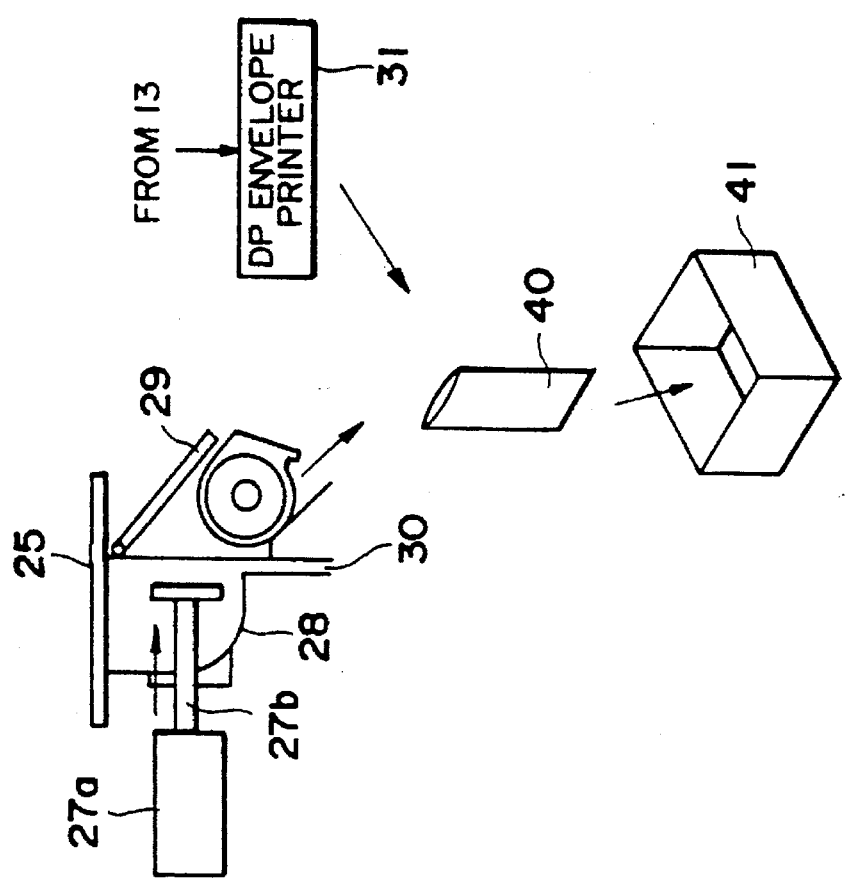
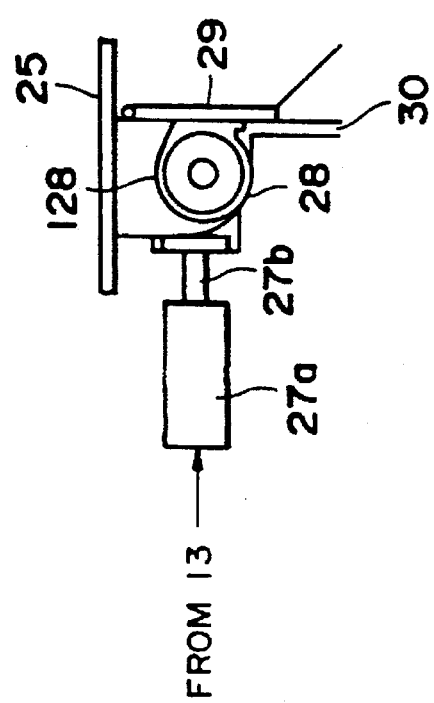

Fig. 33

DO YOU WANT TO RECORD SHOOTING INFORMATION ON PRINT?

YES

NO

CANCEL

RETURN

CANCEL

RETURN

OK

END

PLEASE SELECT A FRAME TO BE PROCESSED
(TOUCH SCREEN)

Fig. 35

| 1. YEAR/MONTH/DAY/TIME |
| 2. APERTURE/SHUTTER SPEED/FILM OTHER SHOOTING OR ENVIRONMENT DATA |
| 3. POSITIONAL INFORMATION OF GPS OR ELECTRONIC COMPASS |
| 4. CHARACTER INFORMATION (COMMENTS) |
| 5. VOICE INFORMATION |

CANCEL
RETURN
OK
END

Fig. 36

PLEASE SELECT STYLE OF INDICATION

| (1) | (2) | (3) |
|---|---|---|
| 1993 | 06 20 | pm 2:40 |
| '93 | 20 JUN | 14:40 |
| H05 | OMIT | OMIT |
| OMIT | | |

INDICATION MONITOR
'93 20 JUN

CANCEL
RETURN
OK

Fig.39

PLEASE SELECT ONE

APERTURE/SHUTTER/TYPE OF FILM

ALL      ■■■DATA WILL BE RECORDED
         ON BACK FACE OF PRINT
         BECAUSE OF TOO MUCH
         DATA

CANCEL

RETURN

O K

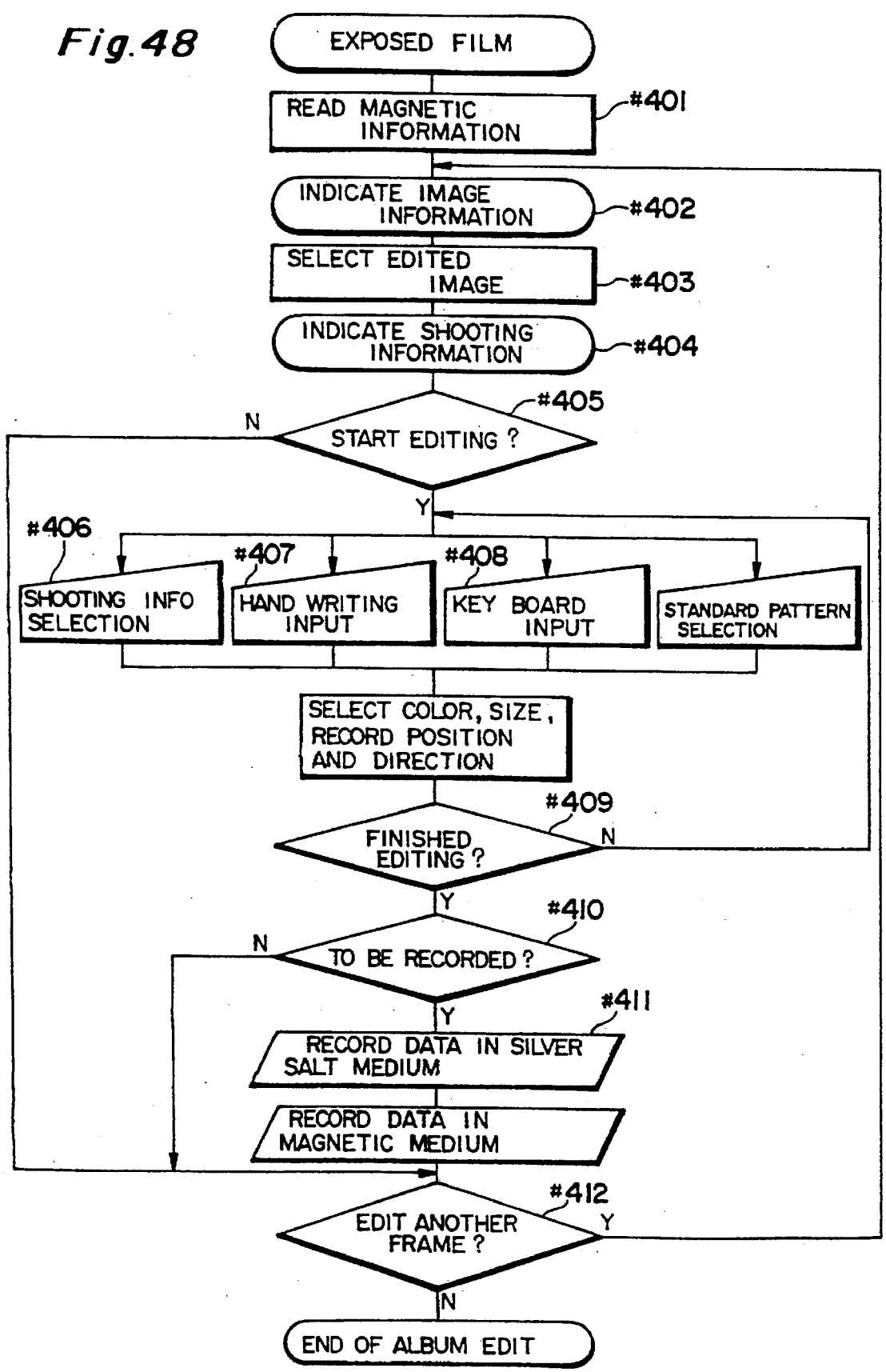

PLEASE SELECT A PHOTOGRAPH TO BE EDITED

Fig. 68
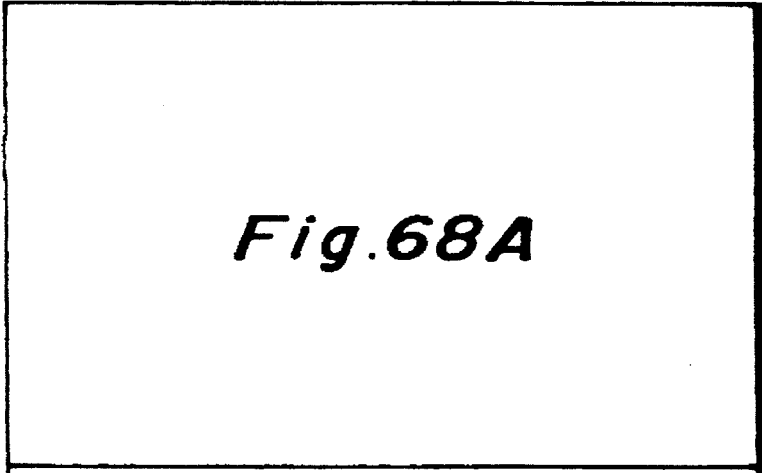
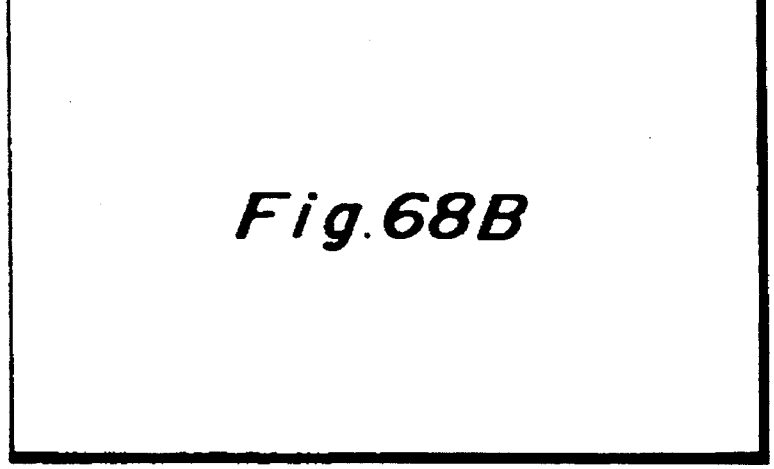

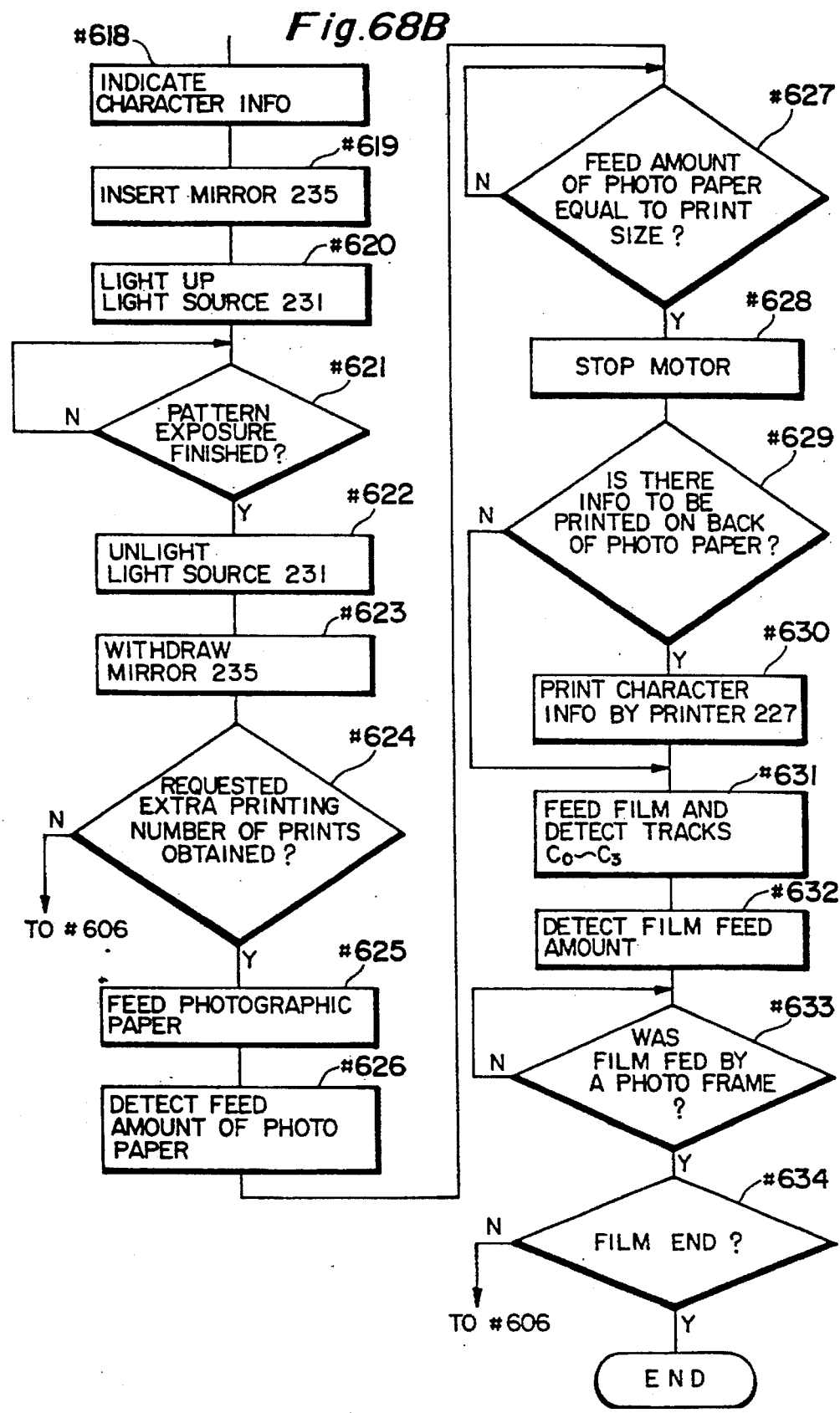

CAMERA AND PRINT INFORMATION CONTROL APPARATUS

This is a continuation of application Ser. No. 08/504,720, filed Jul. 20, 1995, now abandoned, which is a division of application Ser. No. 08/234,524 filed Apr. 28, 1994 abd.

BACKGROUND OF THE INVENTION

1. Field of the Invention

The present invention relates to a camera for recording selected information in a photographic film provided with a magnetic layer, and to a print information control apparatus for controlling print information of a photographic film with pictures taken by the camera.

2. Related Background Art

Usual reception of photograph printing is as follows. A customer fills in a slip attached to a DP envelope with order contents, customer's name, etc. at a DP agency and a film after exposure is enclosed in the DP envelope to be sent to a photo laboratory. Shooting information such as dates is recorded on the film.

U.S. Pat. No. 5,130,745 discloses a camera using a photographic film with a magnetic layer provided on the back face of silver salt film. With this camera, a subject image is recorded as an optical image in the silver salt film and shooting information such as various parameters in shooting, or customer information is recorded in the magnetic layer. Also, U.S. Pat. No. 4,607,949 discloses a so-called mini lab which performs printing of developed film and development of printed photographic paper.

Usual order of photographic printing is so-called simultaneous printing to make prints of all frames at a time. In this case, photographed contents in an exposed film cannot be checked before it is developed. Therefore, the conventional way has such a problem that unnecessary frames, for example misshot frames, are inevitably printed. Also, since photographed contents cannot be checked with a film before development, a customer must go to the DP agency again to order extra printing or enlarging.

SUMMARY OF THE INVENTION

It is an object of the present invention to provide a camera suitable for discrimination of an optical image of subject recorded in a photographic film strip before development.

It is another object of the present invention to provide a print information control apparatus which permits an optical image of subject recorded in a photographic film strip to be discriminated before development and which permits various print information to be specified.

The above and other objects will be more apparent from the following description.

The present invention provides a camera which records a subject image as an optical image in a silver salt medium layer provided on one surface of a photographic film strip and which also records the subject image as magnetic information in a magnetic layer provided on the other surface of the photographic film strip. This camera comprises:

a half mirror set in an optical path between a taking lens and said photographic film strip to be exposed, for transmitting part of light incident thereinto through said taking lens and reflecting part of the light;

an image pickup element having an image pickup surface for receiving the light reflected by said half mirror, for converting said subject image focused on the image pickup surface into electric image data;

feed means for feeding said photographic film strip;

a magnetic head set to face a feed path of said photographic film strip, for writing said image data converted by said image pickup element as the magnetic information in said magnetic layer on said photographic film strip; and a display device for displaying said subject image to be photographed, based on the image data converted by said image pickup element, thereby permitting said subject image incident through said taking lens to be observed from the outside of a camera body;

wherein said magnetic head writes said image data in said magnetic layer on the photographic film strip while said feed means is feeding said photographic film strip.

Also, the present invention provides a camera which records a subject image as an optical image in a silver salt medium layer provided on one surface of a photographic film strip and which also records the subject image as magnetic information in a magnetic layer provided on the other surface of the photographic film strip. This camera comprises:

a first reflector set in an optical path between a taking lens and said photographic film strip to be exposed, for reflecting said subject image incident thereinto through said taking lens out of the optical path, said first reflector being displaced to move out of the optical path upon exposure;

an optical system for guiding said subject image reflected by said first reflector to a finder;

a shutter curtain set in the optical path between said taking lens and said photographic film strip to be exposed, having a slit for letting part of said subject image incident through said taking lens pass, and being displaced across said optical path;

a second reflector fixed on a side of an incident plane of said subject image in said shutter curtain, for reflecting said subject image out of the optical path;

an image pickup element having an image pickup surface for receiving said subject image reflected by said second reflector, for converting said subject image focused on the image pickup surface into electric image data;

feed means for feeding said photographic film strip; and a magnetic head set to face a feed path of said photographic film strip, for Writing said image data converted by said image pickup element as the magnetic information in said magnetic layer on said photographic film strip;

wherein said first reflector is located in said optical path until immediately before exposure, while reflecting said subject image toward said optical system;

wherein said first reflector is displaced out of said optical path upon exposure to let said subject image pass, and said second reflector being displaced together with said shutter curtain reflects said subject image toward the image pickup surface of said image pickup element; and wherein said magnetic head writes said image data obtained by said image pickup element in said magnetic layer on the photographic film strip while said feed means is feeding said photographic film strip.

Here, it is preferred that while the shutter curtain is displaced across said optical path, said second reflector successively reflects parts of said subject image out of the optical path, whereby the subject image is scanned on the image pickup surface of said image pickup element.

Also, the present invention provides a print information control apparatus used for a photographic film strip having a silver salt medium layer in which an optical image of a subject is recorded and a magnetic layer in which first magnetic information corresponding to the optical image is recorded. This print information control apparatus comprises:

feed means for feeding said photographic film strip;

a first magnetic head set to face the magnetic layer of said photographic film strip fed thereto, for reading said first magnetic information recorded in the magnetic layer; and display means for reproducing said optical image of the subject as an image pattern, based on the magnetic information of said optical image read by said first magnetic head and displaying said optical image;

wherein said optical image of the subject recorded in said silver salt medium layer is displayed as an image pattern before said photographic film strip is subjected to a development process.

Also, it is preferred that the print information control apparatus comprises a second magnetic head for writing second magnetic information in the magnetic layer of said photographic film strip and that said second magnetic information is print information as determined based on said image pattern displayed by said display means.

Also, it is preferred that the print information control apparatus comprises Writing means for recording a predetermined optical image in the silver salt medium layer of said photographic film strip and that said writing means comprises:

a liquid crystal display set to face said silver salt medium layer, for forming an arbitrary light-transmitting pattern; and a light source for emitting exposure light passing through said liquid crystal display to illuminate said silver salt medium layer.

BRIEF DESCRIPTION OF THE DRAWINGS

FIG. 2A is a perspective view to show a cartridge;

FIG. 2B is an exploded view of the cartridge;

FIG. 11 is a drawing to show an example of recording method by the camera in FIG. 3;

FIGS. 31A and 31B are respectively drawings to show a portion of an embodiment according to the present invention;

FIG. 33 is a drawing to show an example of indication in the embodiment;

FIG. 34 is a drawing to show an example of indication in the embodiment;

FIG. 35 is a drawing to show an example of indication in the embodiment;

FIG. 36 is a drawing to show an example of indication in the embodiment;

FIG. 39 is a drawing to show an example of indication in the embodiment;

FIG. 48 is a flowchart to show the operation of the apparatus of the present embodiment;

FIG. 68 shows a relationship between FIG. 68A and FIG. 68B: and

FIGS. 68A and 68B are respectively flowcharts to illustrate the operation of the printer.

DESCRIPTION OF THE PREFERRED EMBODIMENTS

Preferred embodiments of the present invention will be described with reference to the accompanying drawings.

A user normally goes to a DP agency to obtain prints from a photographic film with frames all exposed and fills in necessary order items in a slip, such as a number of prints. Then a photo laboratory develops the film in accordance with the order contents described in the slip.

The following embodiments illustrate a camera, a print information input apparatus and a photographic printing apparatus used in the above steps, in order.

Embodiment 1

Figure 1B:
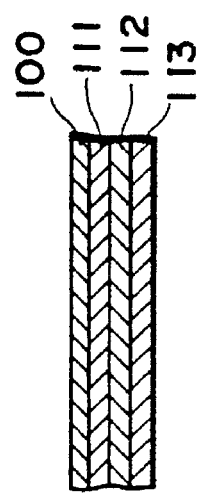
FIG. 1B is a cross sectional view of the film strip.
Figure 1A:
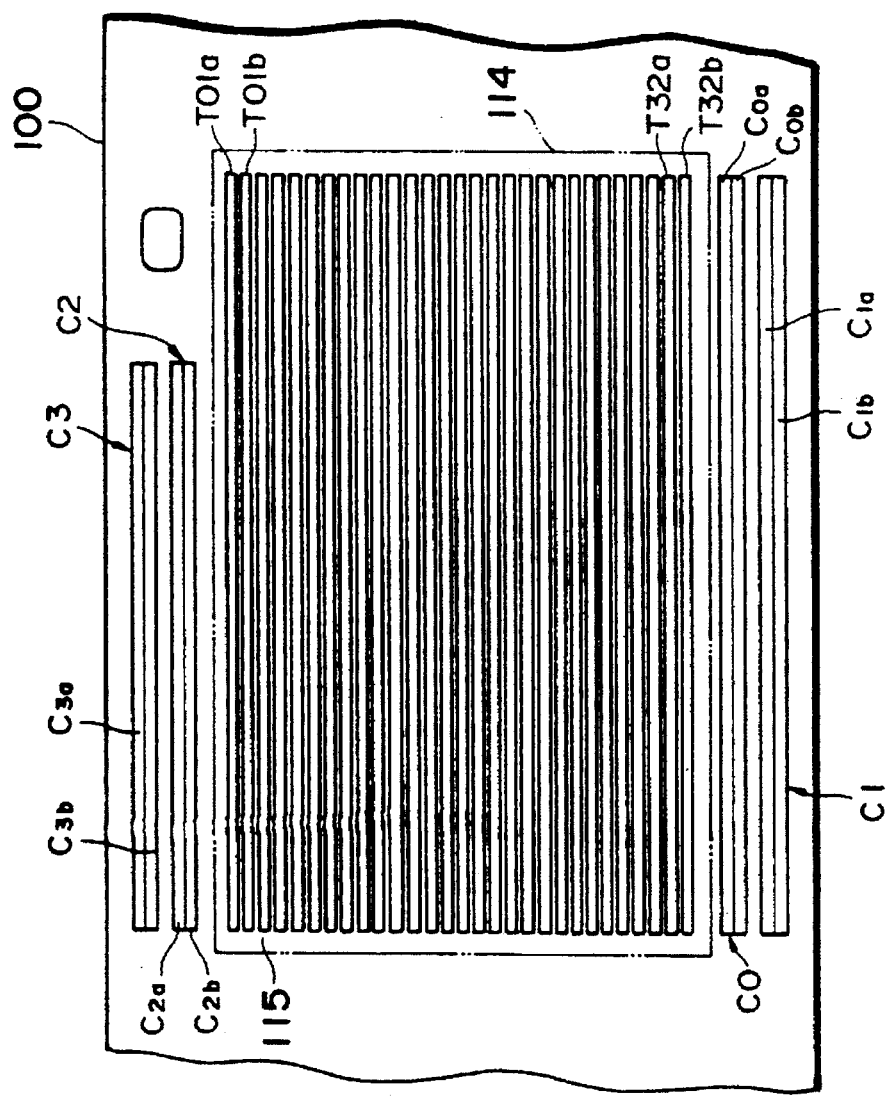
FIG. 1A is a plan view to show a part of photographic film strip.

A camera described in the present embodiment preferably uses a photographic film strip of the following type as disclosed in U.S. Pat. No. 5,130,745. FIGS. 1A and 1B diagrammatically show the film strip. The film strip has a transparent magnetic layer 112 and an emulsion layer 111 containing a silver salt such as a silver halide.

As shown in FIG. 1B, the coating of emulsion layer 111 containing the silver halide is deposited on a surface of a film base 110. The magnetic layer 112 containing a transparent magnetic medium is formed on the other side of the film base 110. A protection layer 113 covers the magnetic layer 112. The protection layer 113 prevents the magnetic layer 112 from being scratched and from being charged. In FIG. 1A, a region 114 surrounded by a chain double-dashed line is a photographic region on a film strip 100 and the magnetic layer 112 has a plurality of tracks 115 overlapping with the photographic region 114 on the film strip 100.

It is to be desired that the film strip 100 is mounted in a cartridge 128 as shown in FIGS. 2A and 2B. The cartridge 128 is disclosed for example in Japanese Laid-open Patent Application No. 3-75741. In FIG. 2A, the film is wound around a spool core 121 and collar shielding members 122, 123 are provided at the upper and lower ends of the spool core 121. The spool core 121 is pinched by a pair of shell halves 124, 125 therebetween. Further, an indicator 126 is set at one end of the paired shell halves 124, 125 holding the spool core 121, as shown in FIG. 2B. The film strip 100 set in the cartridge 128 can be rotated by rotating the spool core 121, so that the leading end of the film strip 100 can be fed and rewound through an opening portion 127 formed by the pair of shell halves 124, 125.

Now described is a camera for taking pictures utilizing the film strip 100 of such a type.

Figure 3:
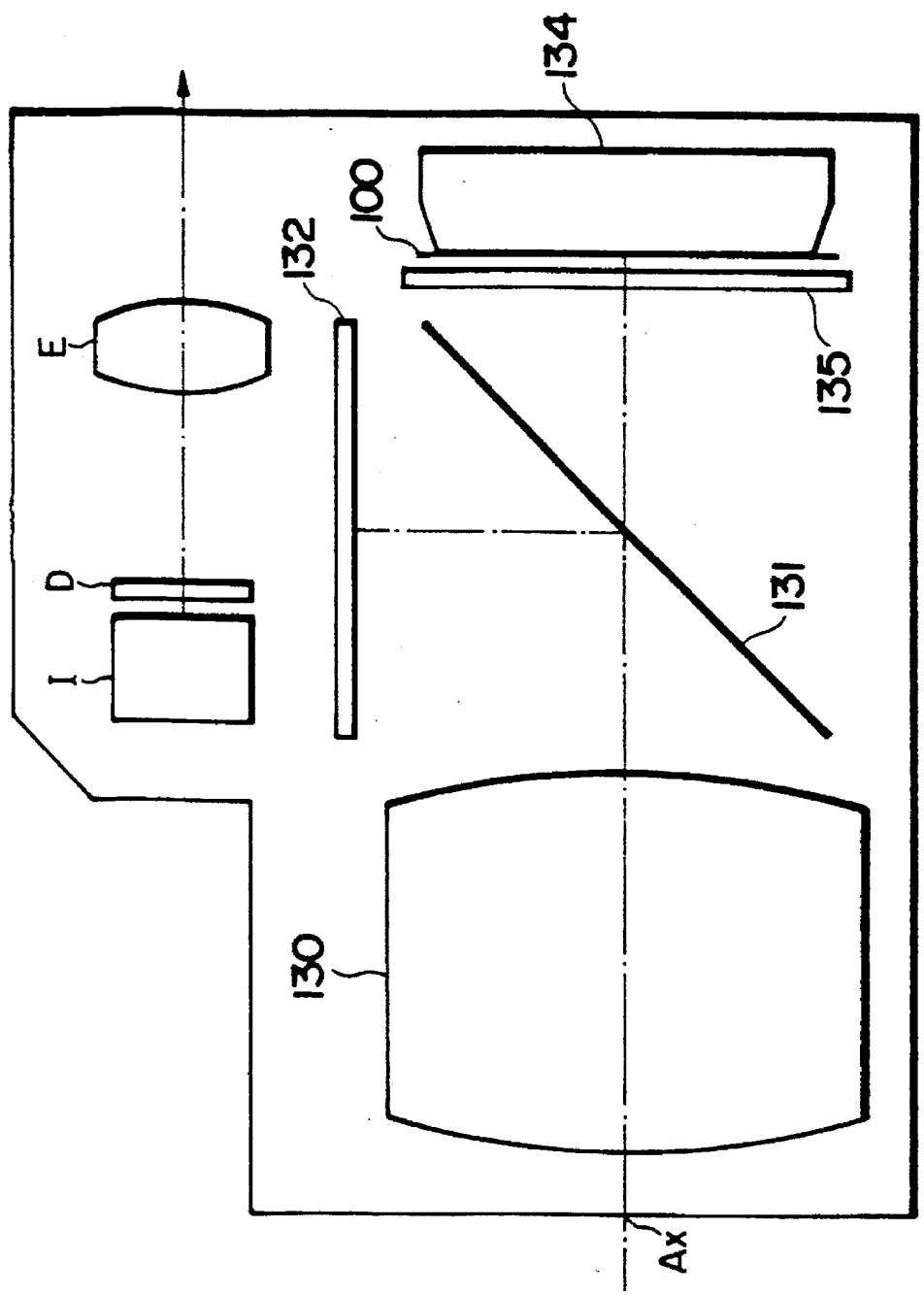
FIG. 3 is a structural drawing to schematically show the structure of a camera.
Figure 4:
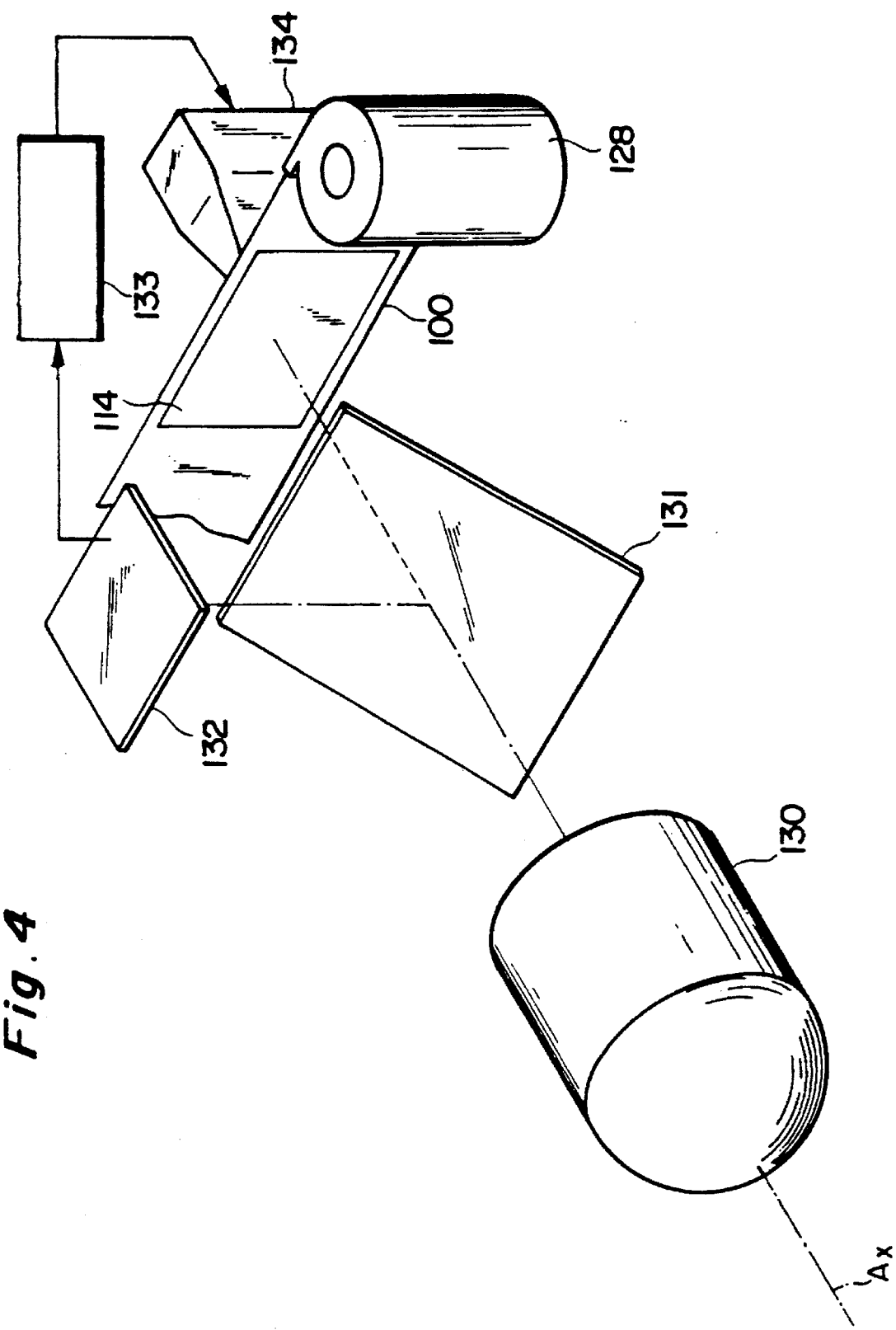
FIG. 4 is a perspective view to show only a main part of the camera as extracted.

FIGS. 3 and 4 schematically show the structure of a camera according to the present embodiment. In the drawings, light from an unrepresented object passes through a taking lens 130 and thereafter is split by a half mirror 131. Light reflected by the half mirror 131 forms an image of the object on CCD 132 as an image pickup element located in a reflection path of the half mirror 131. On the other hand, light passing through the half mirror 131 reaches a shutter 135. On this occasion, if the shutter 135 is opened, the light passing through the taking lens 130 and the half mirror 131 reaches the film strip 100. Then the light forms an object image on the film strip 100.

In the present embodiment CCD 132 is one with a 256×256 matrix of pixels. It is preferable that a length-to-width ratio of CCD 132 is approximately equal to that of the photographic region 114 in the film strip 100. In case a high resolution is unnecessary, CCD with less pixels can be employed.

Upon shooting, an object image is formed in the emulsion layer 111 on the film strip 100, and the emulsion layer 111 records the object image as a latent image. Also, an object image is formed on the CCD 132, which photoelectrically converts the object image into electric data and outputs it to a control unit 133 as described below. The control unit 133 actuates a writing magnetic head 134 provided on the magnetic layer side of film strip 100 to record the photoelectrically converted information of object image as second image information in the magnetic layer 112. The information of object image recorded as a latent image in the emulsion layer 111 on the film strip 100 will be referred to as first image information. In the camera as shown in the drawings, a total reflection mirror may replace the half mirror 131 and it is necessary that a drive unit for moving the total reflection mirror upon shooting is provided in that case.

Figure 5:
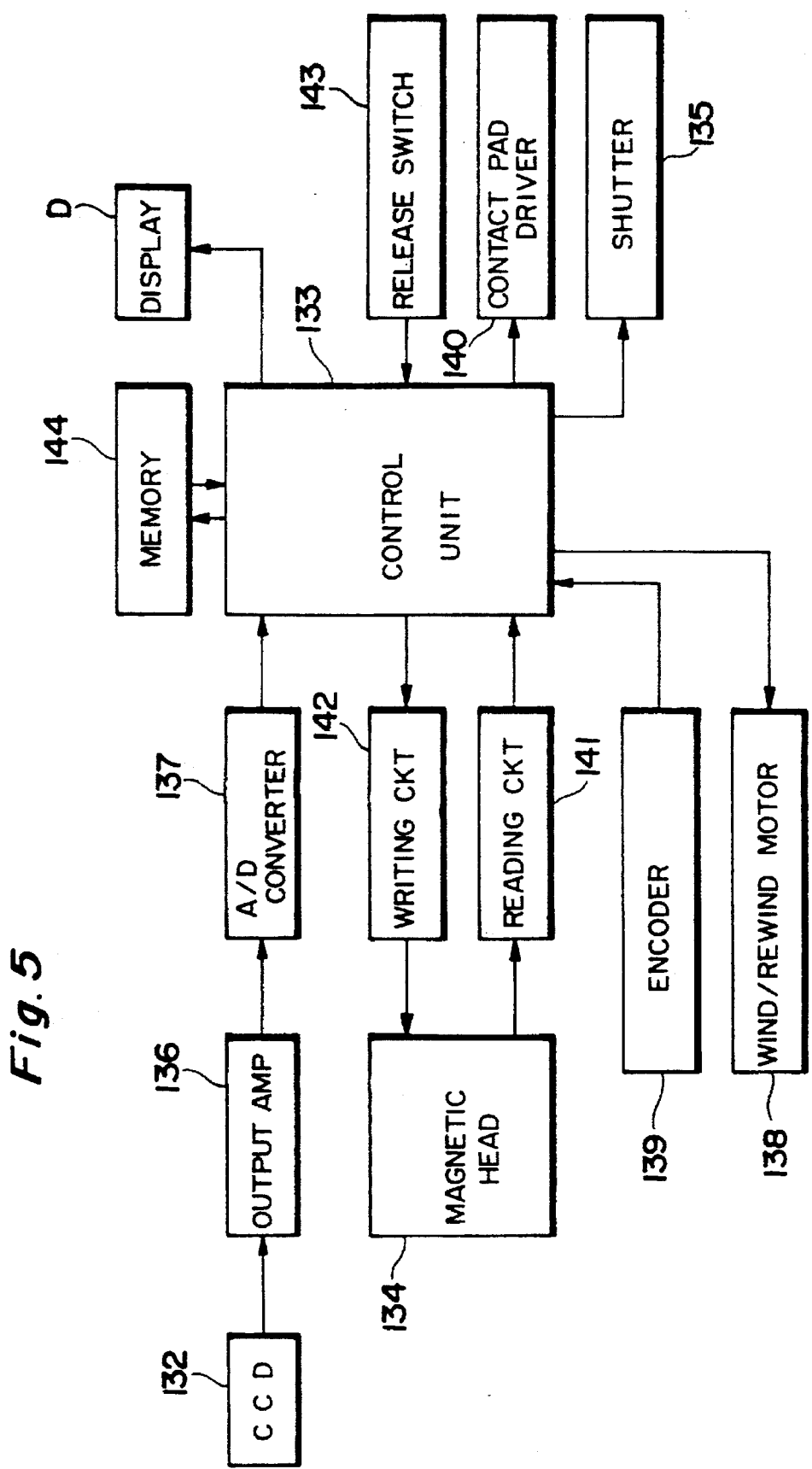
FIG. 5 is a block diagram to show a control system for the camera in FIG. 3.

FIG. 5 is a block diagram of a control system for the above camera. The object image formed on CCD 132 is photoelectrically converted by the CCD 132. A charge according to a light intensity of the object image is stored in each pixel in CCD 132. The charges are successively output to an output amplifier 136 to become a photoelectric conversion signal. The photoelectric conversion signal is amplified by the output amplifier 136 and thereafter the amplified signal is transmitted to an A/D converter 137. The A/D converter 137 converts the thus amplified photoelectric conversion signal into a digital signal for example of 6 bits (64 gradations).

The control unit 133 reads the digital signal from the A/D converter 137 and indicates an image on a display D, based on the signal.

Returning to FIG. 3, the display D is a liquid crystal display. The display D is illuminated from the back by an illumination unit I. A photographer can view through an eyepiece E to observe an enlarged image of the illuminated display D. The illumination unit I may be one composed of light emitting elements or one employing external light. The display D is the liquid crystal display in the present embodiment, but instead it may be a small CRT. The illumination unit I may be obviated in that case.

Figure 6:
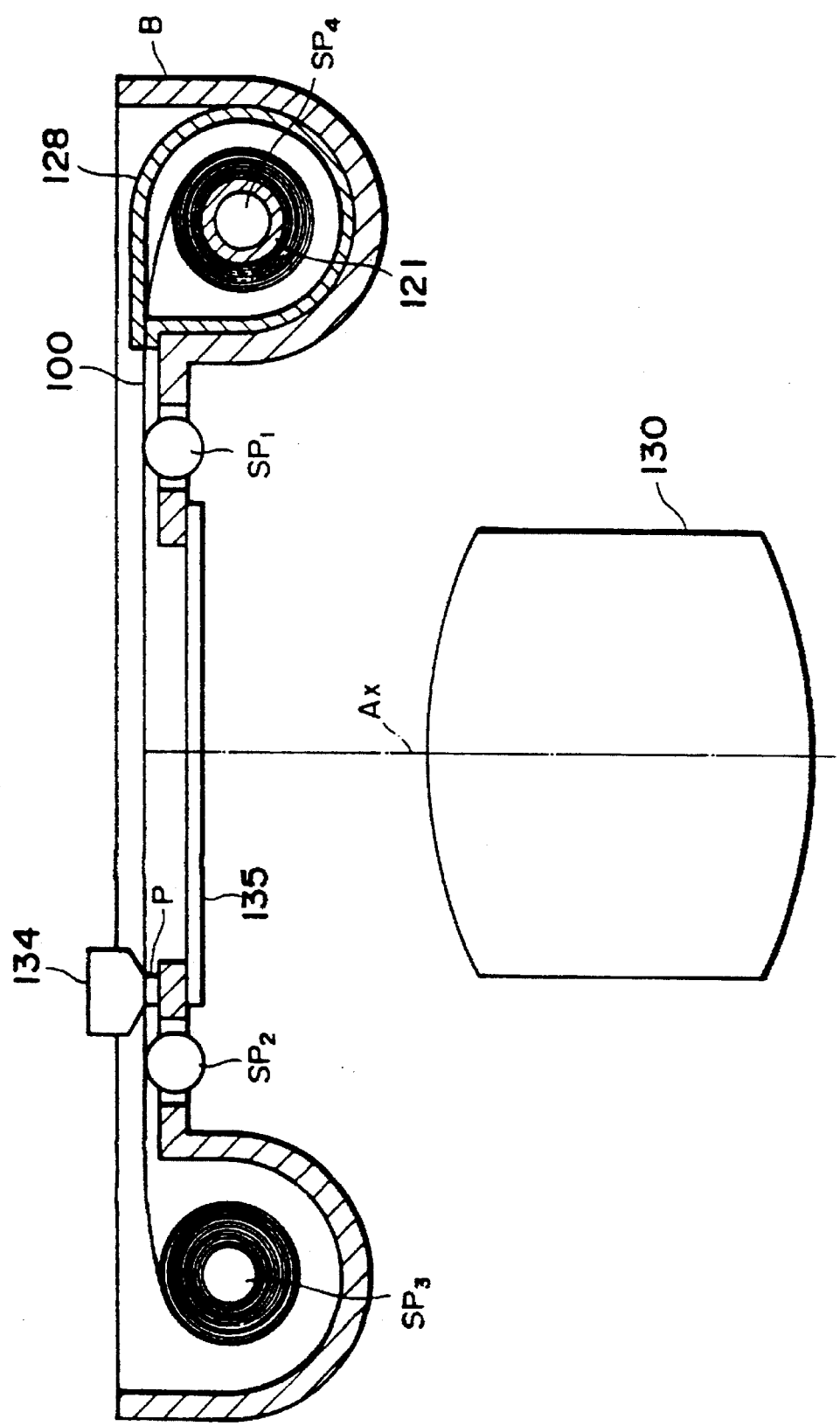
FIG. 6 is a cross sectional view of the camera in FIG. 3.

FIG. 6 is a cross section of the camera according to the present embodiment. FIG. 6 shows a state in which the cartridge 128 is set in the camera body B.

Here, the film strip 100 is wound around the spool core 121 in the cartridge 128. As the spool core 121 rotates, the leading end of film strip 100 is fed out from the cartridge 128.

The spool core 121 is fit with a spool $SP_4$, which is rotated by an unrepresented motor.

When the spool $SP_4$ is rotated counterclockwise in FIG. 6, the film strip 100 is fed out of the cartridge 128. A pair of spools $SP_1$, $SP_2$ are provided between a spool $SP_3$ and the spool $SP_4$. The spools $SP_1$, $SP_2$ each have claws on the circumference thereof so that the claws are to be engaged with perforations in the film strip 100. These spools $SP_1$, $SP_2$ are driven by the unrepresented motor. The film strip 100 fed out of the cartridge 128 is pulled by the pair of spools $SP_1$, $SP_2$ to the left in FIG. 6. Then the leading end of film strip 100 comes to be wrapped around the spool $SP_3$ provided in the camera body B. The above operation concludes a preparation for photographing.

In the above operation, the unrepresented motor also rotates the spool $SP_3$ while rotating the spools $SP_1$, $SP_2$. Thus, the spools $SP_1$, $SP_2$ and the spool $SP_3$ rotate in synchronization with each other. The motor (reference numeral 138) rotating these spools $SP_1$ to $SP_4$ is controlled by the control unit 133, as shown in FIG. 5.

Also, the spool $SP_1$ or spool $SP_2$ is provided with an encoder 139 for detecting an amount of rotation thereof, though not shown. This arrangement permits a feed amount of the film strip 100 to be detected. A feed amount of the film strip 100 detected by the encoder 139 is transmitted to the control unit 133.

Instead of the provision of the encoder 139 for spool $SP_1$ or spool $SP_2$, a photo interrupter may be employed to detect perforations in the film strip 100. This arrangement also permits a feed amount of the film strip 100 to be detected. In this arrangement, a light source of the photo interrupter may be LED supplying light except for the sensitive wavelength range of the emulsion layer 111 in the film strip 100, for example light of infrared region.

Returning to FIG. 6, a magnetic head 134 is disposed in the vicinity of the spool $SP_2$. The magnetic head 134 is kept in contact with the magnetic layer 122 on the back face of film strip 100. A contact pad P is provided on the opposite side of the film strip 100 to keep the contact close between the magnetic head 134 and the film. The contact pad P is arranged as movable selectively between a position where it closely contacts the film 110 and a position where it is away from the film 110. The contact pad P is driven by a contact pad driving unit 140, for example of a coreless motor.

The contact pad P may be a member of synthetic resin having a shape of projection facing the film strip 100, for example.

As shown in FIG. 5, the control unit 133 controls the contact pad driving unit 140 so that the contact pad P comes to contact the film strip 100 only upon winding the film strip 100.

Figure 7:
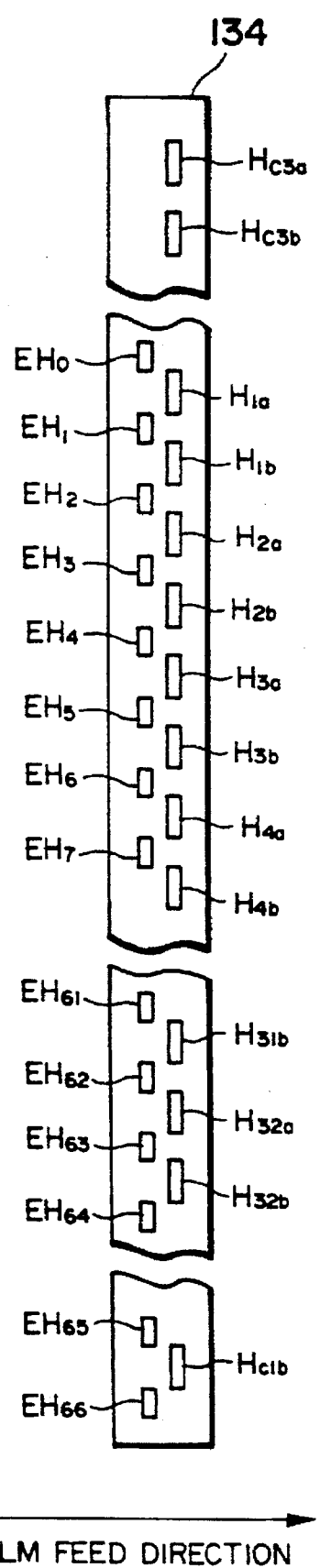
FIG. 7 is a drawing to show the structure of a magnetic head in the camera in FIG. 3.

FIG. 7 is a plan view to show a surface of the magnetic head 134 in contact with the film strip 100. In FIG. 7, the magnetic head 134 has 65 read/write heads $H_{1a}$–$H_{32b}$, $H_{C1a}$, $H_{C1b}$ and four read heads $H_{C2a}$, $H_{C2b}$, $H_{C3a}$, $H_{C3b}$ aligned along the direction perpendicular to the film feed direction as shown by an arrow in the drawing. Here, the read/write heads $H_{1a}$–$H_{32b}$ are arranged at predetermined intervals to prevent cross talk on the magnetic layer 112 in the film strip 100. Also, the magnetic head 134 is provided with 67 erase heads $EH_0$–$EH_{66}$. The erase heads $EH_0$–$EH_{66}$ are aligned in parallel and with a slight gap to the alignment of the read/write heads $H_{1a}$–$H_{32b}$, $H_{C1a}$, $H_{C1b}$. The erase heads $EH_0$–$EH_{66}$ are arranged at intervals between the read/write heads $H_{1a}$–$H_{32b}$, $H_{C1a}$, $H_{C1b}$ in the direction perpendicular to the film feed direction. Such magnetic head 134 can be produced using a technique for producing a thin film magnetic head, for example.

Returning to FIG. 5, signals read by the magnetic head 134 from the magnetic layer 112 in the film strip 100 are transmitted to the control unit 133 through a reading circuit 141. When signals are written in the magnetic layer 112 in the film strip 100, the control unit 133 actuates the magnetic head 134 through a writing circuit 142.

Figure 8:
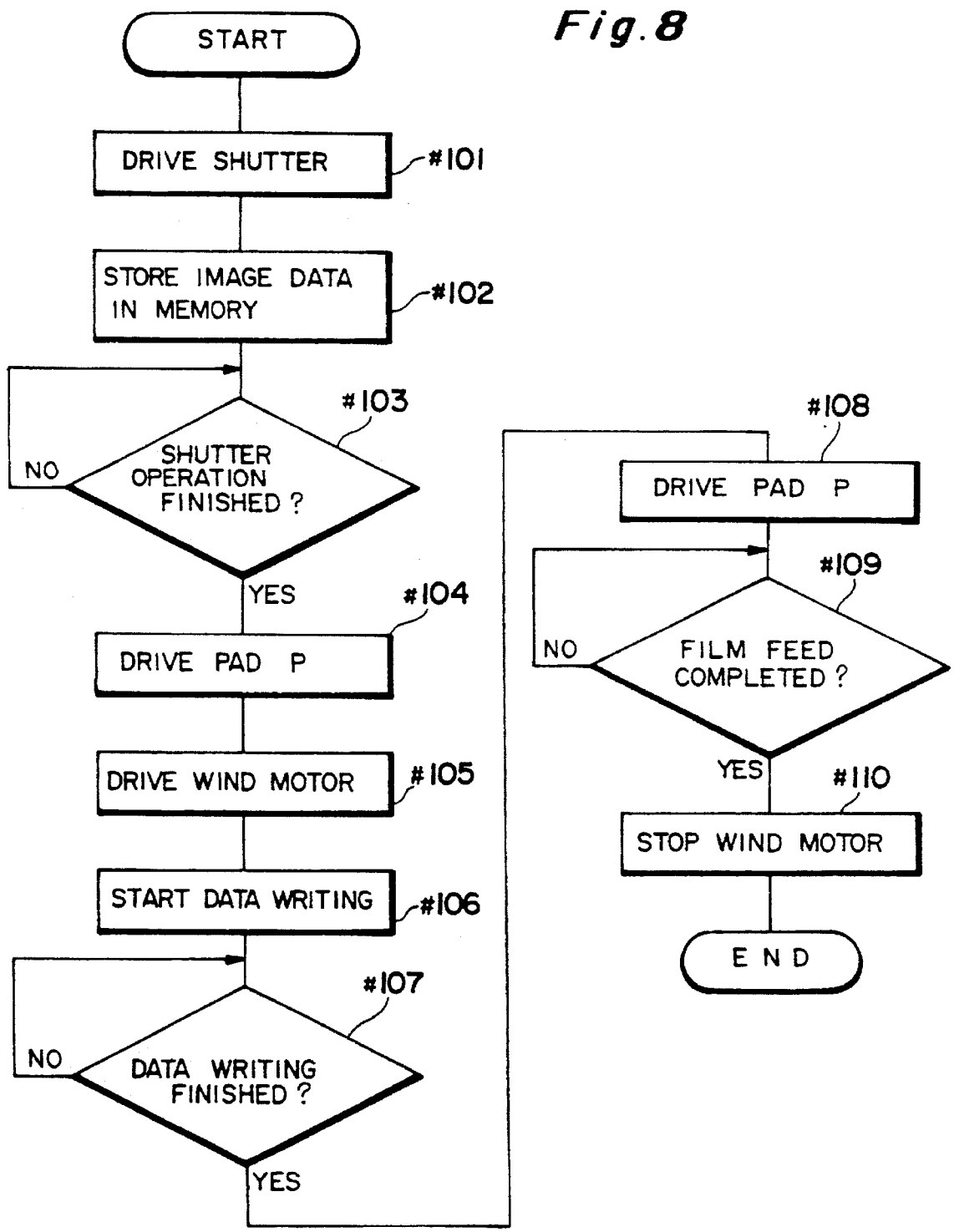
FIG. 8 is a flowchart to show a procedure of shooting operation in the camera in FIG. 3.

FIG. 8 is a flowchart to illustrate the operation of the camera according to the present embodiment. The operation of the camera according to the present embodiment is described in the following along this flowchart.

It is assumed in the following description that the cartridge 128 is set in the camera body B and the leading end of film strip 100 is wound around the spool $SP_3$, as shown in FIG. 6.

First, when a shutter release switch 143 is turned on, a shutter release signal is transmitted to the control unit 133. The control unit 133 receives the shutter release signal and then goes into next Step 101.

[Step 101: #101]

At Step 101 the control unit 133 activates the shutter 135. An operating time of the shutter 135 is determined by an unrepresented shutter speed setting unit. Also, the shutter 135 is so arranged that after completion of the operation it transmits an operation end signal to the control unit 133. Then the control unit 133 proceeds to Step 102.

[Step 102: #102]

At Step 102 the control unit 133 stores image data of CCD 132 obtained through the output amplifier 136 and the A/D converter 137, in a memory 144. Then the control unit 133 proceeds to Step 103.

[Step 103: #103]

At Step 103 the control unit 133 makes a decision as to if the shutter operation is completed. Here, if the shutter operation end signal is transmitted to the control unit 133, the control unit 133 proceeds to next Step 104. In contrast, if the shutter operation end signal is not transferred to the control unit 133, it repeats Step 103.

[Step 104: #104]

At Step 104 the control unit 133 actuates the unrepresented contact pad drive unit 140. This takes the contact pad P shown in FIG. 6 into contact with the emulsion layer 111 in the film strip 100. Then the control unit 133 proceeds to Step 105.

[Step 105: #105]

At Step 105 the control unit 133 drives the winding motor. This rotates the spool $SP_2$ and the spool $SP_3$ in FIG. 6 counterclockwise in the drawing in synchronism with each other. On this occasion, the spool $SP_1$ and the spool $SP_4$ are free of the rewinding motor. Alternatively, the spool $SP_1$ and the spool $SP_4$ may be arranged such that they are rotated counterclockwise by the rewinding motor in synchronism with rotation of the spool $SP_2$ and the spool $SP_3$.

Then the control unit 133 proceeds to Step 106.

[Step 106: #106]

At Step 106 the control unit 133 starts writing the image data stored in the memory 144, in the magnetic layer 112 in the film strip 100, using the magnetic head 134. The writing operation of image data will be described later. After that, the control unit 133 proceeds to Step 107.

[Step 107: #107]

At Step 107 the control unit 133 makes a decision as to if the data writing operation is finished. Here, if the data writing operation is not finished, the control unit 133 repeats this Step 107. If the data writing operation is finished, the control unit 133 proceeds to next Step 108.

[Step 108: #108]

At Step 108 the control unit 133 actuates the contact pad driving unit 140 to move the contact pad P to the position where it is away from the magnetic layer 112 in the film strip 100. Then the control unit 133 proceeds to Step 109.

[Step 109: #109]

At Step 109 the control unit 133 makes a decision as to if a feed amount of film strip 100 detected by the encoder 139 is equal to a predetermined feed amount (a feed amount of a frame). In case the film amount of film strip 100 is less than the feed amount of a frame, the control unit repeats this Step 109. If the feed amount of film strip 100 becomes equal to the feed amount of one frame, the control unit goes into next Step 110.

[Step 110: #110]

At Step 110 the control unit 133 stops the winding motor. This completes a shooting operation for one frame.

Next described is the writing of image data in the magnetic layer 112 in the film strip 100.

Figures 9A, 9B, 9C:
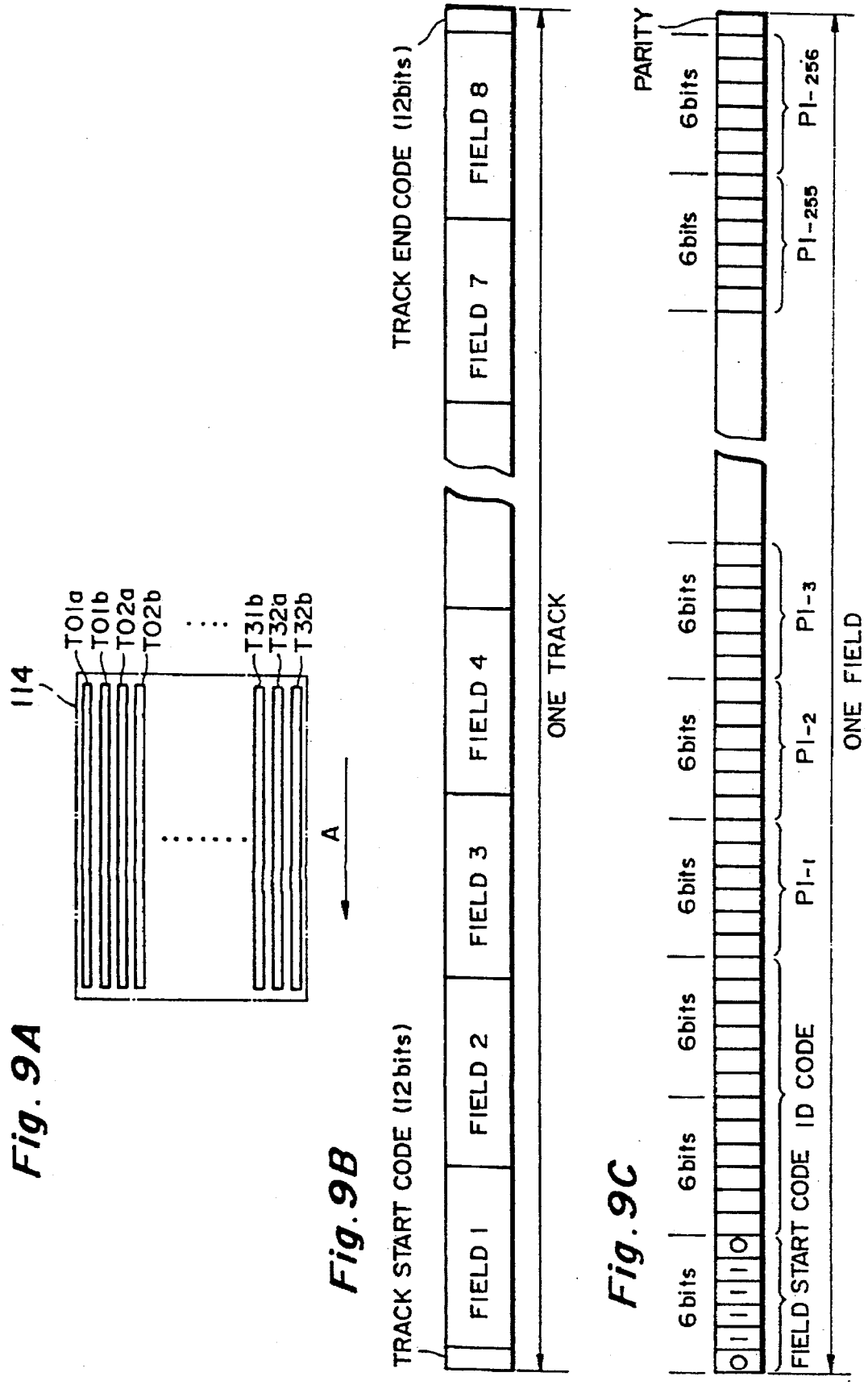
FIG. 9A is a drawing to show a format on a film.
FIG. 9B is an enlarged drawing to show a format.
FIG. 9C is an enlarged drawing to show a field shown in FIG. 9B.

FIG. 9A shows the recording method in the photographic area 114 on the film strip 100. In FIG. 9A the film is fed along the direction of arrow A in the drawing. There are 32 tracks T01a–T32a and 32 tracks T01b–T32b with the longitudinal direction extending in the film feed direction in the photographic area 114. The 32 tracks T01a–T32a and the 32 tracks T01b–T32b are alternately arranged in the direction perpendicular to the film feed direction. A signal with Hi and Low repeating every other bit is preliminarily recorded in the 32 tracks T01a–T32a. Also, image data is to be recorded in the 32 tracks T01b–T32b by the camera according to the present embodiment.

Here, the tracks T01a–T32a are opposed to the read/write heads $H_{1a}$–$H_{32a}$ in FIG. 7 while the tracks T01b–T32b to the read/write heads $H_{1b}$–$H_{32b}$ in FIG. 7.

A feed amount of film can be detected by counting a signal of track T01a–T32a through the read/write head $H_{1a}$–$H_{32a}$ (by counting rises or falls).

FIG. 9B shows a format in the tracks T01b–T32b, in which only a track is shown out of the tracks T01b–T32b. In FIG. 9B, a track is composed of a track start code of 12 bits indicating a start position of track, eight fields and a track end code of 12 bits indicating an end position of track.

FIG. 9C is an enlarged view of field 1 shown in FIG. 9B. In FIG. 9C, field 1 has a field start code of 6 bits, an ID code of 12 bits, 256 data $P1_{-1}$–$P1_{-256}$ each of 6 bits, and a parity.

The field start code is for example a signal of "0, 1, 1, 1, 1, 0", whereby the start position of each field can be detected. Also, information corresponding to a number of each field is recorded as the ID code, for example. Detecting the ID code, which field data follows the ID code can be identified. The data $P1_{-1}$–$P1_{-256}$ corresponds to digital photoelectric conversion signals of 256 pixels aligned along the direction of scanning line in CCD 132. Thus, data for one scanning line in CCD 132 is recorded in a field. In the present embodiment there are eight fields for a track and 32 tracks in a photographic area 114. Consequently, data corresponding to 256 scanning lines, i.e., data corresponding to all pixels in CCD 132, can be stored in a photographic area 114.

Although the present embodiment is so arranged that a photoelectric conversion signal from CCD 132 is converted into a digital signal of 6 bits, the photoelectric conversion signal may be converted into a digital signal of 4 bits (16 gradations), 3 bits (8 gradations) or less bits if there is a limit in recording density on the film strip 100.

Further, image processing may be employed for extracting a contour of image data, based on photoelectric conversion signals from CCD 132. For example, after conversion of the photoelectric conversion signals from CCD 132 into digital signals of 8 bits, "1" is assigned to portions where values indicating gradations of digital signals steeply change, while "0" to portions where values indicating gradations of digital signals are constant. This can change the image data of photoelectric conversion signals from CCD 132 into binary data extracting only the contour of image. This arrangement thus greatly decreases an amount of information written in the film strip 100.

In another arrangement the digital signals may be compressed using the coding method by JPEG (Joint Photographic Coding Experts Group). Further, the present embodiment employs the CCD with 256×256 pixels, but a CCD with less pixels may be employed to reduce an amount of image data recorded on the film.

If the recording density gives a room on the film strip 100, such an arrangement can be allowed that the number of pixels in CCD 132 is increased, a color filter is provided before the pixels in CCD, and image data corresponding to a color image is written on the film strip 100.

Figure 10:
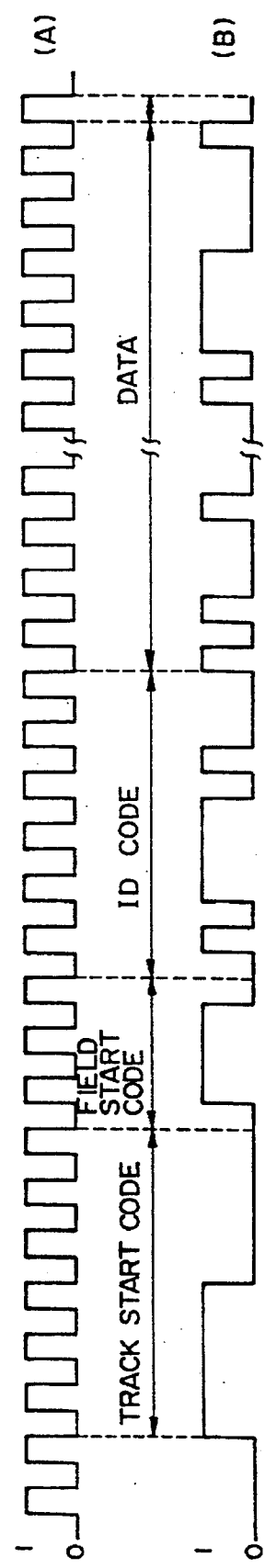
FIG. 10 is a drawing to show an example of recording method by the camera in FIG. 3.

FIG. 10 is a time chart of a signal read or written by the magnetic head 134. In FIG. 10 (A) shows a read signal of track T00 by the read/write head $H_0$. Also, in FIG. 10 (B) shows a written signal of track T01 by the read/write head $H_1$.

A pulse signal with codes inverted every bit is preliminarily recorded in the track T01a. In the present embodiment, the pulse signal is used as reference for reading or writing a signal in the track T01b (as positional reference of the magnetic layer 112 in the film strip 100). Namely, the control unit 133 in FIG. 5 reads the pulse signal of track T01a through the read/write head $H_{1a}$ to count it. The control unit 133 writes a signal in the track T01b or reads a signal from the track T01b in synchronism with the pulse signal of track T01a to be counted. This allows accurate data reading or writing even with a slight change in relative speed (scanning speed) between the magnetic head 134 and the magnetic layer 112 in the film strip 100.

Although the above example described only the relation between the track T01a and the track T01b, the relation is similar for other tracks T02a, T02b, T03a, T03b, ..., T32a, T32b.

In the present embodiment the tracks T01a–T32a are provided as reference in the vicinity of the tracks T01b–T32b for recording image data, which permits accurate writing of image data even with unevenness of feed speed of film strip 100 in writing, because the image data is arranged to be written in synchronism with the pulse signal as reference.

Now described referring to FIG. 10 is an example in which image data of one scanning line in CCD 132 is written in the field 1 shown in FIG. 9B.

First, the read/write head $H_{1a}$ reads the pulse signal of track T01a as shown in (A) in FIG. 10. Then, the read/write head $H_{1b}$ writes a track start code of 12 bits in the track T01b as shown in (B) in FIG. 10. After that, the head $H_{1b}$ writes a field start code of "0, 1, 1, 1, 1, 1, 0". Here, the writing in the track T01b is carried out while synchronized with the pulse signal of track T01a read by the read/write head $H_{1a}$.

Then, the control unit 133 converts information concerning a number of a field being recorded, into a signal of 12 bits, and thereafter records it in the ID code using the read/write head $H_{1b}$.

Subsequently, the control unit 133 successively records image data of one scanning line [6 bits (data of a pixel)× 256(pixels in a scanning line)=1536 bits] to be recorded among the image data stored in the memory 144, in bits following the ID code. On this occasion, the writing is also conducted in synchronism with the pulse signal of track T01a read by the read/write head $H_{1a}$. After that, the film strip 100 is fed by one pulse in the pulse signal of read track T01a. Then next recording is started for image data of a next field. In more detail, a space of bit is given for the parity and then another field start code is written.

Although not shown, the control unit writes the track end code of 12 bits through the read/write head when the data writing up to field 8 is completed.

Although the above example is so arranged that the camera writes the track start codes and the field start codes, another arrangement may employ a film strip 100 in which the track start codes and the field start codes are preliminarily written. This arrangement is described with reference to (A) to (C) in FIG. 11. In FIG. 11 (A) shows a read signal of track T00a by the read/write head $H_{1a}$. Also, (B) in FIG. 11 shows a read signal of track T01b by the read/write head $H_{1b}$ and (C) in FIG. 11 shows a written signal of track T01b by the read/write head $H_{1b}$.

As shown in (B) in FIG. 11, when the read/write head $H_{1b}$ reads the track start code and the field start code of "0, 1, 1, 1, 1, 1, 0", the control unit 133 identifies next 12 bits as bits of ID code. Then it writes the ID code corresponding to a number of a field to be recorded in the bits of ID code and records image data in the following 1536 bits, as shown in (C) in FIG. 11. In reading and writing data by the read/write head $H_{1b}$ as shown in (A) to (C) in FIG. 11, the reading/writing carried out while synchronized with the pulse signal of track T01a read by the read/write head $H_{1a}$.

The present embodiment is so arranged that the pulse signal as reference is preliminarily written in the tracks T01a–T32a, but instead, the pulse signal as reference may be written in the tracks T01a–T32a when the image data is written in the tracks T01b–T32b.

Figure 12A:
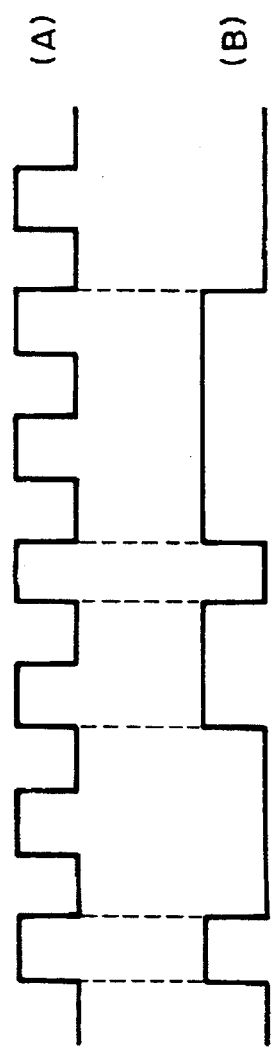
FIGS. 12A and 12B are drawings each to show an example of recording method by the camera in FIG. 3.

It is specifically described below with reference to FIGS. 12A and 12B. In FIG. 12A, (A) shows a reference clock signal by an unrepresented clock in camera and (B) a part of data signal to be written in the track T01b. In this case, the reference clock signal shown in (A) is written in the track T01a through the read/write head $H_{1a}$ and the data signal shown in (B) is written in the track T01b through the read/write head $H_{1b}$.

Figure 12B:
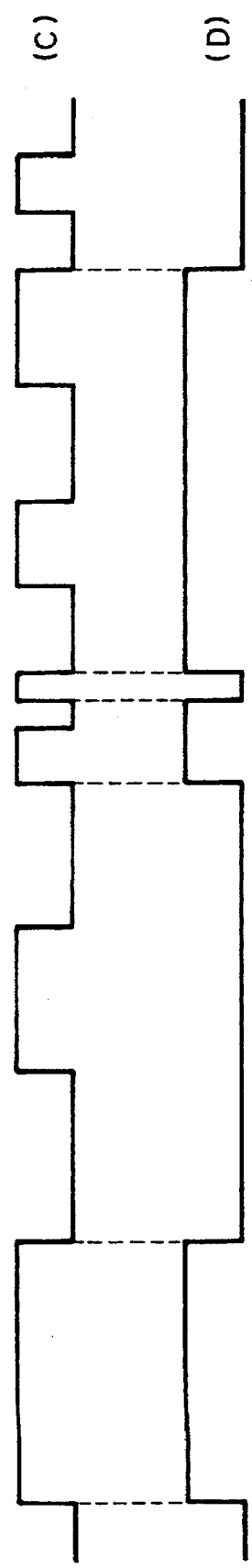

If there are variations in the feed speed of film strip 100, the reference clock signal written in the track T01a has nonuniform intervals of pulses, as shown in (C) in FIG. 12B. Also, the data signal written in the track T01b loses the relation of pulses, as shown in (D) in FIG. 12B. Reading the signal from the track T01b in this state, inaccurate reading of data signal would result.

However, since the arrangement is such that the signals are simultaneously recorded in the track T01a and track T01b, the signal of image data written in the track T01b has the relation of correspondence with the reference clock written in the track T01a. Then the reference clock written in the track T01a is used as time reference when the signal of image data written in the track T01b is read. This permits the data to be accurately read even with variations in the feed speed of film strip 100.

Since reference clocks T01a–T32a are provided corresponding to the tracks T01b–T32b, respectively, in the above example, data can be accurately read even if the data is written in a state away from the perpendicular state in which the alignment direction of read/write heads $H_{1a}$–$H_{32a}$ is perpendicular to the feed direction of film strip 100, or even if the relation between the alignment direction of read/write heads $H_{1a}$–$H_{32a}$ and the feed direction of film strip 100 is different from the relation between the heads in reading and the film feed direction.

The reference clock signal to be recorded in the film strip 100 is not limited to magnetic signals. For example, another possible arrangement is such that a light source flashing in synchronism with the reference clock signal is provided on the side of the emulsion layer 112 in the film strip 100 and in data recording, light from the light source is optically written or effects exposure in an area outside the photographic area on the film strip 100. The optically written reference clock signal can be optically detected in reading after developed.

As described above, the camera according to the present embodiment can record information of an image picked up by the CCD 132, over the photographic area 114 in the magnetic layer 112 in the film strip 100 in a superimposed manner.

Figure 13:
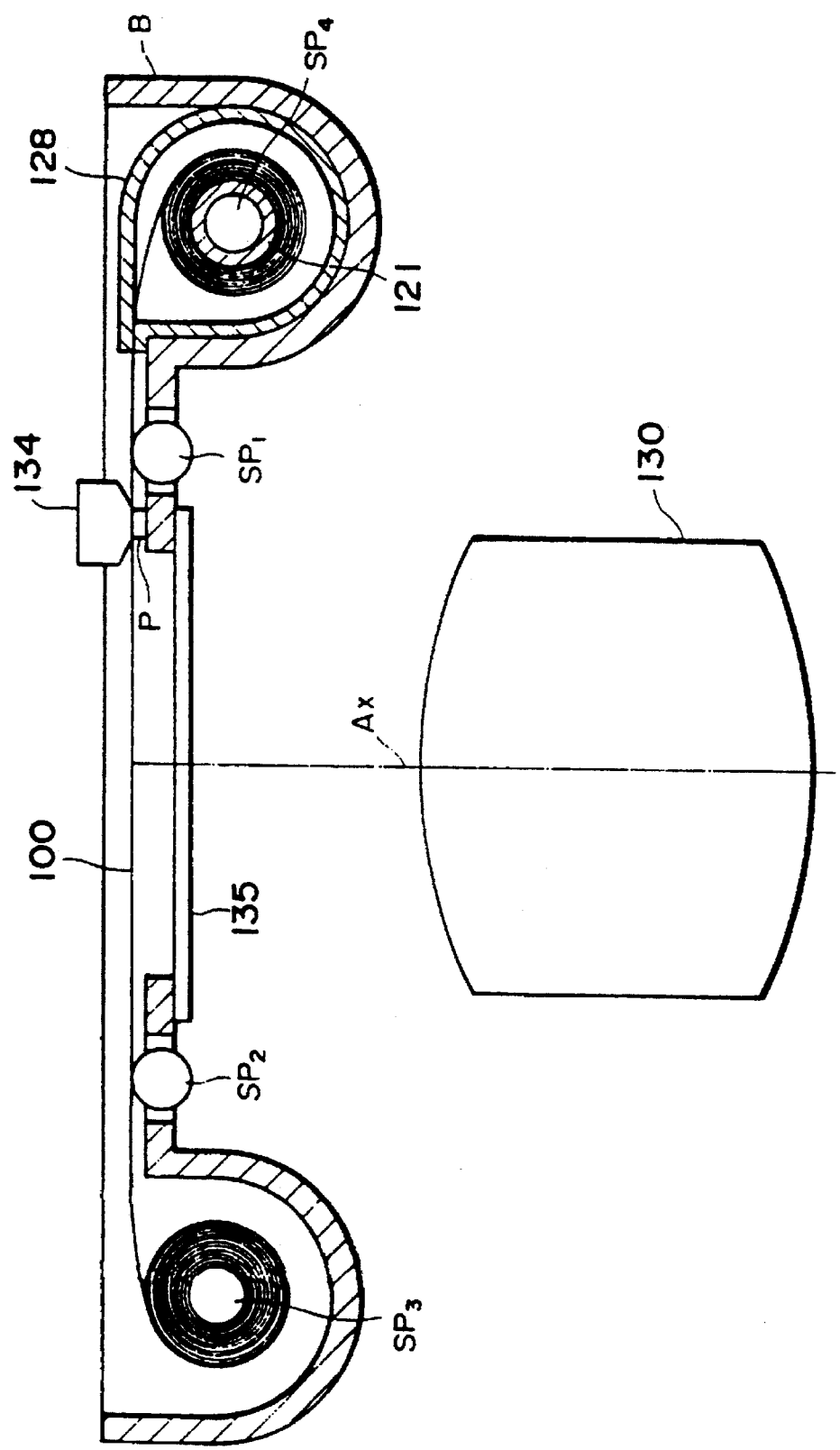
FIG. 13 is a cross sectional view to show a modification of the camera in FIG. 3.

As shown in FIG. 6, the magnetic head 134 is disposed downstream of shutter 135 in the film feed direction in order to record information of each image by CCD in the back face of each corresponding photographic area 114 (an area of image recorded as a latent image in the emulsion layer 111) in a superimposed manner. Alternatively, the magnetic head 134 may be arranged to be located on the cartridge 128 side of the shutter 135, as shown in FIG. 13. In case of this arrangement, information of an image is written during winding of film strip 100 and the information of the image written in the magnetic layer 112 is recorded with a shift of a frame relative to a corresponding photographic area 114 in the film strip 100. It is desirable in this case that information that "there is a shift of one frame between a photographic area and information of a corresponding image" is written for example at the leading end of film strip 100.

Also, above Embodiments 1, 2 are so arranged that the information of image is recorded in winding the film, but another arrangement may be such that the image information is recorded in rewinding the film strip after all frames are exposed. If this arrangement is employed, a memory is to be provided to store information of images of all exposed frames and the information is arranged to be recorded in the magnetic layer 112 in rewinding the film.

The present embodiment is so arranged that the image data taken in by the CCD 132 is stored in the memory 144. Employing this arrangement, information of an image stored in the memory 144 can be indicated on the display D after shot. This is advantageous in that a photographed image can also be checked after shot. Specifically, it has such an advantage that a judgement can be made soon as to if the shooting is successful.

This indication may be arranged to be given upon winding of film strip 100. This arrangement has an advantage that whether the shooting is successful or not can be judged immediately after shooting.

Next described is reading and writing of signals other than the image data. As shown in FIG. 1A, there are a plurality of tracks C0–C3 outside the photographic area 114 in the film strip 100 used in the present embodiment. These tracks C0–C3 each are composed of two tracks $C_{0a}$, $C_{0b}$; $C_{1a}$, $C_{1b}$; $C_{2a}$, $C_{2b}$; and $C_{3a}$, $C_{3b}$, respectively. A pulse signal as reference is preliminarily recorded in the tracks $C_{0a}$, $C_{1a}$, $C_{2a}$ and $C_{3a}$ similarly as the above-described tracks T01a–T32a. Based on the pulse signals recorded in the tracks $C_{0a}$, $C_{2a}$ and $C_{3a}$, data recorded in the tracks $C_{2b}$ and $C_{3b}$ is read, and data is written in the track $C_{0b}$.

Preliminarily recorded in the tracks $C_{2b}$ and $C_{3b}$ is data concerning shot frame numbers, the ISO speed of film, the number of shot frames, the type of film (maker, negative film, reversal film or black and while film), the emulsion number, the expiration date, etc. Among the above data, the data other than the data concerning the shot frame numbers may be arranged to be recorded in an area in the leading end portion of film, for example.

Also, data to be recorded in the track $C_{0b}$ may be shooting data concerning an aperture value in shooting, a shutter speed, a film (maker, ISO speed, emulsion number, date of manufacture, type of film (negative film, reversal film or black and white film), etc.), a type of camera, a type of taking lens, a type of filter, whether the flash is used or not, a subject distance, the temperature and humidity in shooting, the barometric pressure in shooting, and the altitude in shooting, data of shooting location, and data concerning comments in shooting.

Here, the shooting data is recorded with an ID code of 12 bits given before each data in the track Cob similarly as in FIG. 9C. The ID code is recorded as coded data about a type of the shooting data.

As for the shooting location data, there is a shooting location detecting unit composed of an electronic compass or GPS provided in the camera, for example. The shooting location detecting unit outputs data concerning the latitude and longitude of shooting location and the direction of taking lens, which is recorded in the track $C_{0b}$ after an ID code. The ID code is recorded as data of 12 bits indicating that the data of the latitude and longitude of shooting location and the direction of taking lens is recorded.

Next described is the data concerning the comments in shooting. For recording the data about the comments in shooting, the camera is provided with either a character input unit or a voice input unit or with the both. The character input unit may be of a pen input method for example of a transparent electrode and a pen with a conductive tip, or of a key board method. Then character information from the character input unit is converted for example into JIS codes and recorded in the track $C_{0b}$ after an ID code. The ID code is recorded as data of 12 bits indicating that the character information is recorded.

Also, the voice input unit may be constructed such that voices are converted into an electric signal through a microphone and the electric signal is digitalized. This voice information is also recorded in the track $C_{0b}$ after an ID code. The ID code is recorded as data of 12 bits indicating that the voice information is recorded. The voice information is not limited to the digital recording, but may be analog recording.

Embodiment 2

Figure 14:
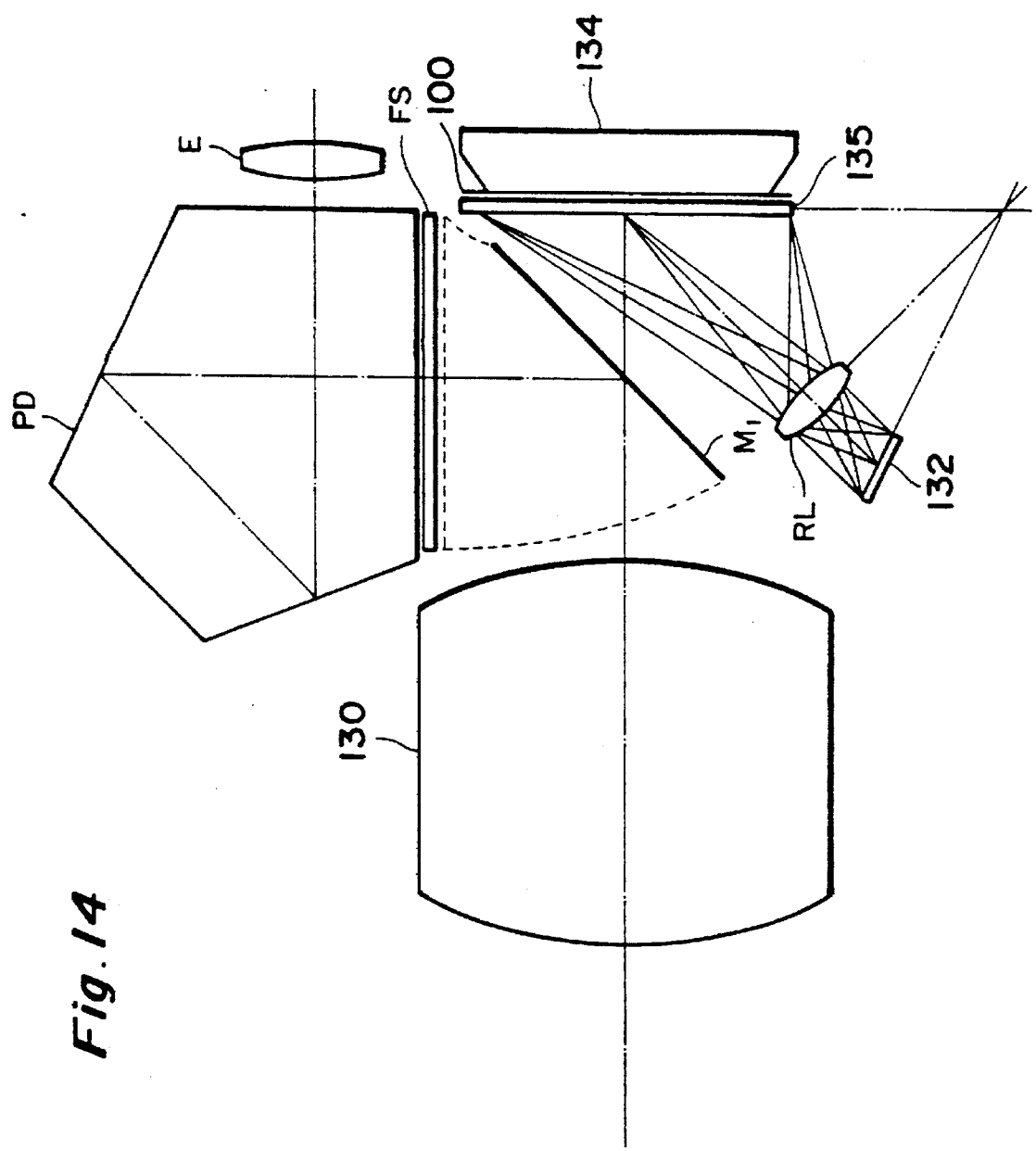
FIG. 14 is a diagrammatic illustration to show a camera according to another embodiment.

FIG. 14 is a drawing to show a camera according to another embodiment. In FIG. 14, light from an unrepresented object passes through a taking lens 130 and then is reflected by a mirror $M_1$ to impinge on a finder screen FS. An image of the object is formed on the finder screen FS as reversed left to right. Then, light from the object image on the finder screen FS is let to pass through a pentagonal roof prism PD to enter an eyepiece E. This arrangement can permit a photographer to observe the object image on the finder screen FS as an erect image through the eyepiece E.

The mirror $M_1$ is a so-called quick return mirror. In shooting the mirror $M_1$ tracks the trace shown by the dotted line in the drawing to move to the withdrawn position shown by the dotted line. In this state, the light from the object reaches the film strip 100 through the taking lens 130 and the shutter 135. An object image is formed on the film strip 100 on this occasion.

In the present embodiment, a relay lens RL is disposed at a position to view the film strip 100 in an oblique direction. A reflective surface $M_2$ is provided on a surface of a shutter wing (shutter curtain) in the shutter 135 (see FIGS. 15A to 15C).

Accordingly, when the mirror $M_1$ is located at the withdrawn position and the shutter 135 is opened (see FIG. 15B), the light from the taking lens 130 is reflected by the reflective surface $M_2$. The light reflected by the reflective surface $M_2$ passes through the relay lens RL to impinge on CCD 132. The relay lens RL functions to refocus the image formed on the film strip 100, on the CCD 132. The film strip 100 and an image pickup surface of CCD 132 are arranged to satisfy the Scheimpflug rule with respect to the principal plane of relay lens RL.

Here, the fact that the film strip 100 and the image pickup surface of CCD 132 satisfy the Scheimpflug rule with respect to the principal plane of relay lens RL means that an extension of surface of film strip 100, an extension of the image pickup surface of CCD 132 and an extension of the principal plane of relay lens RL intersect with one another at a point.

Accordingly, the object image formed on the CCD 132 is focused at a constant magnification across the entire field of CCD (the entire region of image pickup surface). In other words, the object image is refocused without distortion on the CCD 132, though the CCD views the surface of film strip 100 through the relay lens RL in the oblique direction.

The present embodiment employs the relay lens RL with a demagnification ratio as the magnification. This can reduce the size of CCD 132, and in addition the space between the relay lens RL and the CCD 132 can be made smaller, allowing the relay lens RL and the CCD 132 to be set in a limited space in camera.

Figure 15A:
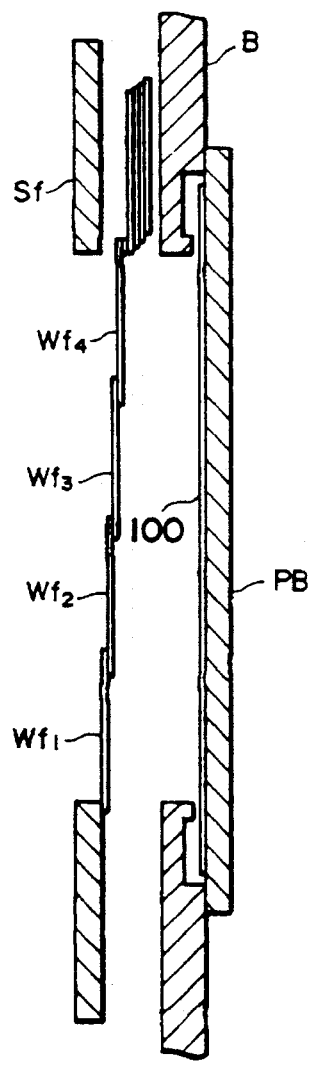
FIGS. 15A, 15B and 15C are drawings to illustrate a shutter operation of the camera in FIG. 14.
Figure 15B:
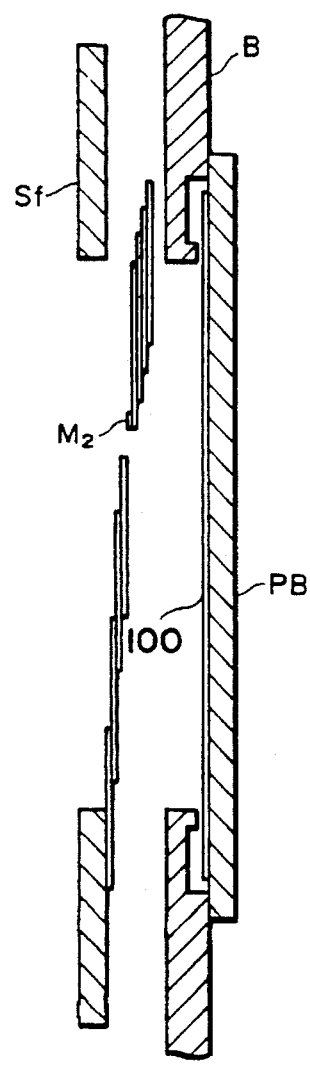
Figure 15C:
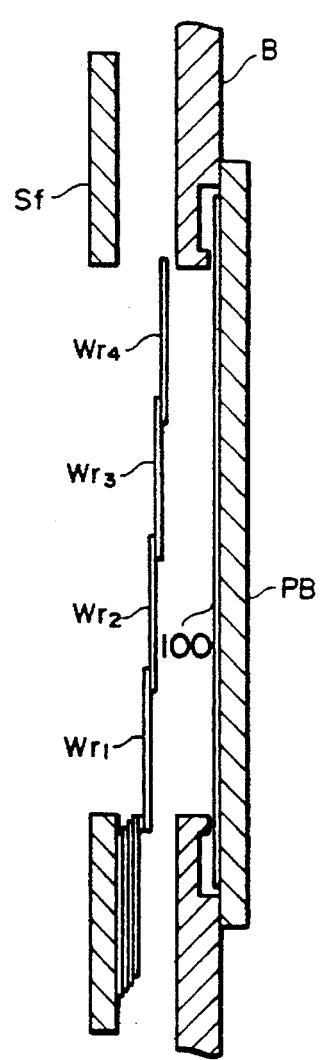

FIGS. 15A–15C are cross sectional views to show the structure of the shutter according to the present embodiment. FIG. 15A shows a state before the shutter operation, and FIG. 15B shows a state during the shutter operation (during exposure). Also, FIG. 15C shows a state after the shutter operation.

In FIGS. 15A–15C, the film strip 100 is located between a pressure board PB for pressing the film strip 100 from the back and the camera body B. The shutter wings include four leading wings $Wf_1$–$Wf_4$ and four trailing wings $Wr_1$–$Wr_4$. These shutter wings $Wf_1$–$Wf_4$ and $Wr_1$–$Wr_4$ are supported as movable vertically in the drawings by an unrepresented link mechanism. The link mechanism is set in a shutter frame Sf.

Specifically described below is a motion of the shutter wings $Wf_1$–$Wf_4$ and $Wr_1$–$Wr_4$ in the shutter operation. First, as shown in FIG. 15A, the leading wings $Wf_1$–$Wf_4$ cover the entire aperture of shutter frame Sf as overlapping with each other before the shutter operation. Next, as shown in FIG. 15B, the leading wings $Wf_1$–$Wf_4$ first move down in the drawing and the trailing wings $Wr_1$–$Wr_4$ then move down in the drawing as following the leading wings. Here, as well known, a gap between the leading wing $Wf_4$ and the trailing wing $Wr_1$ is the slit width, and the leading wings $Wf_1$–$Wf_4$ and the trailing wings $Wr_1$–$Wr_4$ move so as to keep the slit width constant. Then, after completion of the shutter operation, the trailing wings $Wr_1$–$Wr_4$ cover the entire aperture of the shutter frame Sf as overlapping with each other, as shown in FIG. 15C.

In the present embodiment the reflective surface $M_2$ is provided on the surface of the trailing wing $Wr_1$. The reflective surface $M_2$ can be produced for example using the vapor deposition technique. It is preferable that the width of reflective surface $M_2$ in the shutter wing moving direction is arranged such that the reflective surface $M_2$ is located outside the region of aperture portion of shutter frame Sf after completion of the shutter operation. It is also preferable that the width of reflective surface $M_2$ in the shutter wing moving direction is arranged such that the width after reduced by the relay lens RL is larger than a pixel in CCD 132.

In the present embodiment, the reflective surface $M_2$ is disposed next to the slit made by the leading wing $Wf_4$ and the trailing wing $Wr_1$, as shown in FIG. 15B. In the shutter operation light from the taking lens 130 shown in FIG. 14 is reflected by the reflective surface $M_2$ to form an object image on CCD 132. The object image formed on CCD 132 is scanned with movement of the reflective surface $M_2$. In other words, parts of the object image are successively formed on CCD 132.

Self scan of CCD 132 is preferably to be synchronized with the object image scanned with movement of the reflective surface $M_2$. It should be noted that in case the reflective surface $M_2$ is formed over the entire surface of the leading wings $Wf_1$–$Wf_4$ or the trailing wings $Wr_1$–$Wr_4$, the self scan of CCD 132 does not have to be synchronized with the object image scanned by the reflective surface $M_2$. In this case, supposing the reflective surface $M_2$ is provided over the entire surface of the leading wings $Wf_1$–$Wf_4$, the self scan of CCD 132 may be arranged to be finished within a time duration between the timing when the mirror $M_1$ is located at the withdrawn position and the timing when the shutter operation is started. In contrast, supposing the reflective surface $M_2$ is provided over the entire surface of the trailing wings $Wr_1$–$Wr_4$, the self scan of CCD 132 may be arranged to be completed within a time duration between the timing when the shutter operation is finished and the timing when the mirror $M_1$ starts moving from the withdrawn position.

The present embodiment has such an advantage that the exposure timing on the film strip 100 can be made approximately equal to the image pickup timing on the CCD, because the reflective surface $M_2$ is set adjacent to the slit made by the leading wing $Wf_4$ and the trailing wing $Wr_1$.

Further, the present embodiment has another advantage that a loss in quantity of light can be reduced upon film exposure, because there is no half mirror used.

Also, the cameras as described above in Embodiments 1 and 2 may be provided with a shooting data measuring unit (not shown) for measuring shooting data. The shooting data measuring unit measures data concerning the aperture value, the shutter speed, the film (maker, film speed, emulsion number, production date, etc.), the type of camera, the type of lens, the type of filter, the flash information, the subject distance, the temperature and humidity in shooting, the pressure and the altitude, and outputs the shooting information concerning these.

The shooting information may be arranged to be recorded in the magnetic layer 112 through the writing magnetic head 134 similarly as the information of image.

Embodiment 3

Prior to the description about the present embodiment, a positional relation of data of images recorded on the film strip 100 will be first described.

Figure 16A:
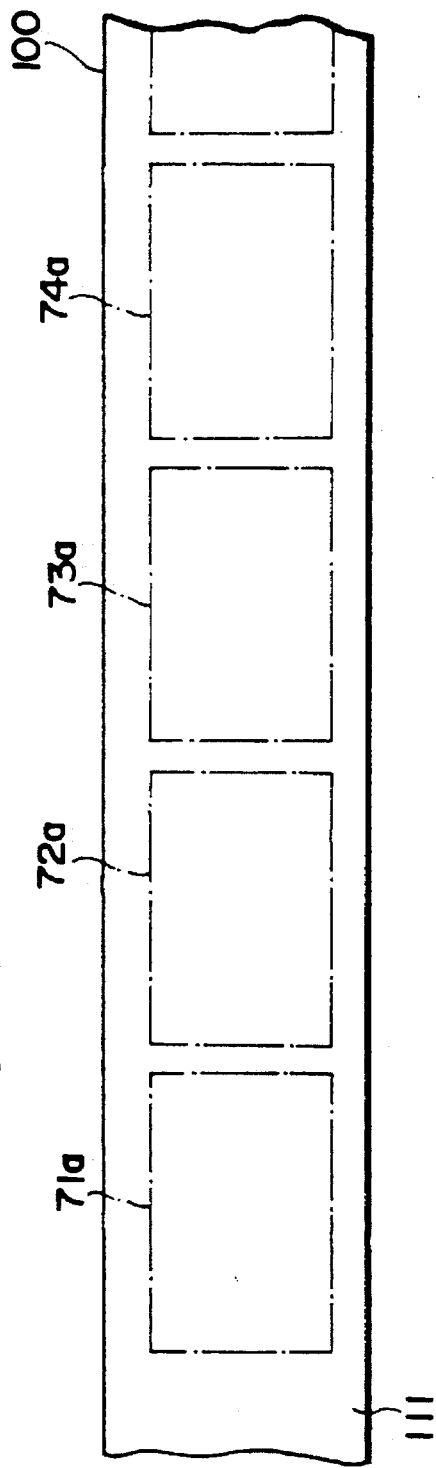
FIGS. 16A and 16B are drawings to show regions where first and second image information is recorded.

In FIG. 16A, an object image is recorded through the taking lens 130, as a latent image or as first image information on a region 71a surrounded by a chain line in the drawing. At this time, the magnetic head 134 records information of the object image photoelectrically converted by CCD 132 in a region 71b shown in FIG. 16B, as second image information (the photoelectrically converted information of the object image) corresponding to the first image information (latent image).

Next, after the end of the shooting, that is, after the recording in the regions 71a, 71b is finished, the camera winds the film strip 100 to take a next picture. Upon next shooting, first image information is recorded in a region 72a in the film strip 100 and second image information in a region 72b. Upon further shooting, first and second image information is recorded in a region 73a and in a region 73b, respectively. Upon still further shooting, first and second image information is recorded in a region 74a and in a region 74b, respectively. Here, each pair of region 71a and region 71b, region 72a and region 72b, region 73a and region 73b or region 74a and region 74b constitutes a photographic frame. Thus, the first image information and the second image information is recorded in a superimposed manner in each frame to be shot, on the film strip 100.

After all frames are exposed, a photographer takes the exposed cartridge 128 out of the camera shown for example in FIG. 3, FIG. 6, etc. and makes an order using a print information control apparatus C as described below.

Figure 17A:
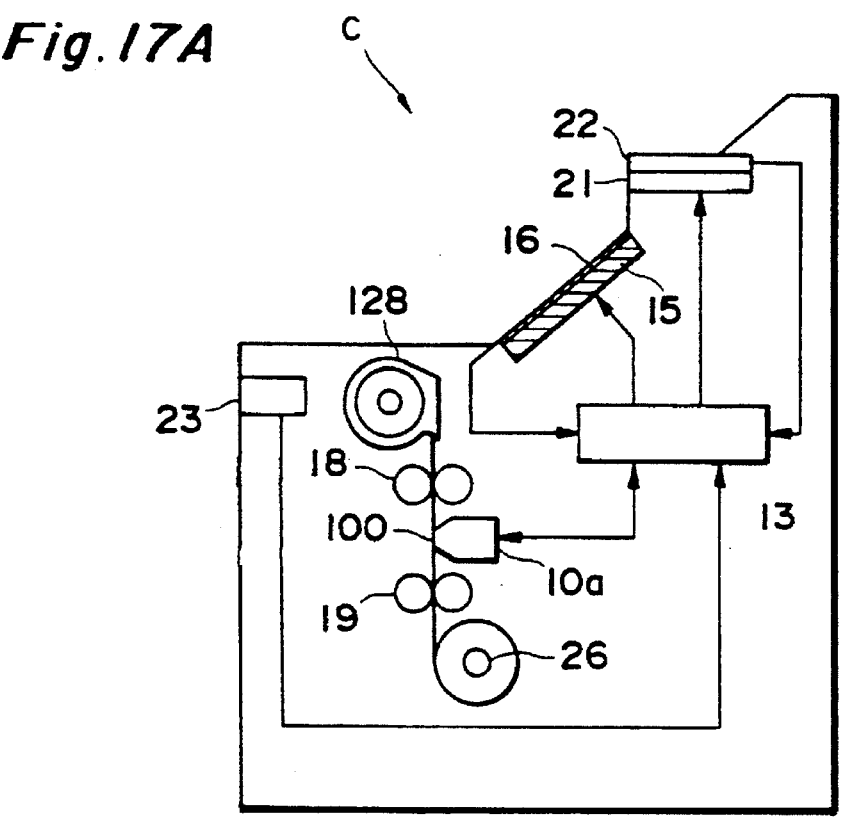
FIG. 17A is a drawing to show a main part of a print information control apparatus.
Figure 17B:
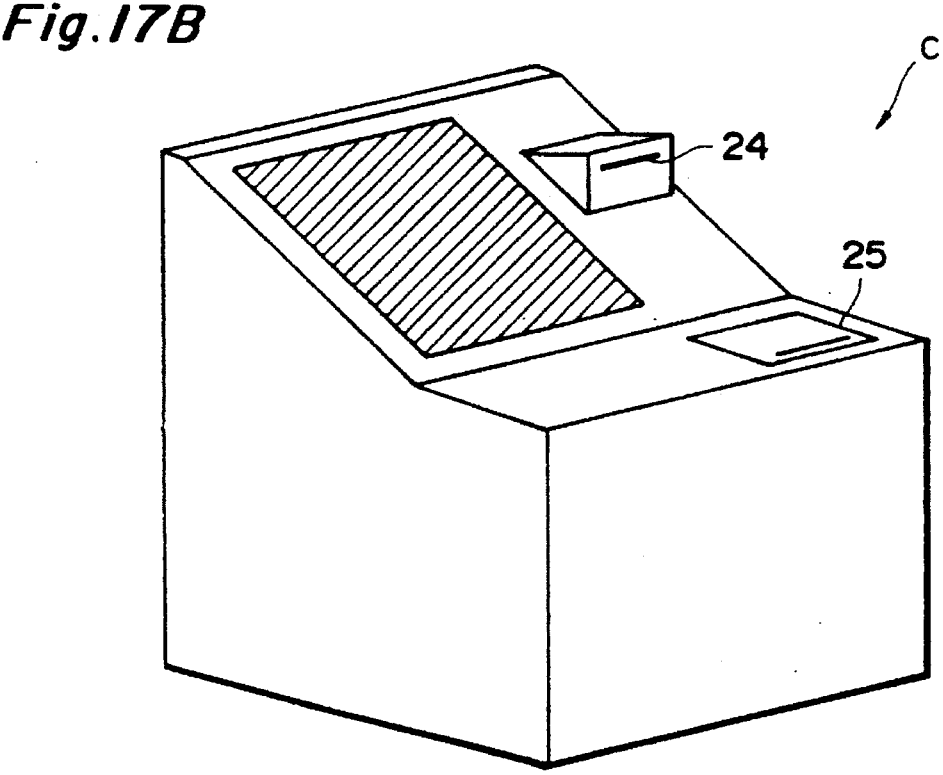
FIG. 17B is a perspective view of the apparatus.

FIGS. 17A and 17B show a print information control apparatus C (hereinafter referred to as a control apparatus).

This control apparatus C has a magnetic head 10a for reading information recorded in the film strip 100 and writing information in the film strip 100, a display 15 for displaying the information from the magnetic head 10a, and a touch panel 16 provided on the surface of the display 15. There is also a controller 13 provided for controlling these magnetic head 10a, display 15 and touch panel 16. A cartridge 128 with a film 100 mounted therein is put through a cover portion 25 of the control apparatus C therein.

Figure 18:
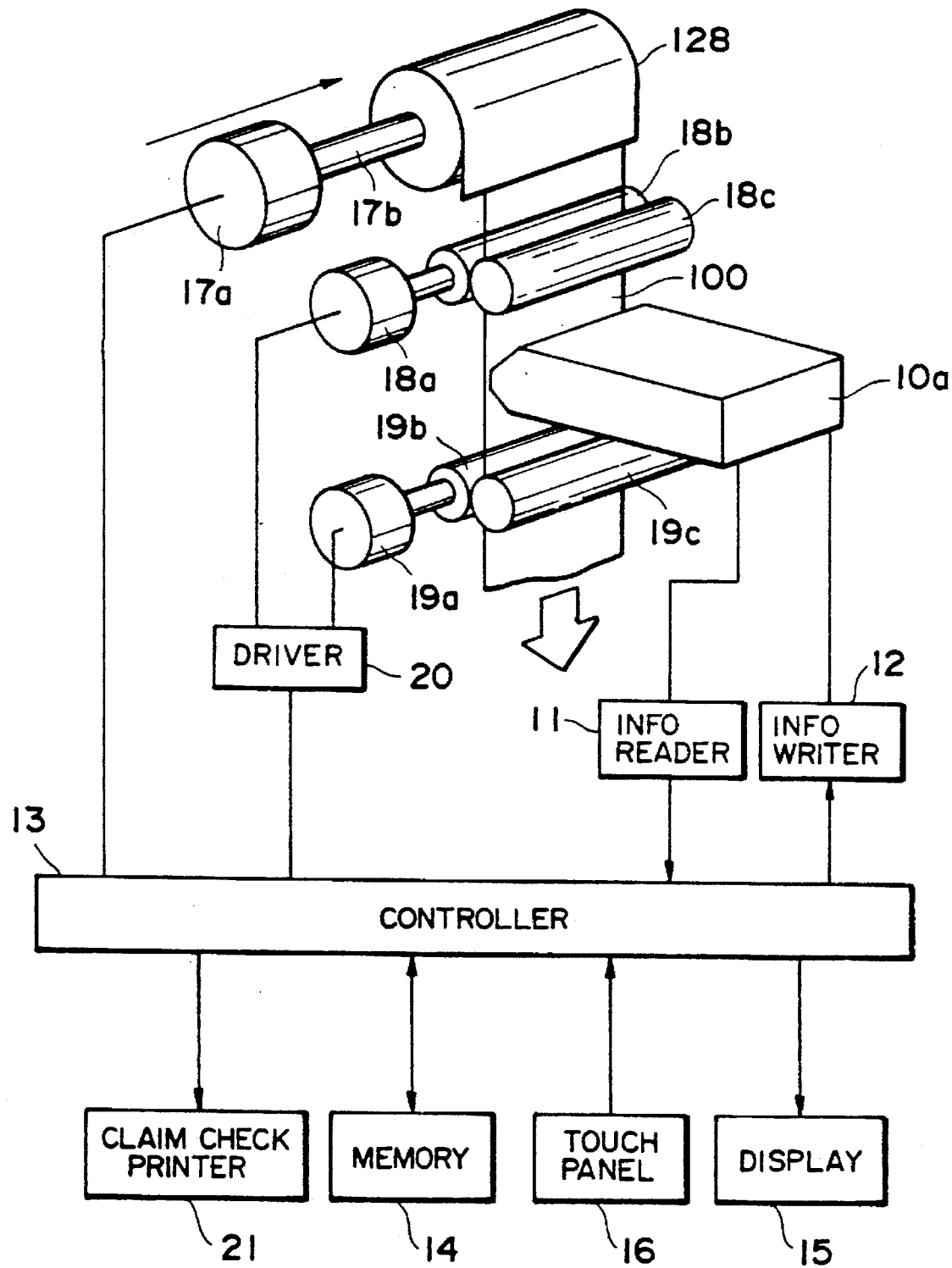
FIG. 18 is a drawing to schematically show a main part of the apparatus shown in FIG. 17A and a control system therefor.

Next described based on FIG. 18 is the structure of the control apparatus C and a driving mechanism.

First, the controller 13 controls rotation of a motor 17a for rotating a shaft 17b, which is arranged as capable of fitting with a spool core of cartridge 128. Also, the controller 13 controls an unrepresented drive unit for moving the motor 17a in the direction of the arrow in the drawing. This makes the shaft 17b fit with the spool core of cartridge 128. Since the spool core rotates with rotation of the shaft 17b, the film strip 100 wound around the spool core is fed out of the cartridge 128.

There are spools 18b, 18c and spools 19b, 19c arranged in the feed direction of film strip 100. A motor 18a rotates the spool 18b. The spool 18c rotates in synchronism with rotation of spool 18b in the opposite direction to the rotation direction of spool 18b. Also, a motor 19a rotates the spool 19b. The spool 19c rotates in synchronism with rotation of spool 19b in the opposite direction to the rotation direction of spool 19b. These motors 18a, 19a are synchronized in rotation by a driver 20 which is a synchronous circuit. In this arrangement, the film strip 100 is pulled in the direction of the arrow in the drawing. A tension on film is maintained constant between the spools 18b, 18c and the spools 19b, 19c. Returning to FIG. 17A, a roll shaft 26 is provided in the pulled direction of film strip 100. The roll shaft 26 is provided with a well-known auto-loading mechanism as not shown, so that the film strip 100 withdrawn out of the cartridge 128 is wound around the roll shaft 26. The winding direction around the roll shaft 26 is reverse to the winding direction around the spool shaft in the cartridge 128, which can correct curling of film strip 100.

The magnetic head 10a is located between the two pairs of spools 18b, 18c and spools 19b, 19c. The magnetic head 10a is in contact with the magnetic layer in the film strip 100. An information reading unit 11 and an information writing unit 12 are connected to the magnetic head 10a. The information reading unit 11 is composed for example of a chrominance signal reproducing circuit and a luminance signal reproducing circuit, and converts the second image information recorded in the magnetic layer in the film strip 100 into an electric signal to output it to the controller 13.

A memory 14 having for example RAM is connected to the controller 13, and the second image information from the information reading unit 11 is stored in the memory 14 frame by frame. The display 15, which is a liquid crystal display or CRT, is also connected to the controller 13. The touch panel 16 of transparent electrode is given on the surface of the display 15, and an input through the touch panel 16 is transmitted to the controller 13. The present embodiment employs the touch panel as selecting means, but a key board may be applied instead thereof. Also, a mouse, a track ball or a joystick may be employed as the selecting means.

Returning to FIG. 17A, the apparatus C in the present embodiment is provided with a claim check printing unit 21 mainly composed of a printer for example of the ink jet method, a user card read and write unit 22 for reading or writing information with an IC card or a magnetic card, and a sensor 23 for recognizing a customer approaching the apparatus. These are controlled by the controller 13. The sensor 23 may be one of the infrared method or of the electromagnetic wave method. The cover portion 25 shown in FIG. 17B is arranged as openable and closable, and the controller 13 controls an open or close operation thereof. When the dover portion 25 is closed, complete light shielding is achieved in the apparatus. A slot portion 24 is provided beside the display 15, serving as an insertion slot of user card and as an ejection slot of claim check.

Figure 19:
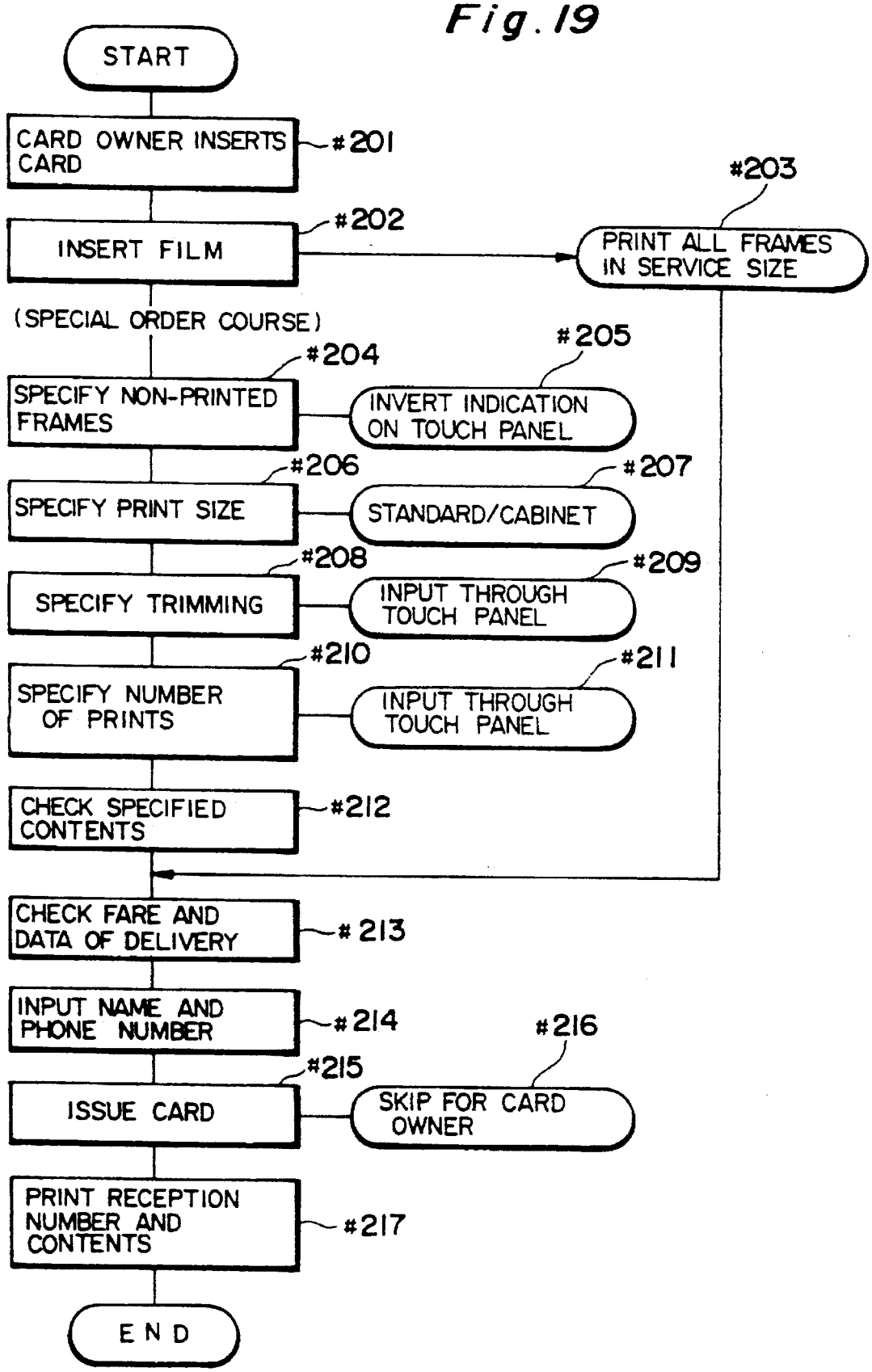
FIG. 19 is a flowchart to show the operation of the apparatus in FIG. 18.

Next described is the operation of controller 13. FIG. 19 is a flowchart to show an example of flow of the operation of the apparatus C in the present embodiment, and FIG. 20 to FIG. 29 are drawings to show examples of indications by the apparatus C in the present embodiment.

[Step 1: #201]

At Step 1 the controller 13 receives a detection signal from the sensor 23 and then indicates "Please insert user card if you have" on the display 15. Then the controller 13 proceeds to Step 2.

[Step 2: #202]

At Step 2 the controller 13 actuates an unrepresented drive unit to open the cover portion 25 and indicates "Please put a film in" on the display 15. Then the controller 13 proceeds to Step 3.

[Step 3]

At Step 3 the controller 13 receives a detection signal from an unrepresented optical sensor which detects whether the cartridge 128 is set at a predetermined position or not, and closes the cover portion 25. Then the controller 13 proceeds to Step 4.

[Step 4]

At Step 4 the controller 13 moves the shaft 17b of the film feed motor 17a in the direction of the arrow as shown in FIG. 18 so as to make the shaft fit with the spool core of cartridge 128. Then the controller 13 proceeds to Step 5.

[Step 5]

At Step 5 the controller 13 rotates the film feed motor 17 to feed the film strip 100 out of the cartridge 128. Then the controller 13 proceeds to Step 6.

[Step 6]

At Step 6 the controller 13 drives the motors 18a, 19a through the driver 20 as synchronous circuit. This rotates the rollers 18b, 18c and the rollers 19b, 19c, so that the film strip 100 fed out of the cartridge 128 at Step 5 is pulled downward in the drawing. A tension on the film strip 100 is maintained constant between the two pairs of rollers 18b, 18c and 19b, 19c. Then the controller 13 proceeds to Step 7.

[Step 7]

At Step 7 the controller 13 reads the second image information from the magnetic layer in the film strip 100 through the information reading unit 11 and the magnetic head 10a, and then proceeds to Step 8.

[Step 8]

At Step 8 the controller 13 stores the second image information from the film strip 100 frame by frame in the memory 14, and then proceeds to Step 9.

[Step 9]

At Step 9 the controller 13 executes such a control that the film strip 100 fed out of the cartridge 128 is wound around the roll shaft 26 by the unrepresented autoloading mechanism, and then proceeds to Step 10.

[Step 10]

At Step 10 the controller 13 makes a decision as to if reading of all exposed frames in the film strip 100 is finished. If the reading is finished, the controller proceeds to Step 11; unless it is finished, the controller repeats the storing operation at Step 8 until the reading of all exposed frames is finished.

[Step 11]

Figure 16B:
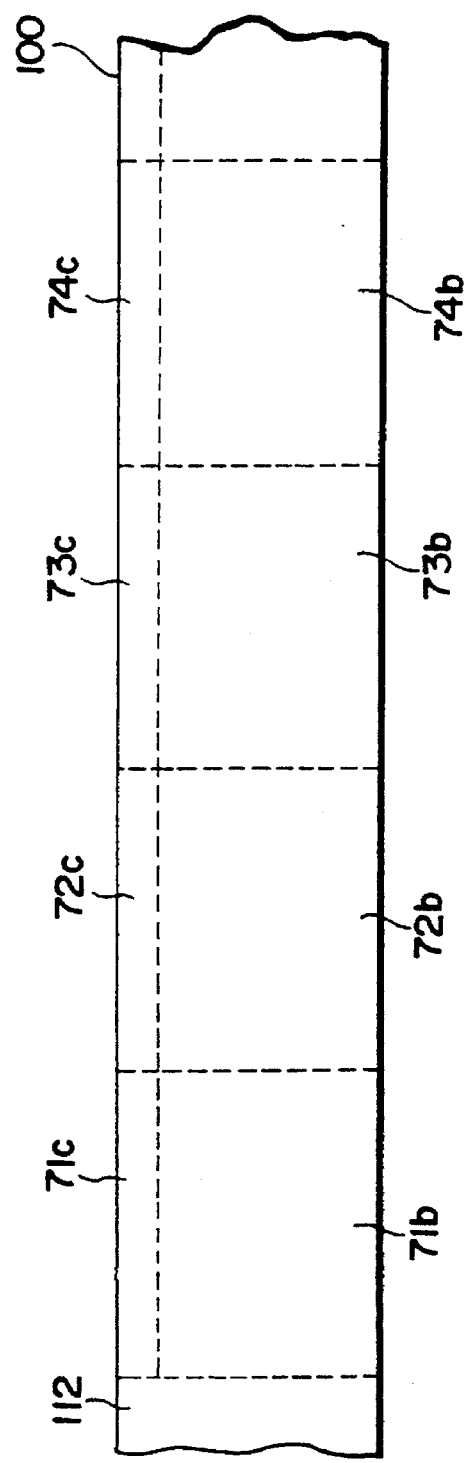
Figure 20:
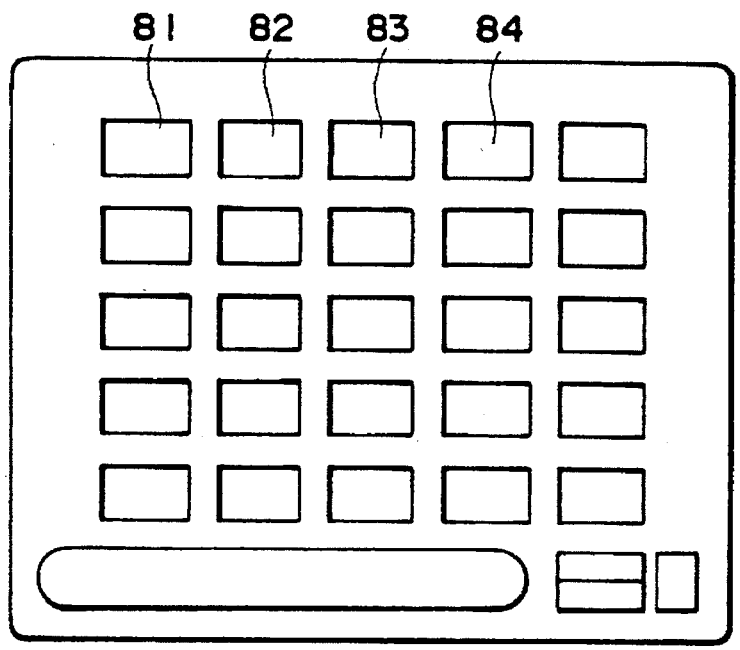
FIG. 20 is a drawing to show an example of indication in the embodiment.

At Step 11 the controller 13 indicates a list of second image information of exposed frames on the display 15, as shown in FIG. 20. In the indication, the second image information recorded in the region 71b shown in FIG. 16B is indicated in a region 81 on display 15, the second image information recorded in the region 72b is in a region 82, the second image information recorded in the region 73b is in a region 83, and the second image information recorded in the region 74b is in a region as images in the respective frames.

Then the controller 13 proceeds to Step 12.

[Step 12]

Figure 21:
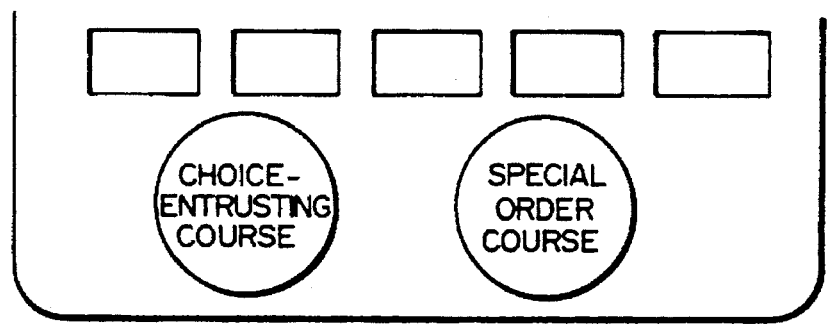
FIG. 21 is a drawing to show an example of indication in the embodiment.

At Step 12 the controller 13 indicates "Please press choice-entrusting course if you would like all frames to be printed in service size" on the display 15. There are "choice-entrusting course" and "special order course" indicated on the display as shown in FIG. 21.

In the present embodiment, the description concerns a case in which an orderer selects the "special order course". If an orderer selects the "choice-entrusting course", the controller 13 stores in the memory 14 such information that the print size is the ordinary size (service size) (#203) and the print number is one each frame, and then proceeds to Step 33. If the "special order course" is selected as in the present embodiment, the controller 13 proceeds to next Step 13.

[Step 13: #204]

Figure 22:
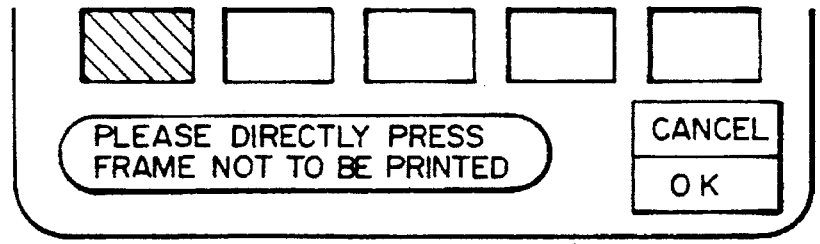
FIG. 22 is a drawing to show an example of indication in the embodiment.

At Step 13 the controller 13 indicates "Please directly press a frame not to be printed" on the display 15, as shown in FIG. 22, and then proceeds to Step 14.

[Step 14: #205]

At Step 14 the controller 13 inverts an indication of a thus selected frame as shown by the hatched portion in FIG. 22, based on a signal through the touch panel 16. Alternatively, the contrast of indication may be arranged to be lowered instead of the inversion of indication. Namely, any method of indication may be applied as long as the orderer can discriminate a selected frame. Then the controller 13 proceeds to Step 15.

[Step 15]

At Step 15 the controller 13 displays "Finished? If Yes, please press 'OK'" on the display 15. When the 'OK' is pressed, the controller 13 proceeds to Step 16.

[Step 16: #206]

Figure 23:
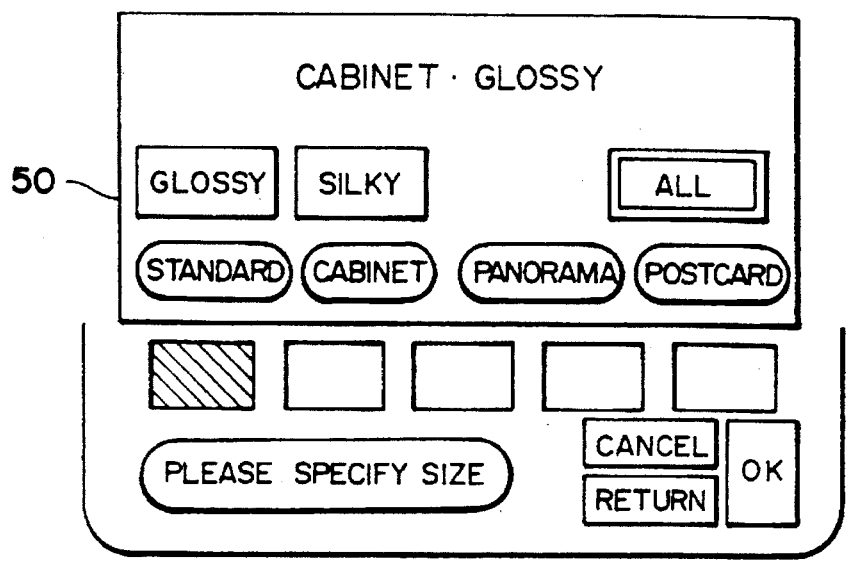
FIG. 23 is a drawing to show an example of indication in the embodiment.

At Step 16 the controller 13 displays "Please specify print size" on the display 15. On this occasion, a size selection screen 50 is indicated as overlapping with the image in the frame as hatched in the drawing (FIG. 23: #207). On the size selection screen 50, the print size may be selected from "service size", "cabinet size", "panorama size" and "postcard size". Also, the type of print paper can be selected from "glossy" and "silk-finish" on the size selection screen 50. If "All" is selected on the size selection screen 50, all frames are printed in the same print size on the same type of print paper. Although FIG. 23 shows the size selection screen 50 separately from the image in the frame, the size selection screen 50 is actually indicated at the position of the hatched frame image. Repeating this, the orderer can select the print size and the type of print paper for each frame. Then the controller 13 proceeds to Step 17.

[Step 17]

At step 17 the controller 13 indicates "Finished? If Yes, please press 'OK'" on the display 15. Here, if the 'OK' is pressed, the controller 13 proceeds to Step 18.

[Step 18]

At Step 18 the controller 13 stores the print size and the type of print paper for each frame selected on the touch panel 16, in the memory 14. If "All" is selected at Step 16, the controller 13 stores in the memory 14 such information that all frames should be printed in the same print size and on the same type of print paper. Then the controller 13 proceeds to Step 19.

[Step 19: #208]

Figure 24:
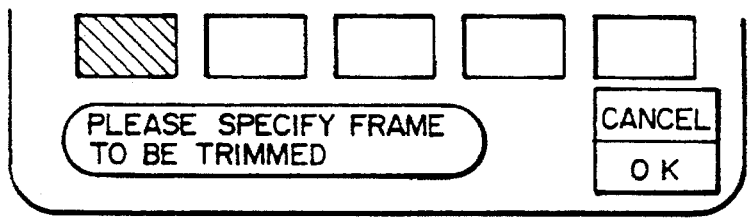
FIG. 24 is a drawing to show an example of indication in the embodiment.

At Step 19 the controller 13 indicates "Please select a frame to be trimmed. Please press OK key if trimming selection is finished or if no trimming is necessary." on the display 15, as shown in FIG. 24. Here, if the 'OK' is pressed, the controller 13 proceeds to Step 30. In contrast, if a trimming frame is pressed, the controller 13 proceeds to next Step 20.

[Step 20: #209]

Figure 25:
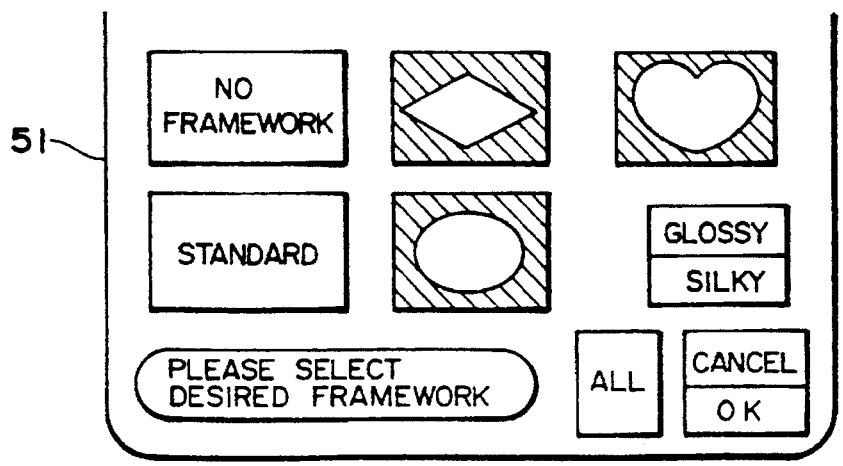
FIG. 25 is a drawing to show an example of indication in the embodiment.

At Step 20 the controller 13 indicates a framework selection screen 51 and an indication of "Please select a desired framework" on the display 15, as shown in FIG. 25, and proceeds to Step 21. On the framework selection screen 51, the type of print paper can be selected from "glossy" and "silk-finish" for a selected frame.

[Step 21]

At Step 21 the controller 13 inverts indications except for a selected framework, based on a signal from the touch panel 16. Alternatively, the contrast of the indications may be arranged to be lowered instead of the inversion of the indications. Then the controller 13 proceeds to Step 22.

[Step 22]

At Step 22 the controller 13 indicates "Finished? If Yes, please press 'OK'" on the display 15. Here, if 'OK' is pressed, the controller 13 proceeds to Step 23.

[Step 23]

At Step 23 the controller 13 stores in the memory 14 the information concerning the selection of framework and the information concerning the type of print paper as input through the touch panel 16. These information pieces are stored in an address associated to each frame. Then the controller 13 proceeds to Step 24.

[Step 24]

At Step 24 the controller 13 indicates an enlarged image of the selected frame on the display 15 and also indicates a shape of thus selected frame on the framework selection screen 51 as superimposed over the indication of selected frame, and then proceeds to Step 25. The indication is inverted in the outside region of the framework overlapping with the enlarged image 85 of the indicated frame. The tone of the outside region may be arranged to be lowered instead of the inversion of indication, or the outside region may be arranged as to be indicated as crosshatched. The trimming selection screen 52 in FIG. 26 includes an indication of trimming instruction key 61 below the image 85 of frame. The trimming instruction key 61 is used for selection concerning "trimming" and for selection concerning "memo framework setting".

If "trimming" in the trimming instruction key 61 is pressed, the controller 13 proceeds to Step 25. Also, if "memo framework setting" is pressed, the controller 13 proceeds to Step 29.

[Step 25]

At Step 25 the controller 13 changes an indication 90 of framework on the display 15, based on inputs through a framework movement instruction key 62, a framework rotation instruction key 63 and a magnification instruction key 64 (inputs from the touch panel 16) as indicated below the image 85 of frame on the display 15. If either key in the framework movement instruction key 62 is pressed, the controller 13 proceeds to Step 26. Also, if either key in the framework rotation instruction key 63 is pressed, the controller 13 proceeds to Step 27. If either key in the magnification instruction key 64 is pressed, the controller 13 proceeds to Step 28.

Here, if 'OK' is pressed, the controller 13 proceeds to Step 32.

[Step 26]

At Step 26 the controller 13 moves the indication 90 of framework on the display 15 vertically and horizontally relative to the indication 85 of frame, based on an input through the framework movement instruction key 62 (an input from the touch panel 16). Then the controller 13 proceeds to Step 25.

[Step 27]

At Step 27 the controller 13 rotates the indication 85 of frame on the display 15 relative to the indication 90 of the framework, based on an input through the framework rotation instruction key 63 (an input from the touch panel 16). For the rotation, it is conceivable that the indication 90 of framework is rotated relative to the indication 85 of frame, which is not preferable because an inclination degree of screen relative to the framework cannot be readily discriminated. Then the controller 13 proceeds to Step 25.

[Step 28]

At Step 28 the controller 13 magnifies or demagnifies the indication 90 of framework, based on an input through the magnification indication key 64 (an input from the touch panel 16). The indication 90 of framework is magnified or demagnified while keeping the length-to-width ratio of framework equal to the length-to-width ratio of the print size selected at Step 16. Alternatively, the indication 85 of frame may be magnified or demagnified based on the input through the magnification indication key 64.

[Step 29]

At Step 29 the controller 13 changes the shape of indication 90 of framework, based on an input through the memo framework setting shape indication key 65 indicated outside the image 85 of frame on the display 15 (an input from the touch panel 16). Here, if a rectangle is selected in the memo framework setting shape indication key 90, the controller 13 proceeds to Step 30; if a triangle is selected, the controller 13 proceeds to Step 31.

Figure 26:
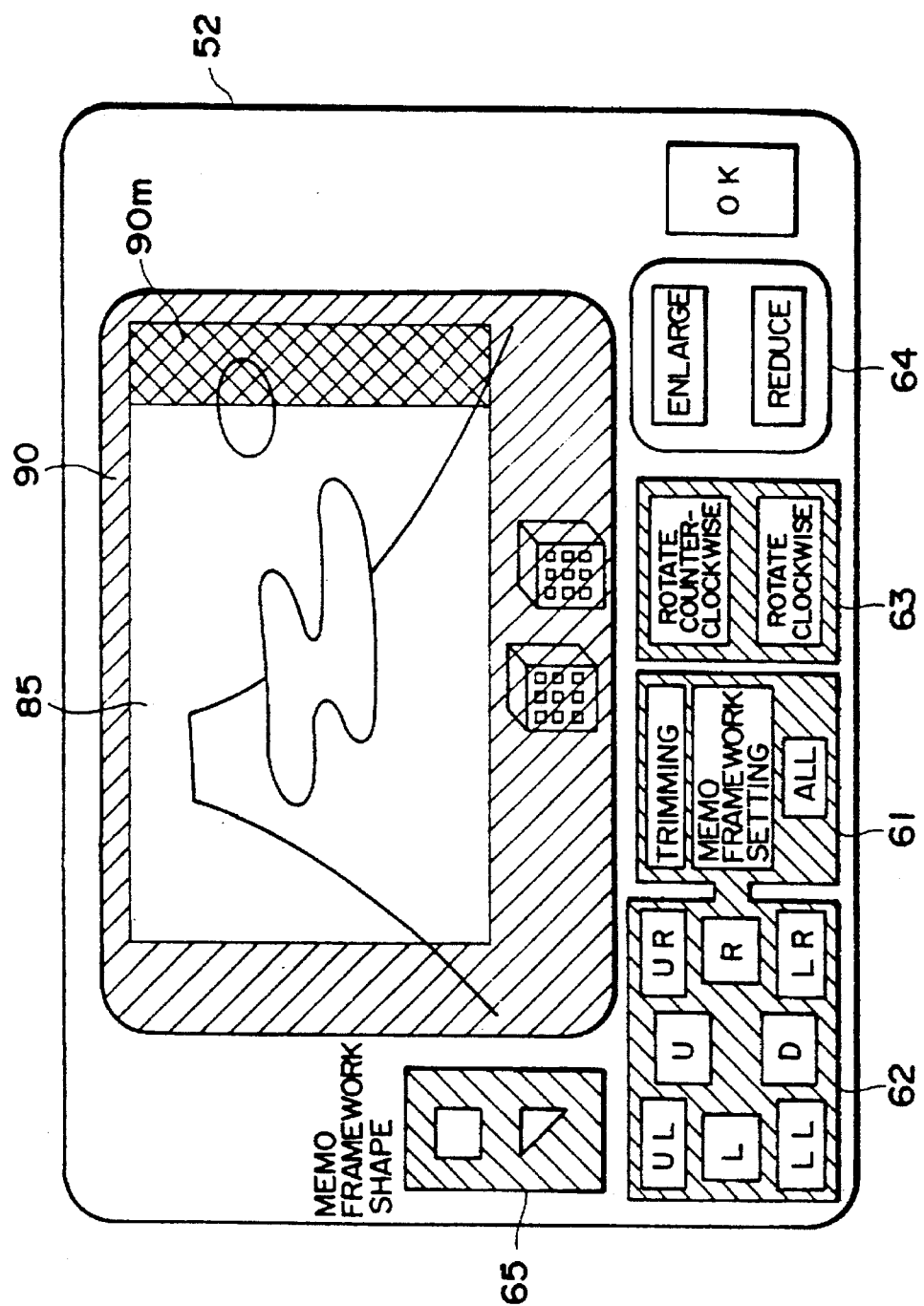
FIG. 26 is a drawing to show an example of indication in an embodiment according to the present invention.
Figure 30A:
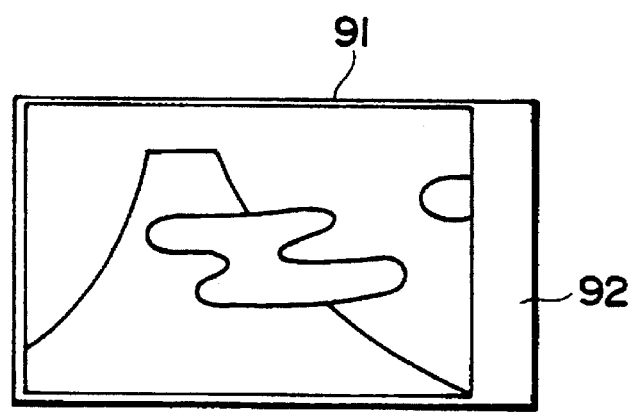
FIGS. 30A and 30B are drawings each to show an example of print in the present embodiment.
Figure 30B:
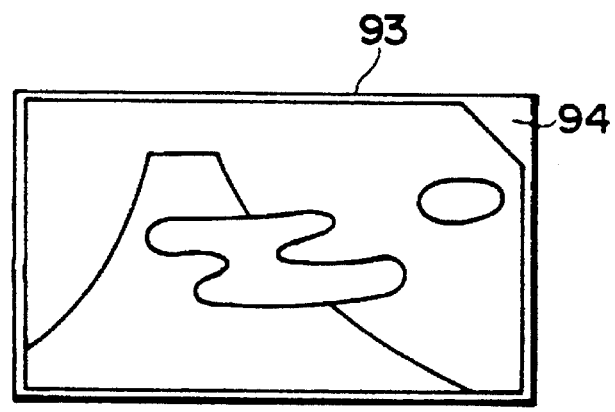

If a rectangular memo framework is selected through the memo framework setting shape instruction key 65, a rectangular memo framework 92 (blank space) is formed on the print 91, as shown in FIG. 30A. Also, if a triangular memo framework is selected through the memo framework setting shape instruction key 65, a triangular memo framework 94 (blank space) is formed on the print 93 as shown in FIG. 30B. The trimming selection screen 52 shown in FIG. 26 shows a case in which the shape of memo framework is rectangular.

[Step 30]

Returning to FIG. 26, at Step 30 the controller 13 changes the size of memo framework indication 90m, based on an input through the framework movement instruction key 62 as indicated below the image 85 of frame on the display 15. For example, if "left" is pressed, the memo framework 90m moves to the left as shown. Here, if 'OK' is pressed, the controller 13 proceeds to Step 32.

[Step 31]

At Step 31 the controller 13 changes the size of indication of memo framework, based on an input through the framework movement instruction key 62 as indicated below the image 85 of frame on the display 15. For example, if "upper right" is pressed, the inverted triangular memo framework moves to the upper right. Here, if 'OK' is pressed, the controller 13 proceeds to Step 32.

In case "All" is pressed at above Step 30 or 31, the controller 13 stores in the memory 14 information that the framework setting selected at Step 30 or 31 is to be conducted for all frames.

[Step 32]

At Step 32 the controller 13 stores in the memory 14 the information concerning the trimming and the information concerning the memo framework setting as selected through the touch panel 16. These information pieces are stored in an address associated to each frame. Here, the controller 13 indicates "trimmed" on the image of frame as instructed for trimming and for memo framework setting in a superimposed manner. Then the controller 13 proceeds to Step 19.

In the present embodiment, above Step 19 to Step 32 are repeated until the selections concerning the trimming and the memo framework setting are finished.

Although the present embodiment is so arranged that the selection of memo framework setting is carried out after the selection concerning the trimming, the selection concerning the trimming may be arranged to be carried out after the selection of memo framework setting.

The orderer presses 'OK' at Step 19 to end the selections concerning the trimming and the memo framework setting. This makes the controller 13 proceed to Step 33.

[Step 33: #210]

Figure 27:
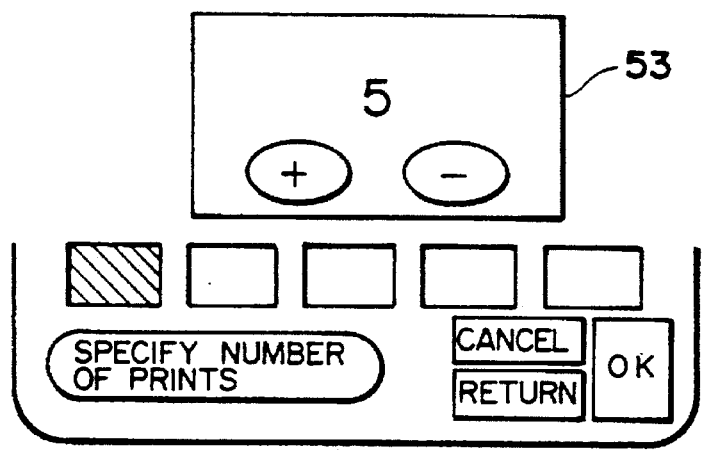
FIG. 27 is a drawing to show an example of indication in an embodiment according to the present invention.

At Step 33 the controller 13 indicates "Please set the number of prints" on the display 15 (#211). A print number selection screen 53 is indicated in a superimposed manner over each image of frame, as shown in FIG. 27. FIG. 27 shows the print number selection screen 53 separately of each image of frame, but the print number selection screen 53 is actually indicated at the position of image of frame in the hatched region. Through this step, the orderer can select the number of prints for each frame. Then the controller 13 proceeds to Step 34.

[Step 34: #212]

At Step 34 the controller 13 indicates "Finished? If Yes, please press 'OK'" on the display 15. Here, if 'OK' is pressed, the controller 13 proceeds to Step 35.

[Step 35]

At Step 35 the controller 13 stores in the memory 14 the number of prints for each frame selected through the touch panel 16, and then proceeds to Step 36.

[Step 36]

At Step 36 the controller 13 drives the film feed motor 17a and also drives the film feed motors 18a, 19a through the driver 20 to start rewinding the film strip 100 into the cartridge 128. Then the controller 13 proceeds to Step 37.

[Step 37]

At Step 37 the controller 13 makes the information writing unit 12 convert thee print size and the print number for each frame stored in the memory 14 into print information for each frame. Then the controller 13 writes through the magnetic head 10 the print information in the magnetic layer on the film strip 100 frame by frame. Specifically, the print information of each frame is written on the region 71c–74c shown in FIG. 16B. After the writing operation of print information in the film strip 100 is finished, the controller 13 temporarily stops the rewinding of the film strip 100 by the film feed motors 17a, 18a and 19a, and then proceeds to Step 38.

[Step 38: #213]

Figure 28:
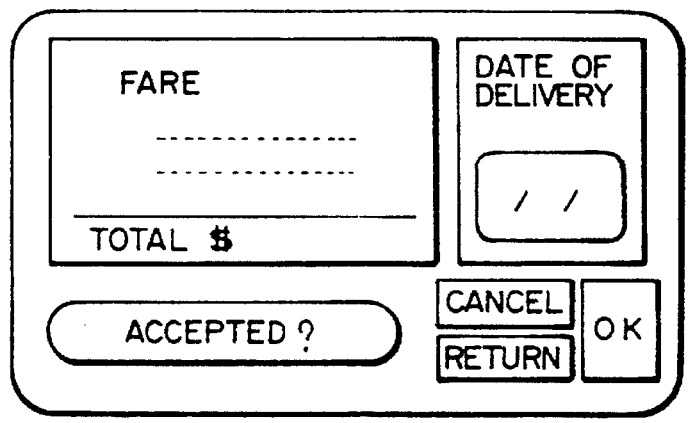
FIG. 28 is a drawing to show an example of indication in an embodiment according to the present invention.

At Step 38 the controller 13 calculates a print fare from the print size and the print number for each frame stored in the memory 14, and indicates it on the display 15, as shown in FIG. 28. Here, the thus calculated print fare is stored in the memory 14. Then the controller 13 proceeds to Step 39.

[Step 39]

At Step 39 the controller 13 indicates "Accepted? If Yes, please press 'OK'" on the display 15. Here, if 'OK' is pressed, the controller 13 proceeds to Step 40.

[Step 40]

At Step 40 the controller 13 makes a decision as to if a user card is inserted in the user card reading unit 22.

It is assumed in the present embodiment that no user card is inserted. Then the controller 13 proceeds to Step 41. If a user card is inserted, the controller 13 proceeds to Step 45.

[Step 41: #214]

Figure 29:
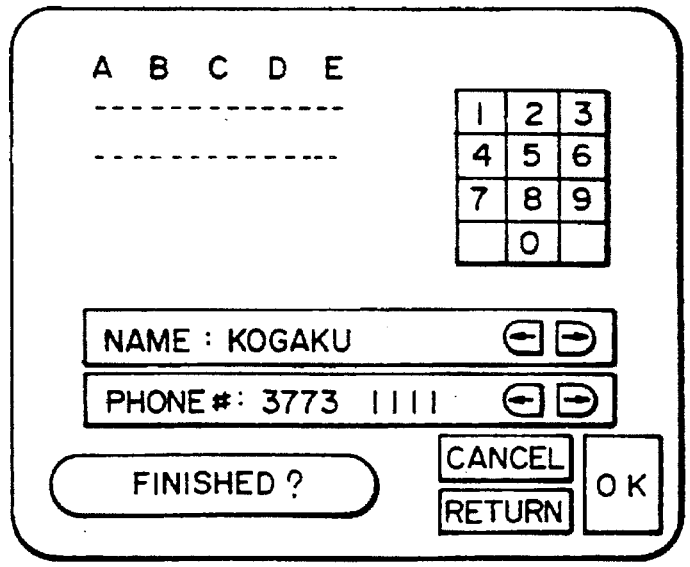
FIG. 29 is a drawing to show an example of indication in an embodiment according to the present invention.

At Step 41 the controller 13 indicates "Please input your name and telephone number" on the display 15. A name input screen as shown in FIG. 29 is indicated on the display 15.

After the orderer inputs his or her name and telephone number through the touch panel 16, the controller 13 proceeds to next Step 42.

[Step 42]

At Step 42 the controller 13 indicates "Finished? If Yes, please press 'OK'" on the display 15. Here, if 'OK' is pressed, the controller 13 proceeds to Step 43.

[Step 43: #215]

At Step 43 the controller 13 indicates "Do you want a user card? (y/n?)" on the display 15. If the orderer selects (y), the controller proceeds to Step 44 (#216). In contrast, if the orderer selects (n), the controller 13 proceeds to Step 46.

[Step 44]

At Step 44 the controller 13 produces a user card in which the name and the telephone number input by the orderer are stored, through the user card read and write unit 22, and then proceeds to Step 46.

[Step 45]

At Step 45 the controller 13 reads the name and the telephone number stored in the user card through the user card read and write unit 22, and stores them in the memory 14. Then the controller 13 proceeds to next Step 46.

[Step 46]

At Step 46 the controller 13 writes the customer information of the orderer's name and telephone number and a reception number for identifying the orderer in the leading end portion of the film strip 100 through the magnetic head 10 and the information writing unit 12. The controller 13 drives the film feed motors 17a, 18a and 19a to rewind the film strip 100 fully into the cartridge 128. Then the controller 13 proceeds to next Step 47.

[Step 47: #217]

At Step 47 the controller 13 issues a claim check by the claim check printing unit 22, based on the information stored in the memory 14. Here, there are the print fare, the orderer's name and telephone number, and the reception number printed on the claim check. Then the controller 13 proceeds to Step 48.

[Step 48]

At Step 48 the controller 13 discharges the claim check through the slot portion 24 shown in FIG. 17B. If a user card is inserted at Step 2 or if a user card is produced at Step 41, the user card is also discharged through the slot portion 24. Then the controller 13 proceeds to Step 49.

[Step 49]

At Step 49 the controller 13 gives voice output of "Thank you" from an unrepresented voice output unit.

The control apparatus in the present embodiment is provided with a mechanism for discharging the cartridge 128. This mechanism is shown in FIGS. 31A and 31B. The cartridge 128 is placed in a nearly concave recess 28 below the cover portion 25. An actuator 27a for driving an ejection rod 27b is disposed on the left of cartridge 128. A door 29 is disposed on the right of cartridge 128 such that it is rotatable about a selected axis and is urged clockwise. The actuator 27a is controlled by the controller 13. In FIGS. 31A and 31B, the rollers 18b, 18c shown in FIG. 18 are disposed below a groove 30 given underneath the cartridge 128.

Next, after the controller 13 completes the execution of above Step 49, it proceeds to next Step 50.

[Step 50]

At Step 50 the controller 13 moves the ejection rod 27b of the actuator 27a to the right in the drawing, as shown in FIG. 31B, so as to push the cartridge 128 out of the recess 28. This makes the cartridge 128 move in the direction of the arrow in the drawing to push the door 29 to open, so that the cartridge drops into a DP envelope 40.

On this occasion, the DP envelope printing unit 31 controlled by the controller 13 prints the orderer's name and telephone number and the reception number on the DP envelope 40.

Thus, the DP envelope 40 with the cartridge 128 therein is stored in a DP envelope storage box 41.

With execution of above Step 1 to Step 50 by the apparatus according to the present embodiment, the orderer can make an order of printing of film before development.

Embodiment 4

Figure 32:
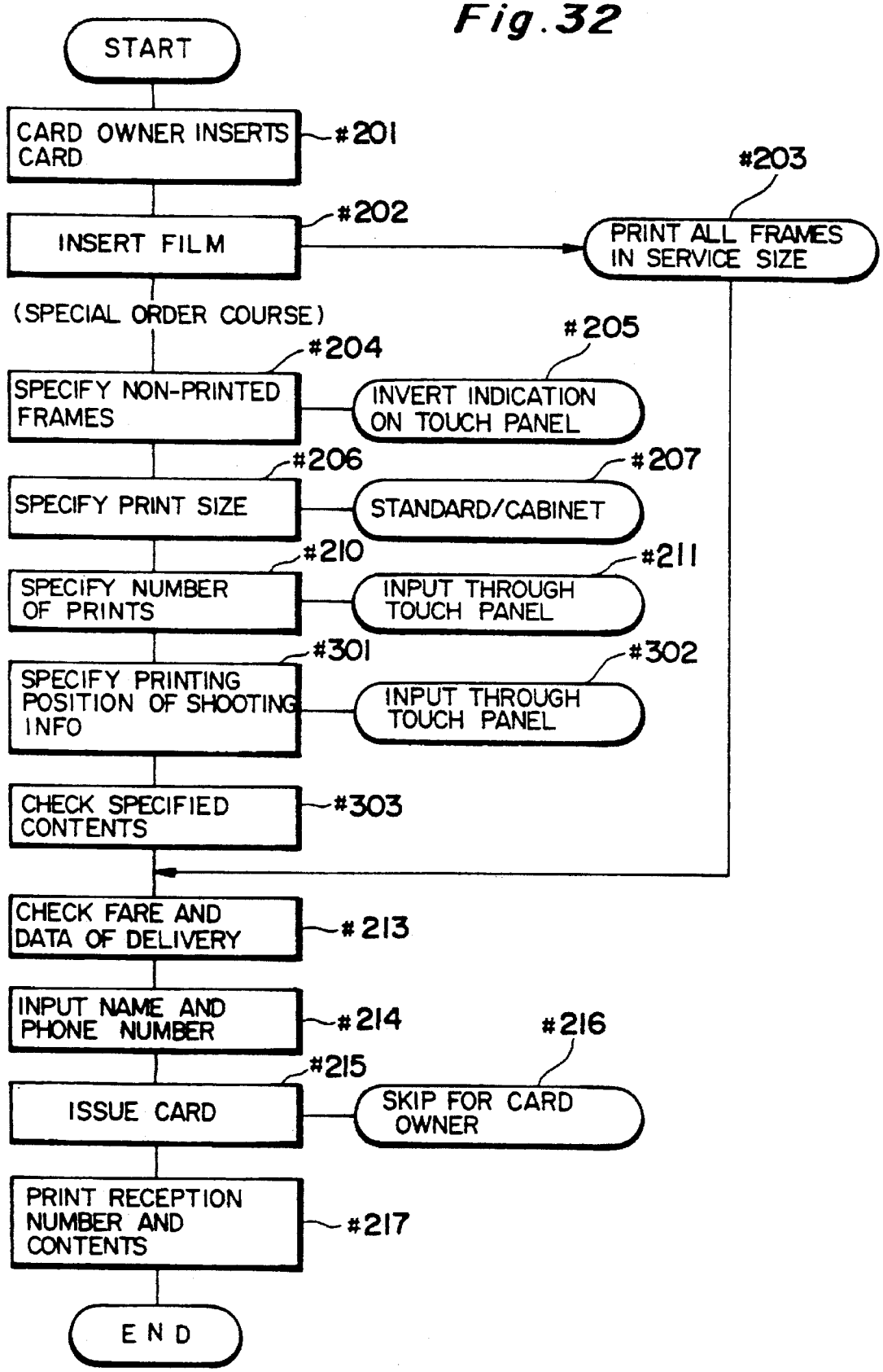
FIG. 32 is a flowchart to illustrate the present embodiment.

Information concerning shooting can also be recorded in the film strip 100 by the control apparatus as described as an example in Embodiment 3. An embodiment for such a case is described based on the flowchart shown in FIG. 32. Since a part of this flow overlaps with the above-described flow (FIG. 19), only a portion of the flow different from the previous flow is described below. In FIG. 32, the same steps as those in FIG. 19 are denoted by the same reference numerals.

[Step 1]

At Step 1 the controller 13 indicates "Please select whether you want to include shooting information upon printing or not" as shown in FIG. 33 on the display 15. If the orderer selects "Yes", the controller 13 proceeds to next Step 2. If the orderer selects "No", the controller 13 proceeds to Step 27.

The present embodiment is described as to a case that the orderer selects "Yes".

[Step 2]

At Step 2 the controller 13 reads the second image information for each frame stored in the memory 14 and indicates the image information in respective regions 85-87 on the display 15 as shown in FIG. 34. Then the controller proceeds to next Step 3.

[Step 3]

At Step 3 the controller 13 inverts indications of frames except for a selected frame, based on selection information from the touch panel 16, and then proceeds to next Step 4.

[Step 4]

At Step 4 the controller 13 indicates "Finished? If Yes, please press 'OK'" on the display 15. If 'OK' is pressed the controller 13 proceeds to Step 5.

[Step 5]

At Step 5 the controller 13 indicates a menu screen as shown in FIG. 35 on the display 15.

If the orderer selects "1. year/month/day/time", the controller 13 proceeds to Step 6. If "2. aperture/shutter speed/ film or other shooting and environment data" is selected, the controller 13 proceeds to Step 13. If "3. positional information of GPS or electronic compass" is selected, the controller 13 proceeds to Step 15. If "4. character information (comments)" is selected, the controller 13 proceeds to Step 20. If "5. voice information" is selected, the controller 13 proceeds to Step 22.

If "End" is selected on the menu screen in FIG. 35, the controller 13 proceeds to Step 27.

[Step 6]

At Step 6 the controller 13 indicates a menu screen as shown in FIG. 36 and a message of "Please select indication styles" on the display 15. With the menu screen in FIG. 36, the ordered can select an indication style of year, an indication style of month and day and an indication style of time independently of each other. After that, the controller 13 proceeds to next Step 7.

[Step 7]

At Step 7 the controller 13 indicates selected indication styles of year, month and day, and time in the lower portion of menu screen, based on inputs through the touch panel 16. Then the controller 13 proceeds to next Step 8.

[Step 8]

At Step 8 the controller 13 indicates "Finished? If Yes, please press 'OK'" on the display 15. If 'OK' is pressed, the controller 13 proceeds to Step 9.

[Step 9]

Figure 37:
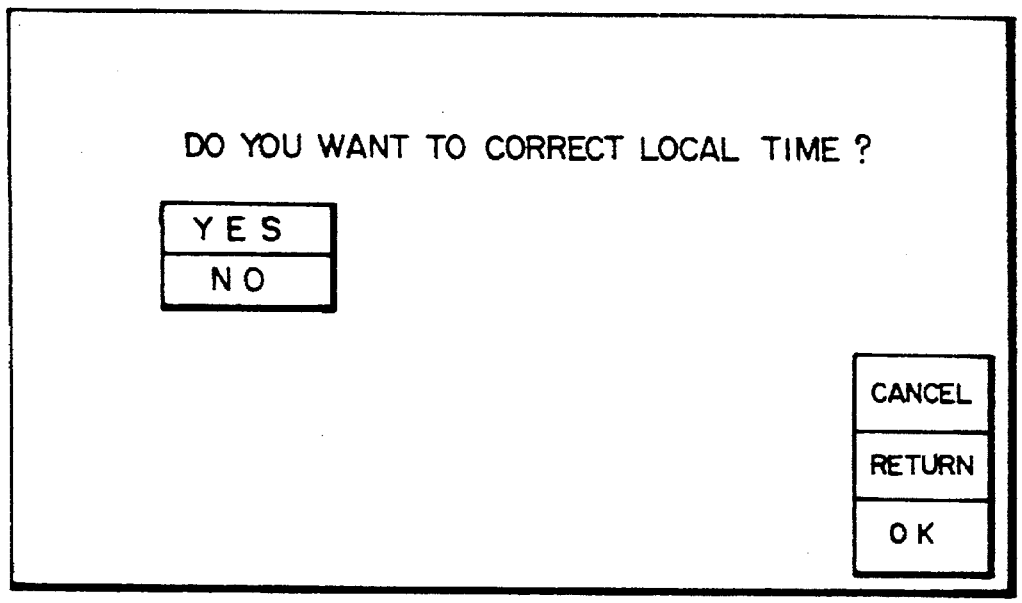
FIG. 37 is a drawing to show an example of indication in the embodiment.

At Step 9 the controller 13 indicates "Do you want to correct local time?" on the display 15, as shown in FIG. 37. If "Yes" is selected, the controller 13 proceeds to next Step 10; if "No" is selected, the controller 13 stores in the memory 14 the selected output information concerning the shooting time (hereinafter referred to as shooting time information), and then proceeds to Step 5.

[Step 10]

Figure 38:
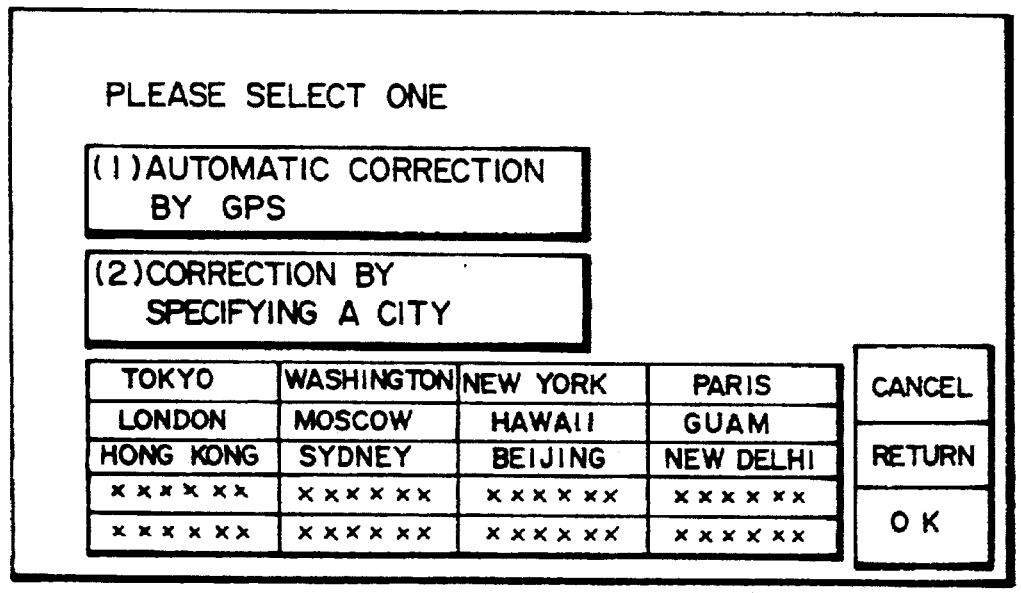
FIG. 38 is a drawing to show an example of indication in the embodiment.

At Step 10 the controller 13 indicates a selection menu of correction methods as shown in FIG. 38, on the display 15. If "(1) automatic correction by GPS" is selected, the controller 13 proceeds to next Step 11. If "(2) correction by instructing a local area" is selected, the controller proceeds to Step 12.

[Step 11]

At Step 11 the controller 13 corrects the shooting time information in the shooting information, based on the information concerning the shooting location in the shooting information, to obtain a local time at the shooting location, and stores corrected shooting time information in the memory 14. If 'OK' is pressed then the controller 13 proceeds to Step 5.

[Step 12]

At Step 12 the controller 13 indicates twenty major cities in the world on the display 15. Based on information of a city selected by the orderer, the controller 13 corrects the shooting time to obtain a local time of the selected city and stores corrected shooting time information in the memory 14. Here, if 'OK' is pressed, the controller 13 proceeds to Step 5.

[Step 13]

At Step 13 the controller 13 indicates "Which data do you want to include among the data upon shooting?" as shown in FIG. 39, on the display 15. If the orderer selects "aperture/ shutter speed/type of film", the controller 13 stores in the memory 14 shooting data information concerning the aperture, the shutter speed and the type of film among the output information concerning the shooting data (hereinafter referred to as shooting data information), and thereafter proceeds to Step 24. If the orderer selects "select all", the controller 13 proceeds to Step 14.

[Step 14]

At Step 14 the controller 13 indicates "All shooting data will be recorded on the back" on the display 15, and stores in the memory 14 output information that all shooting data is to be recorded on the back. Then the controller 13 proceeds to Step 24.

[Step 15]

Figure 40:
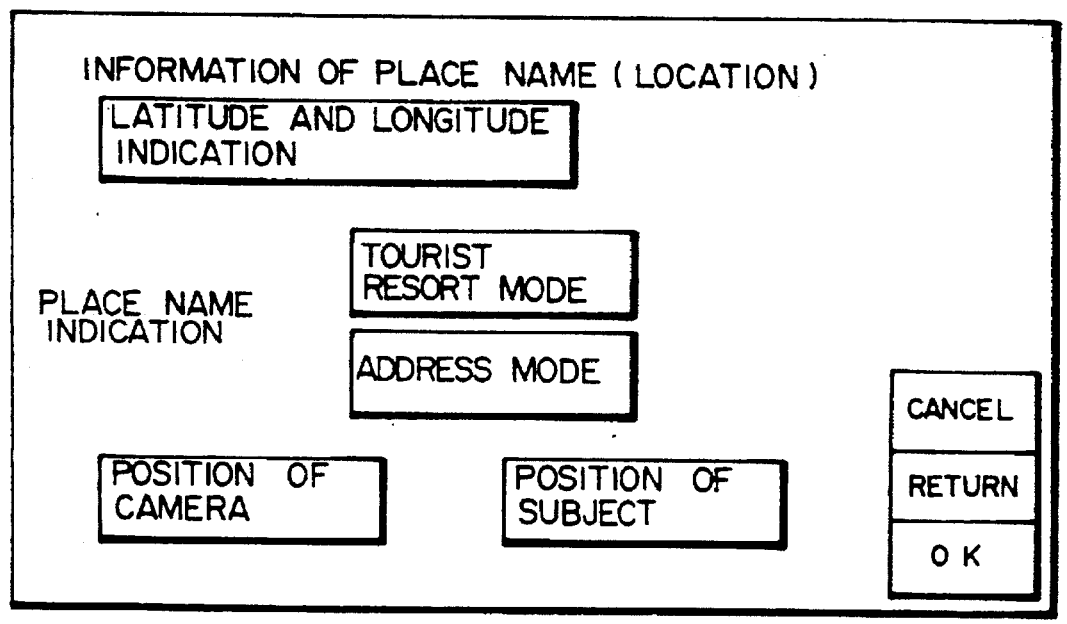
FIG. 40 is a drawing to show an example of indication in the embodiment.

At Step 15 the controller 13 indicates a selection menu of place name (location) as shown in FIG. 40, on the display 15. If "latitude and longitude indication" is selected, the controller 13 proceeds to next Step 16; if "tourist resort mode" is selected, the controller 13 proceeds to Step 17. If "address mode" is selected, the controller 13 proceeds to Step 18.

[Step 16]

At Step 16 the controller 13 stores in the memory 14 output information that the information concerning the shooting location in the shooting information (hereinafter referred to as shooting location information) is to be indicated by the latitude and the longitude, and then proceeds to Step 19. An output style on this occasion may be for example an indication of North Latitude 35°20' and East Longitude 135°10'.

[Step 17]

At Step 17 the controller 13 stores in the memory 14 output information that the shooting location information is to be indicated by the tourist resort name, and then proceeds to Step 19.

An output style on this occasion may be for example an indication of Shot Place: Kyoto.

[Step 18]

At Step 18 the controller 13 stores in the memory 14 output information that the shooting location information is to be indicated by the name of a prefecture and the name of a city as converted, and then proceeds to Step 19.

An output style on this occasion may be for example an indication of Place: Kyoto Prefecture, Kyoto City.

[Step 19]

At Step 19 the controller 13 indicates a position correction menu below the selection menu of place name (location) in FIG. 40. If "position of camera" is selected, the controller 13 stores in the memory 14 output information that the shooting location information is to be indicated by the position of the camera. If "position of subject" is selected, the controller stores in the memory 14 output information that the shooting location information is to be indicated by the position of subject. Then the controller 13 proceeds to Step 24.

[Step 20]

Figure 41:
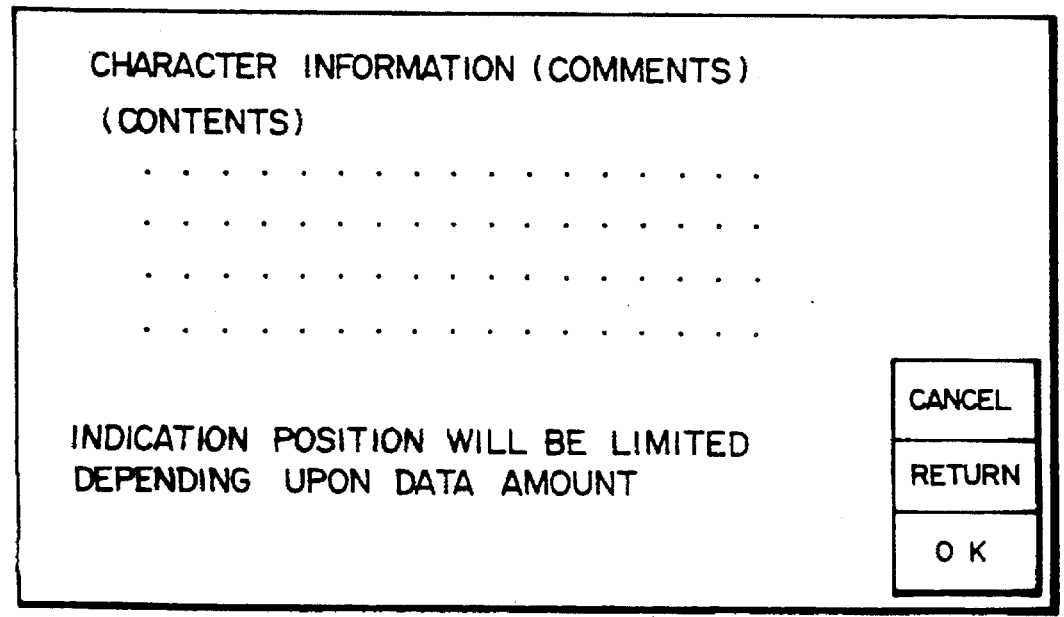
FIG. 41 is a drawing to show an example of indication in the embodiment.

At Step 20 the controller 13 indicates character information in the shooting information as shown in FIG. 41, on the display 15, and then proceeds to next Step 21.

[Step 21]

At Step 21 the controller 13 makes a decision as to how much data of character information is stored in the shooting information. If the indicated character information surpasses a predetermined data amount, the controller 13 stores in the memory 14 output information that all character information is to be recorded on the back, and then proceeds to Step 25. If the indicated character information is less than the predetermined data amount, the controller 13 proceeds to Step 24.

[Step 22]

Figure 42:
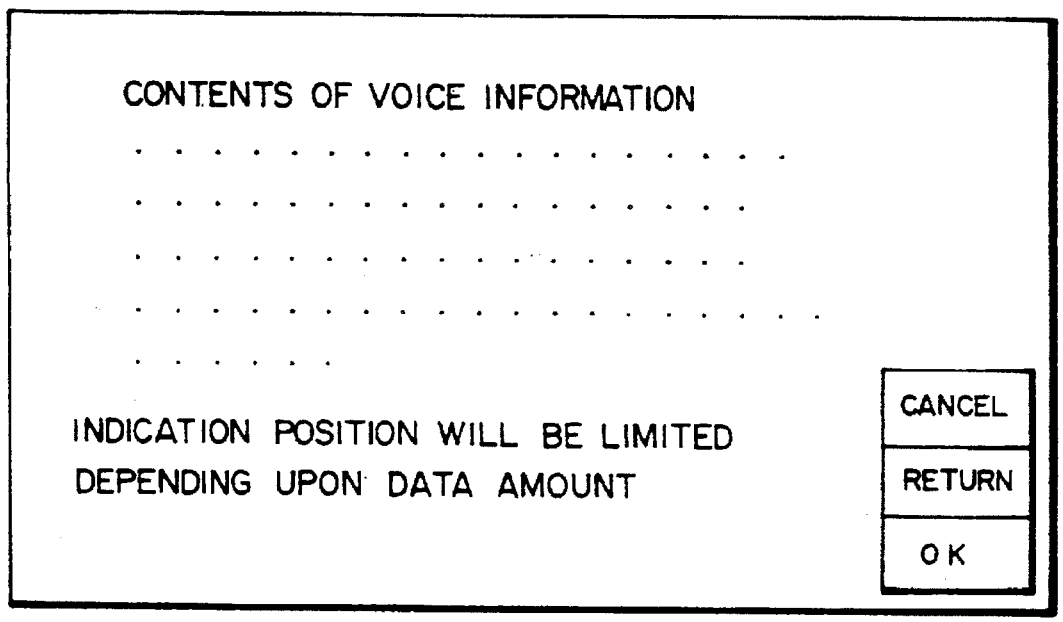
FIG. 42 is a drawing to show an example of indication in the embodiment.

At Step 22 the controller 13 indicates the voice information in the shooting information on the display 15, as shown in FIG. 42, and then proceeds to next Step 23.

[Step 23]

At Step 23 the controller 13 makes a decision as to how much data of voice information exists in the shooting information. If the indicated voice information surpasses a predetermined data amount, the controller 13 stores in the memory 14 output information that all voice information is to be recorded on the back, and then proceeds to Step 25. Also, if the indicated voice information is less than the predetermined data amount, the controller 13 proceeds to Step 24.

[Step 24: #301]

Figure 43:
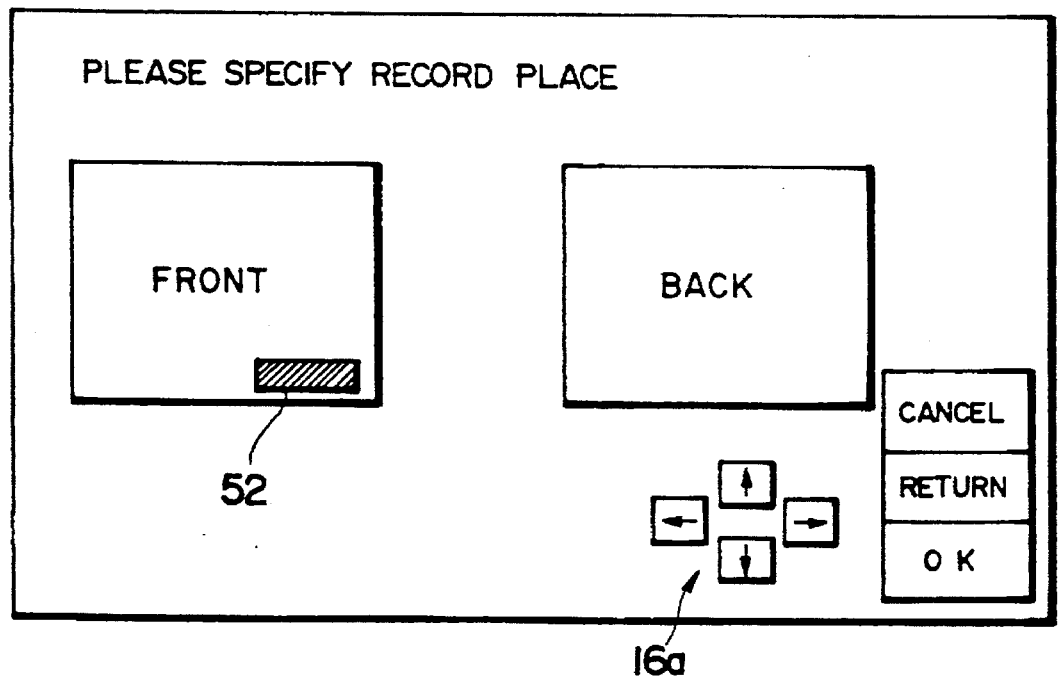
FIG. 43 is a drawing to show an example of indication in the embodiment.

At step 24 the controller 13 indicates "Please specify a record place" on the display 15, as shown in FIG. 43. The controller inverts an indication of region 52 where the selected information is to be recorded. When the orderer manipulates cursor keys 16a (touch panel 16) as shown in FIG. 43, the indicated region 52 moves (#302). This permits the orderer to select a position on the front face or on the back face as the record place of selected information. The size of region 52 is determined based on an amount of selected information. Here, if 'OK' is pressed, the controller 13 stores the output information concerning the record position in the memory 14, and then proceeds to Step 25.

[Step 25]

Figure 44:
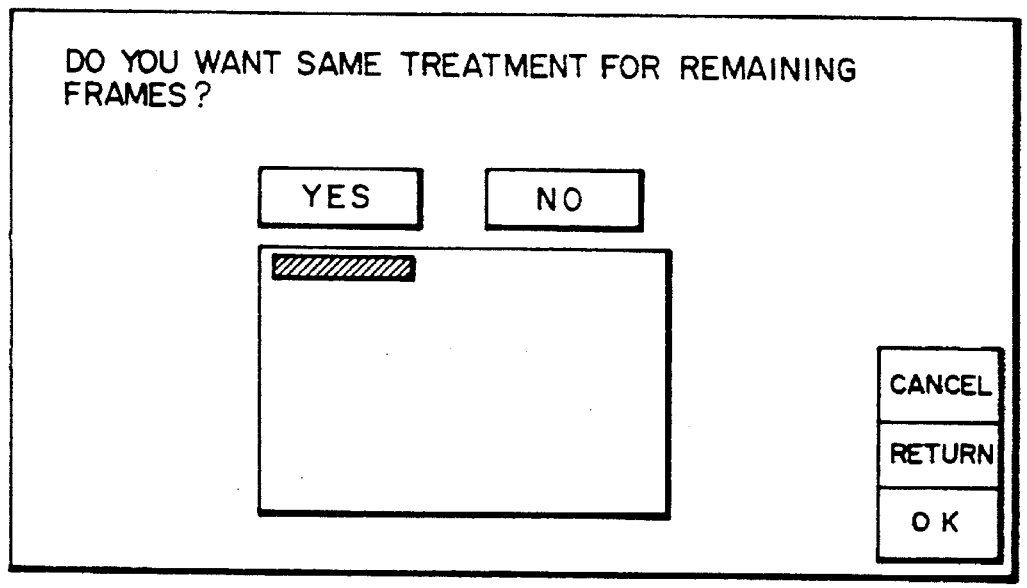
FIG. 44 is a drawing to show an example of indication in the embodiment.

At Step 25 the controller 13 indicates "Do you want same treatment for remaining frames?" on the display 15, as shown in FIG. 44. If "Yes" is selected, the controller 13 stores in the memory 14 output information that the above-described output information (shooting time information, shooting data information, shooting location information, character information, voice information) is common to all frames, and then proceeds to Step 26.

If "No" is selected, the controller 13 stores the output information of the selected frame at Step 3 (shooting time information, shooting data information, shooting location information, character information, voice information) in the memory 14, and then proceeds to Step 26.

[Step 26: #303]

At Step 26 the controller 13 indicates the image of frame and a record content as superimposed thereon on the display 15. If 'OK' is selected, the controller 13 proceeds to Step 22. If "End" is selected, the controller 13 proceeds to Step 27.

[Step 27]

At Step 27 the controller 13 indicates the output information for each frame stored in the memory 14, on the display 15. If 'OK' is pressed, the controller 13 proceeds to Step 49 in the previously described embodiment.

Since the apparatus C in the present embodiment is so arranged that an orderer can make an order while observing the indication of second image information corresponding to the contents (first image information) taken in a film before development, as described above, printing of unnecessary frames such as misshot frames may be avoided. In addition, since the orderer can make an order about a desired size and the number of photographic prints before development of film using the apparatus in the present embodiment, the apparatus has such an advantage that the orderer does not have to go again to the DP agency. Further, the apparatus according to the present embodiment has an advantage that the orderer can select the output style (form) of shooting information while observing the indication of second image information before development of film.

The apparatus C in the above-described embodiment permits the desired print size, the number of prints and the output style of shooting information to be ordered only by orderer's selection. Accordingly, an order of photographic prints can be made after business hours of DP agency.

Even if repetition of reading and writing of print information makes scratches on the film strip 100 in the present embodiment, there would occur no specific problem in printing of negative images as the first image information, because the print information is written in the end portion of film strip 100.

Figure 45B:
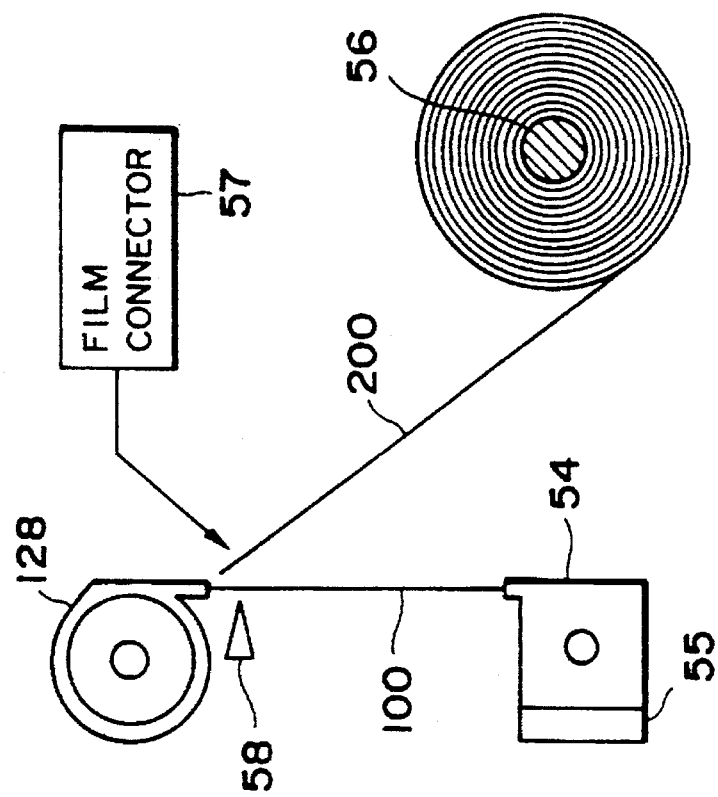
FIGS. 45A and 45B are respectively drawings to diagrammatically show a modification of the embodiment.
Figure 45A:
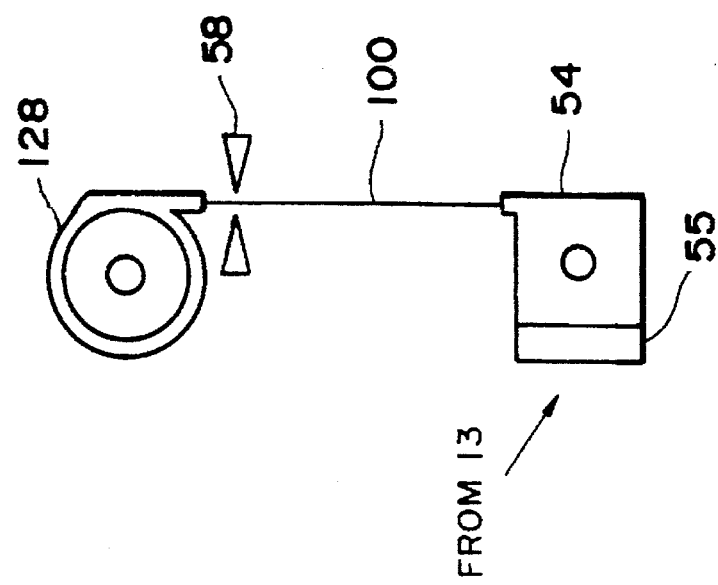

A modification of Embodiments 3 and 4 is next described with reference to FIGS. 45A and 45B. FIG. 45A is a drawing to diagrammatically show the main part of the control apparatus C shown in FIG. 17A.

In FIG. 45A a cartridge 54 replaces the roll shaft 26 in the apparatus shown in FIG. 17A. A memory 55 composed of a nonvolatile RAM is incorporated in the cartridge 54. The above-described embodiment was so arranged that the print information and the customer information was written in the magnetic layer in the film strip 100, but the present modification is so arranged that such information is written in the memory 55. Specifically, the film strip 100 is wound around a shaft of cartridge 54 instead of winding the film strip 100 around the roll shaft 26 at Step 9 in the above embodiment. After execution of the steps in the above embodiment, the controller 13 cuts the film strip 100 by a cutter 53 and winds up the film strip 100 completely into the cartridge 54. Then the controller 13 writes the print information and the customer information in the memory 55.

Also, a possible arrangement is such that an unused film 200 is supplied into the vacant cartridge 128 when the film strip 100 is wound into the cartridge 54 as described. Specifically, the unused film 200 is originally wound around a roll shaft 56, as shown in FIG. 45B. After the film cutting operation shown in FIG. 45A, the film strip 100 left in the cartridge 128 is connected to the unused film 200 by a film connector 57. The film connector 57 connects the films with each other by an adhesive tape. The structure of a preferable film connector is disclosed for example in Japanese Laid-open Patent Application No. 1-102566. By this, an orderer can obtain a new film on the spot. Further, since the cartridge 128 for containing the film is not discarded, the resources can be saved. In an arrangement a number of supplies of new film may be printed for example by a bar code on the outer surface of cartridge 128. Detection of the printed bar code can discriminate a number of uses of cartridge 128. This can avoid an accident such as light leakage due to decaying of cartridge, preliminarily defining the limit of use of cartridge 128 and stopping use over the limit.

An arrangement may be such that an orderer can select the film speed (ISO speed) and the number of frames (photographic frame number) on this occasion. Specifically, preparing unused films of respective speeds, a film with a film speed selected by the orderer is supplied into the cartridge 128. Then the film is cut with a length corresponding to the number of frames selected by the orderer. It is preferred in this arrangement that data about a frame number of each photographic frame is written in the magnetic layer on the film strip.

The above embodiment was described as an example in which the second medium having the second image information was the magnetic layer in the film, but an IC card may be employed as the second medium. In such an arrangement the second image information is stored in the IC card. An orderer sets a film and the IC card in the apparatus according to the present invention, and makes an order while observing an indication of second image information stored in the IC card. Here, the IC card may be incorporated with the cartridge.

Embodiment 5

A print information control apparatus C as described in the present embodiment is provided with an optical writing unit 10b for optically writing predetermined information in a film strip 100 in addition to the structure as described in Embodiments 3 and 4.

Figure 46:
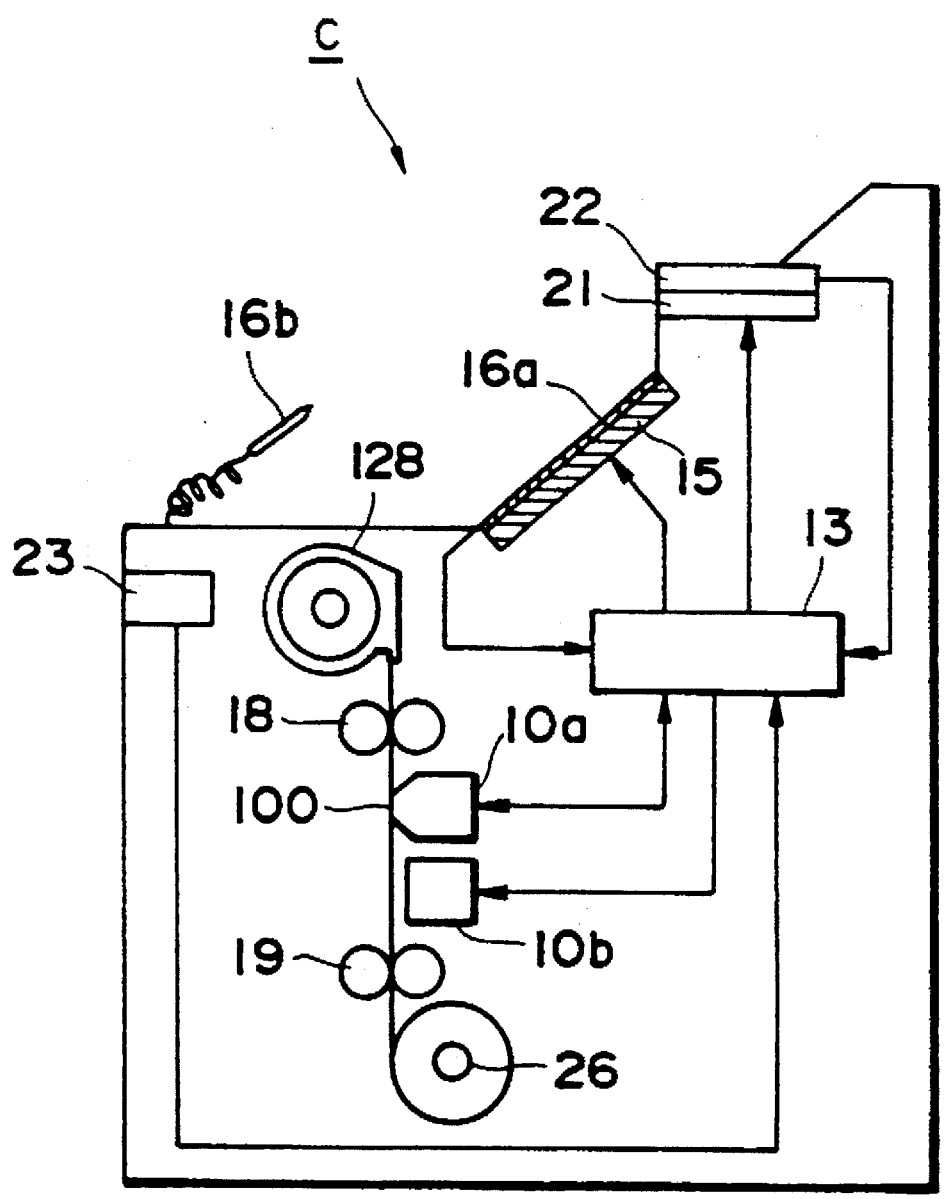
FIG. 46 is a drawing to schematically show the structure of a print information control apparatus according to an embodiment.
Figure 47A:
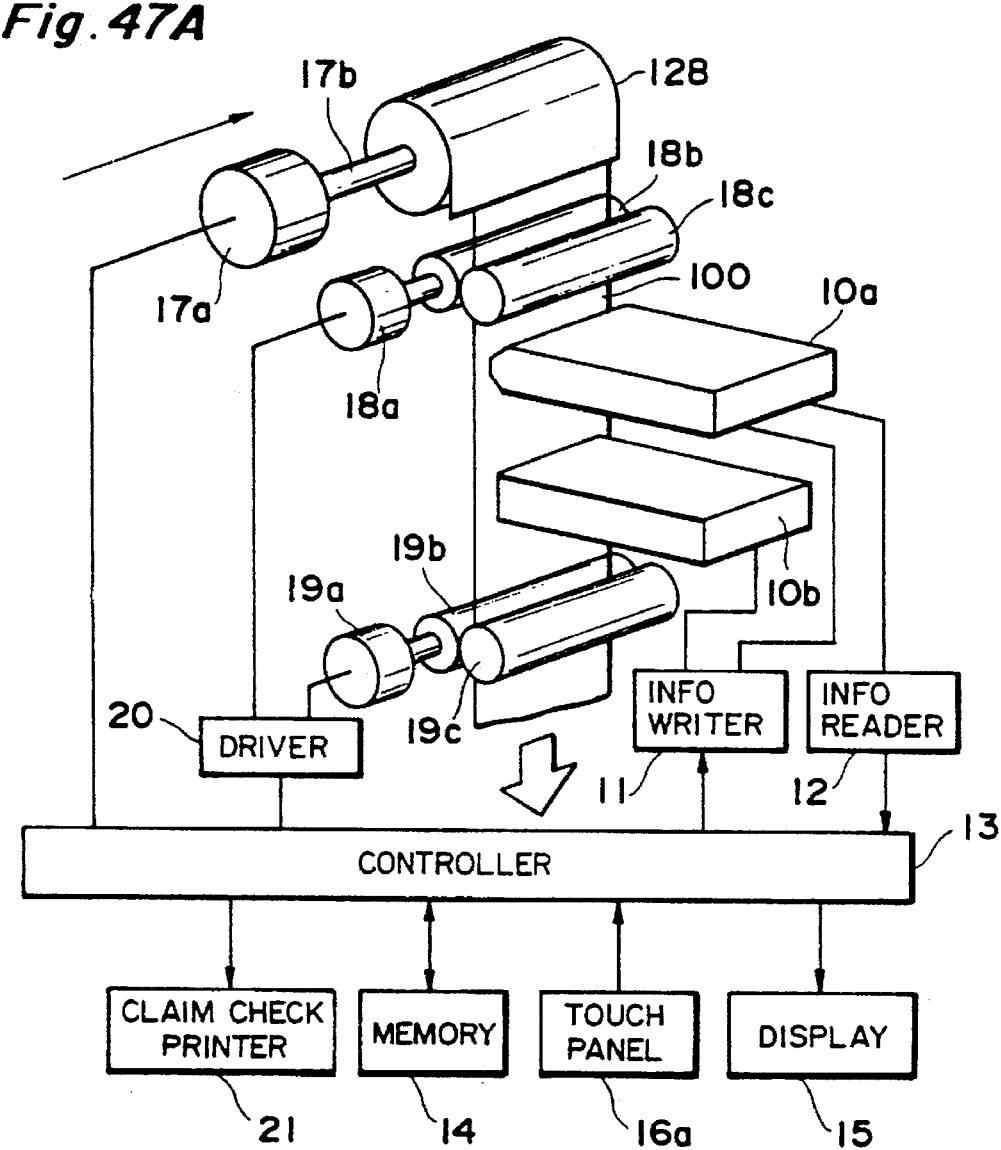
FIG. 47A is a drawing to show a main part of the apparatus shown in FIG. 46 and a control system therefor.
Figure 47B:
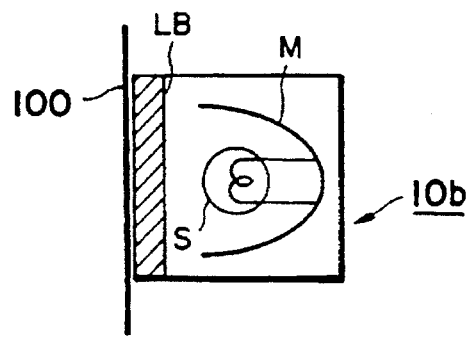
FIG. 47B is a drawing to show an optical writing portion.

FIGS. 46, 47A and 47B show the control apparatus of the present embodiment. The same constituents as those in the apparatus shown in FIGS. 17A and 18 are denoted by the same reference numerals and are omitted to explain herein.

The optical writing unit 10b is disposed between two pairs of film feed rollers. The optical writing unit 10b is composed, for example as shown in FIG. 47B, of a light source S, a reflecting mirror M for making rays of light from the light source S parallel to each other, and a liquid crystal light bulb LB. The optical writing unit 10b is connected to a controller 13 through an information writing unit 11. The liquid crystal light bulb LB in the optical writing unit 10b can change a transmission pattern thereof under control of controller 13 through the information writing unit 11. This arrangement permits a pattern corresponding to editing information to be exposed as superimposed over first image information in the film strip 100. The editing information will be described later.

In another arrangement the optical writing unit 10b may be constructed employing an LED array. Further, the pattern corresponding to editing information by the optical writing unit may be exposed in a non-recorded region (region where no first image information is recorded) on the film strip 100 without a need to be limited to the region where the first image information is recorded on the film strip 100.

The control apparatus C of the present embodiment has such an optical writing unit 10b and a photograph editing function as will be described below. It is described below referring to the flowchart in FIG. 48.

[Step 1]

Similarly in Embodiment 3 as described previously, the film strip 100 is fed out after set. Then the magnetic head 10a reads the second image information and the shooting information from the magnetic layer 112 in the film strip 100 (#401). The thus read information is successively stored in the memory 14.

Figure 49:
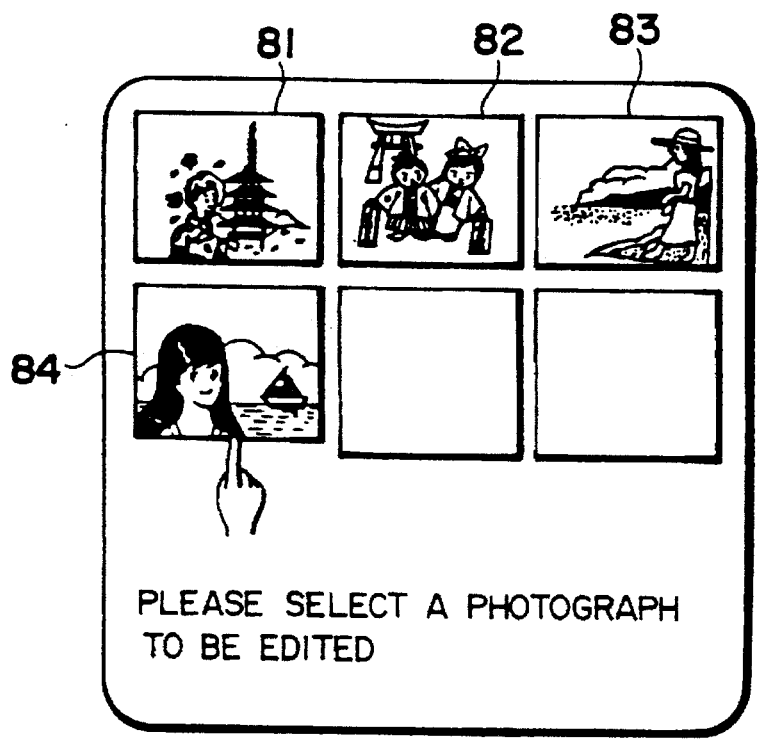
FIG. 49 is a drawing to show an example of indication in the embodiment according to the present invention.

After all shot frames in the film strip 100 are read, a list of second image information of shot frames is indicated on the display 15 (FIG. 49, #402). The controller 13 indicates "Please select a photograph to be edited" on the display 15, and then proceeds to Step 2 (#403).

[Step 2]

Figure 50:
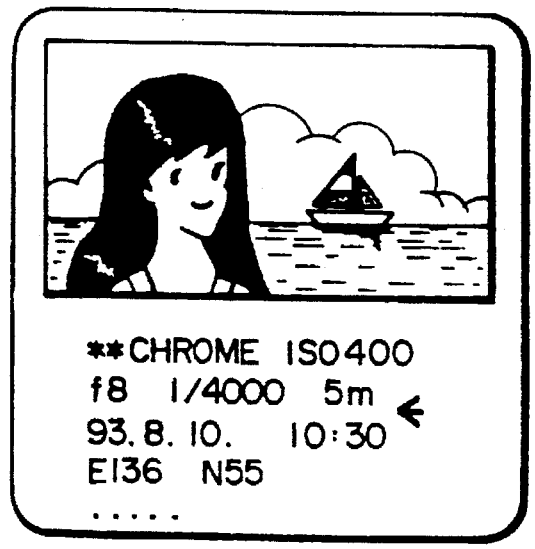
FIG. 50 is a drawing to show an example of indication in the embodiment according to the present invention.

At Step 2 the controller 13 indicates an enlarged image of second image information selected at previous Step 1 on the display 15, as shown in FIG. 50. Then the controller 13 indicates shooting information below the indication (#404). At this Step 2 an orderer can select information desired to be recorded on a print out of the indicated shooting information by means of a touch panel 16a (#405).

Then the controller 13 proceeds to next Step 3.

[Step 3]

At Step 3 the controller 13 stores the shooting information selected through the touch panel 16a in the memory 14, and then proceeds to next Step 4 (#406).

[Step 4]

At Step 4 the controller 13 indicates "Finished? If Yes, please press 'OK'" on the display 15. If 'OK' is pressed, the controller 13 proceeds to Step 5.

[Step 5]

Figure 51:
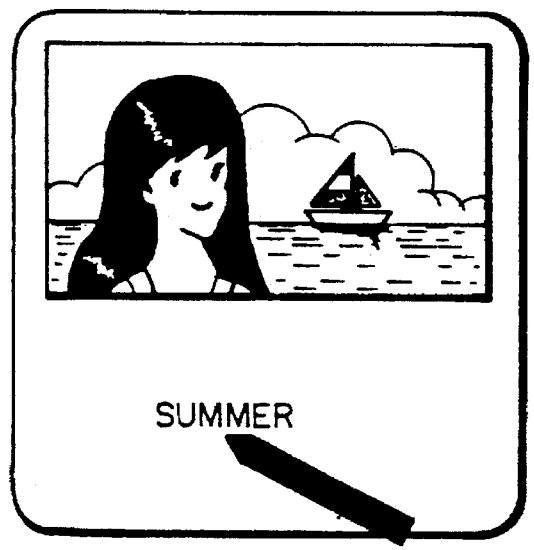
FIG. 51 is a drawing to show an example of indication in the embodiment according to the present invention.

At Step 5 the controller 13 indicates "Please input comments" on the display 15. At this Step 5 the orderer can input desired comments by means of a pen input unit 16b (#407). The thus input comments are indicated below the enlarged indication of second image information, as shown in FIG. 51.

Then the controller 13 proceeds to Step 6.

[Step 6]

At Step 6 the controller 13 indicates "Finished? If Yes, please press 'OK'" on the display 15. If 'OK' is pressed, the controller 13 proceeds to Step 7.

[Step 7]

At Step 7 the controller 13 stores the character information of the comments input by the pen input unit 16b, in the memory 14, and then proceeds to next Step 8.

[Step 8]

Figure 52:
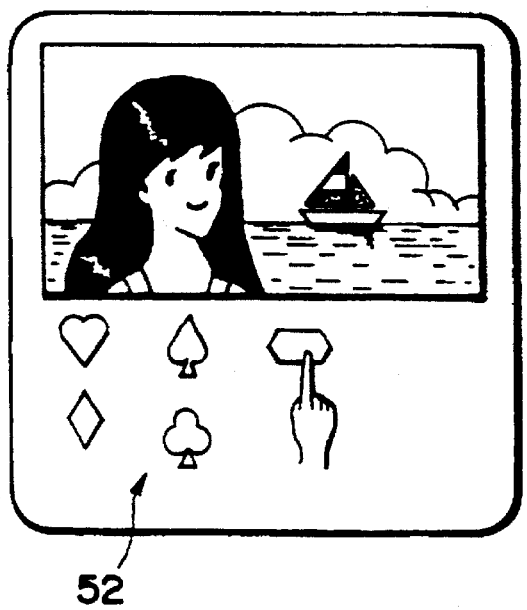
FIG. 52 is a drawing to show an example of indication in the embodiment according to the present invention.

At Step 8 the controller 13 indicates "Please select a framework" on the display 15. On this occasion a framework selection screen 52 is displayed below the indication of second image information on the display 15, as shown in FIG. 52. At this Step 8 the orderer can select a desired framework through the touch panel 16a.

Then the controller 13 proceeds to Step 9.

[Step 9]

At Step 9 the controller 13 indicates "Finished? If Yes, please press 'OK'" on the display 15. If 'OK' is pressed, the controller 13 proceeds to next Step 10.

[Step 10]

At Step 10 the controller 13 stores the information concerning the framework selected at Step 8 in the memory 14, and then proceeds to Step 11.

[Step 11]

Figure 53:
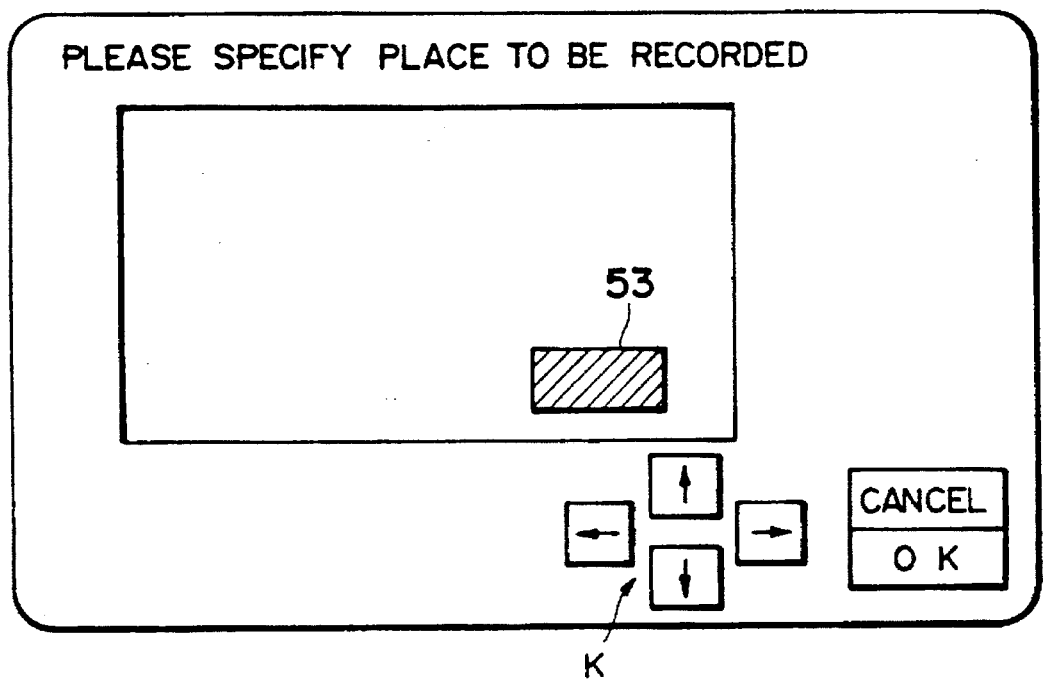
FIG. 53 is a drawing to show an example of indication in the embodiment according to the present invention.

At Step 11 the controller 13 indicates a message of "Please specify place to be recorded" and an output position selection screen as shown in FIG. 53 on the display 15. The orderer can specify the position of the message while moving a region 53 where the selected information is to be recorded, vertically and horizontally through cursor keys K on the display 15 (#408). The size of this region 53 is determined depending upon an amount of the selected information.

Then the controller 13 proceeds to next Step 12.

[Step 12]

At Step 12 the controller 13 indicates "Finished? If Yes, please press 'OK'" on the display 15. If 'OK' is pressed, the controller 13 stores the information concerning the position of the region 53 where the selected information is to be recorded, in the memory 14, and then proceeds to next Step 13.

[Step 13]

Figure 54:
FIG. 54 is a drawing to show an example of indication in the embodiment according to the present invention.

At Step 13 the controller 13 indicates a message of "Finished editing? (Y/N)" on the display 15 (#409). Also, the controller 13 indicates the second image information in the framework selected at Step 8, as shown in FIG. 54, and also indicates the shooting information selected at Step 2 at the selected record place as superimposed on the second image information.

If (Y) is selected, the controller 13 proceeds to next Step 14. If (N) is selected, the controller 13 proceeds to Step 19.

[Step 14]

At Step 14 the controller 13 indicates a message of "Do you want to record the editing information? (Y/N)" on the display 15 (#410). If (Y) is selected, the controller 13 proceeds to next Step 15. If (N) is selected, the controller 13 proceeds to Step 19.

[Step 15]

At Step 15 the controller 13 actuates the motors 18a, 19a through the driver 20 to rewind the film strip 100 before the writing magnetic head 10a comes to the position where the second image information of a shot frame selected at Step 1 is recorded. Then the controller 13 proceeds to next Step 16.

[Step 16]

At Step 16 the controller 13 rewrites the second image information, based on the information edited at above Step 2 to Step 12 and stored in the memory 14, and then proceeds to Step 17.

[Step 17]

At Step 17 the controller 13 actuates the motors 18a, 19a through the driver 20 to rewind the film strip 100 before the optical writing unit 10b comes to the position where the second image information of the shot frame selected at Step 1 is recorded. Then the controller 13 proceeds to next Step 18.

[Step 18]

At Step 18 the controller 13 forms a pattern based on the information edited at above Step 2 to Step 12 and stored in the memory 14, on the liquid crystal light bulb LB in the optical writing unit 10b through the information writing unit 11. This operation prints a pattern by the liquid crystal light bulb LB over the first image information on the film strip 100 (#411).

Then the controller 13 proceeds to Step 19.

[Step 19]

At Step 19 the controller 13 indicates a message of "Do you want to edit another frame? (Y/N)" on the display 15 (#412).

If (Y) is selected, the controller 13 proceeds to Step 1 to execute the above processes for the thus selected frame. If (N) is selected, the controller 13 proceeds to another process.

Processes after the above are those for the selection of frames to be printed, the instruction of print size, the instruction of print number, etc. as described in Embodiment 3.

[Step 20]

At Step 20 the controller 13 actuates the film feed motor 17a and also actuates the film feed motors 18a, 19a through the driver 20 to start rewinding the film strip 100 into the cartridge 128. Then the controller 13 proceeds to Step 21.

[Step 21]

At Step 21 the controller 13 makes the information writing unit 12 convert the print size and the print number for each frame stored in the memory 14 into print information of each frame. Then the controller 13 writes the print information and the editing information (selected shooting information, character information of comments, information concerning selected framework, information concerning the position of region where the selected information is to be recorded) through the magnetic head 10a in the magnetic layer on the film strip 100 frame by frame.

The subsequent flow concerns the calculation of printing fare, the input of orderer's name and telephone number, the writing of these data in the film strip 100, the issue of claim check, etc., which are omitted to explain herein.

The above embodiment is so arranged that the print information is written in the region where the shooting information is recorded, but the writing position of print information may be the leading end position or the trailing end position of the film strip 100 where neither first nor second image information is recorded. In this case, all print information for all shot frames is recorded together.

Figure 55:
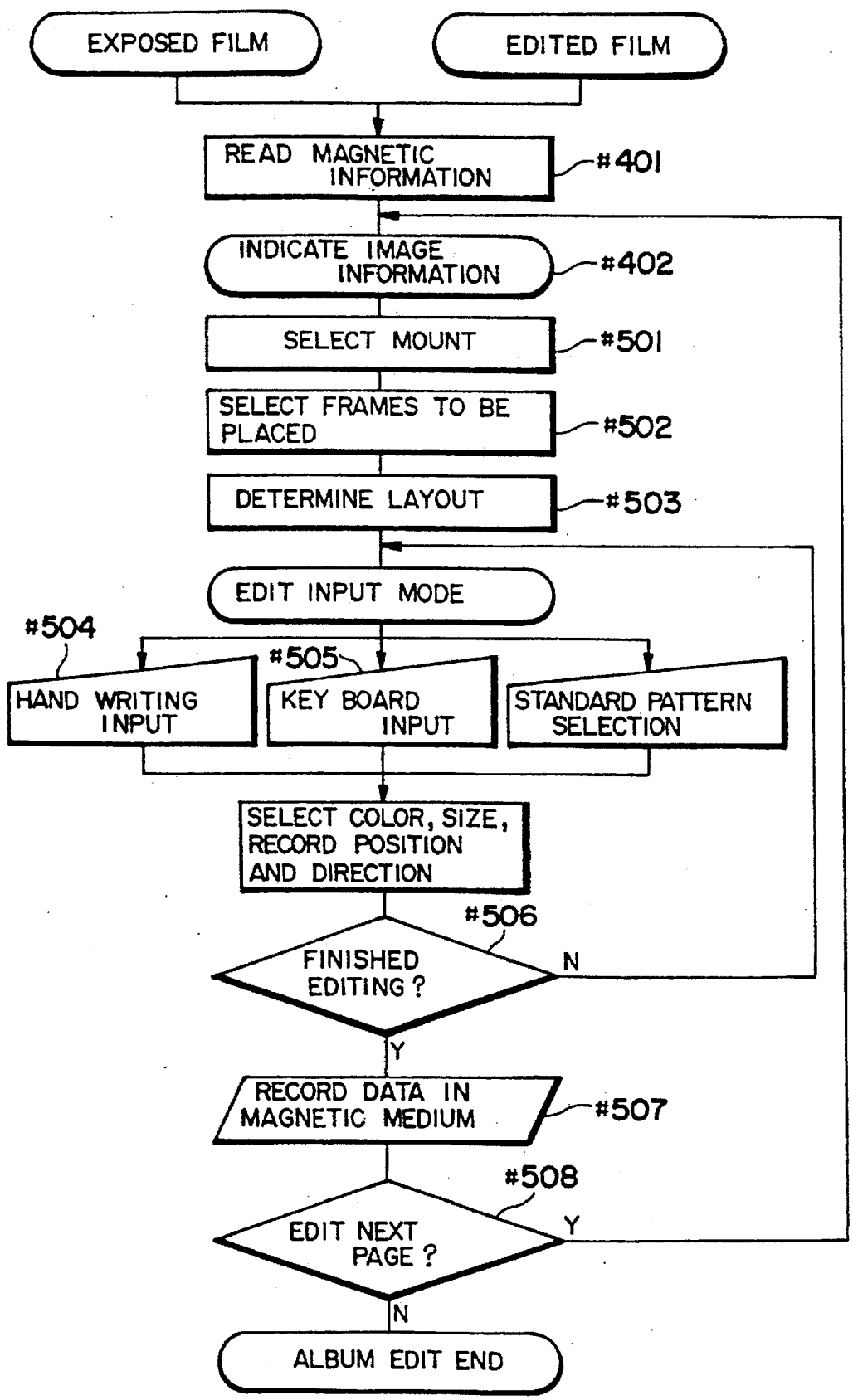
FIG. 55 is a flowchart to show the operation of the apparatus of the present embodiment.

Next described referring to FIG. 55 to FIG. 61 is an embodiment in which the present invention is applied to album editing. FIG. 55 is a flowchart to show an example of flow of operation in an apparatus in the present embodiment, and FIG. 56 to FIG. 61 are drawings to show examples of indications in the apparatus of the present embodiment.

The operation of controller 13 in the present embodiment is the same as that at #401 to #402 in FIG. 48, which is omitted to explain herein. After the controller 13 finishes #402 in FIG. 48, it proceeds to Step 101.

[Step 101]

Figure 56:
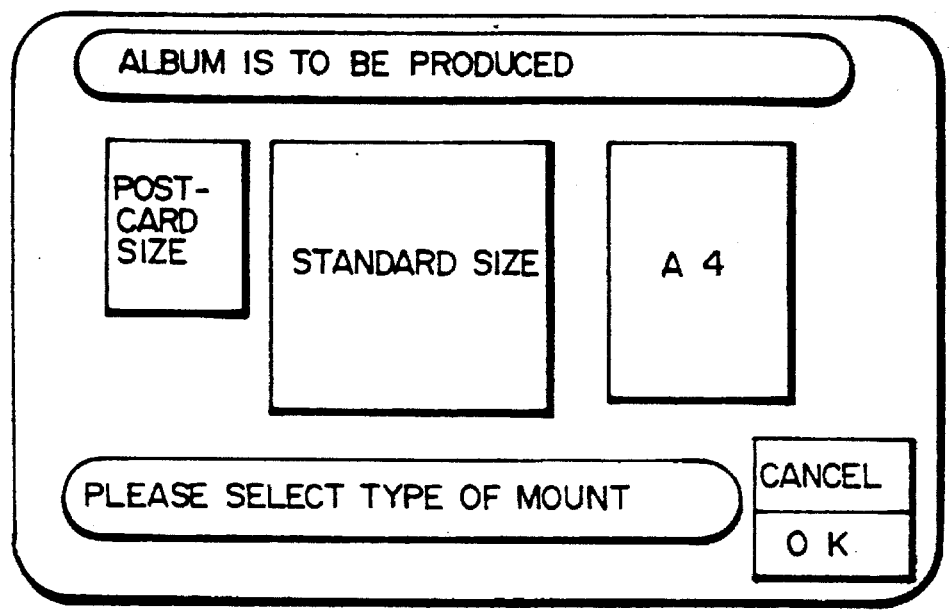
FIG. 56 is a drawing to Show an example of indication in the present embodiment.

At Step 101 the controller 13 indicates a message of "Please select a type of mount", as shown in FIG. 56, on the display 15 (#501). In the present embodiment, the type of mount can be selected from the postcard size, the standard size and the A4 size. The type of mount to be selected is not limited only to the postcard size, the standard size and the A4 size as described in the present embodiment.

When an orderer selects a type of mount through the touch panel 16a, the information concerning the selected type of mount is stored in the memory 14. Then the controller 13 proceeds to next Step 102.

[Step 102]

Figure 57:
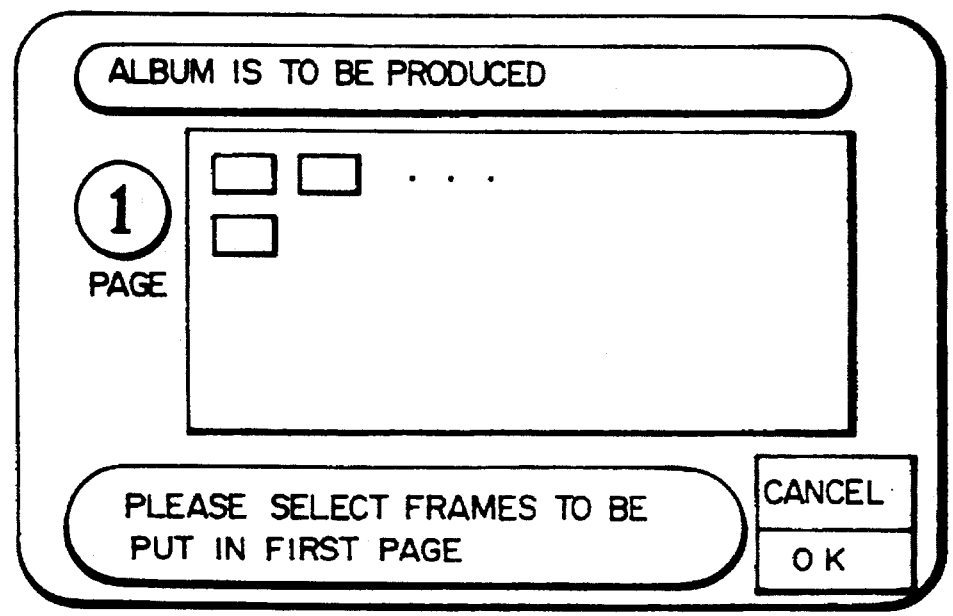
FIG. 57 is a drawing to show an example of indication in the present embodiment.

At Step 102 the controller 13 indicates a list of second image information of shot frames as shown in FIG. 57, on the display 15. Also, a message of "Please select a frame to be put on a first page" is indicated on the display 15 (#502).

When the orderer selects a frame to be edited (a frame to be put on the first page) through the touch panel 16a, the information concerning the thus selected frame is stored in the memory 14. Then the controller 13 proceeds to Step 103.

[Step 103]

Figure 58:
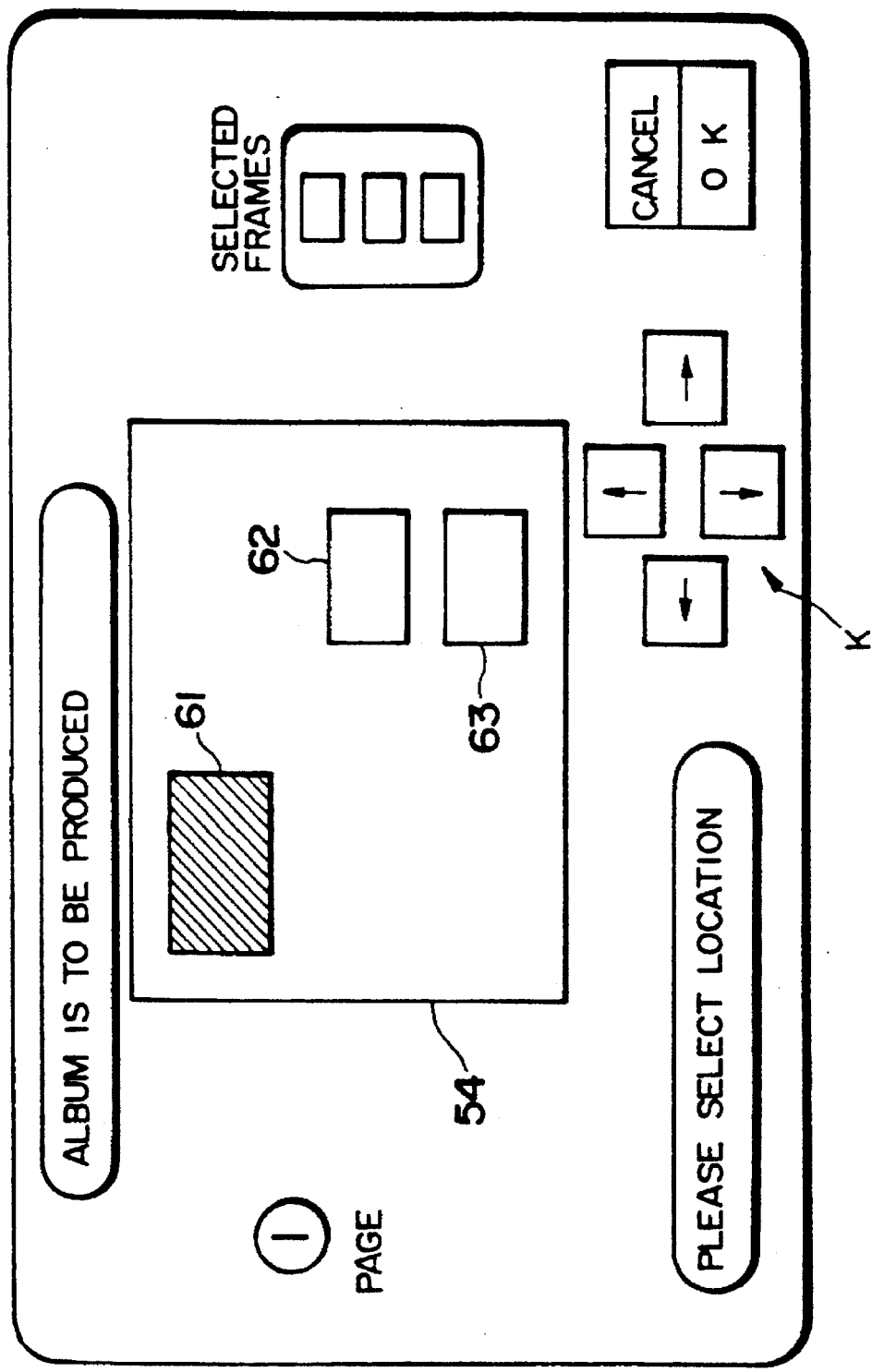
FIG. 58 is a drawing to show an example of indication in the present embodiment.

At Step 103 the controller 13 indicates on the display 15 frameworks 61, 62, 63 in respective sizes corresponding to the selected sizes of mounts, based on the information stored in the memory 14, as shown in FIG. 58. Also, the second image information of frames to be edited as stored in the memory 14 is indicated in a portion different from an indication region 54 of frameworks on the display 15. Further, the controller 13 indicates a message of "Please select location" on the display 15 (#503).

The orderer can specify a location of framework 61–63 in in-plane directions by manipulating cursor keys K on the touch panel 16a. After that, when the orderer presses 'OK' on the touch panel 16a, the controller 13 stores the information concerning the location of framework in the memory 14, and then proceeds to Step 104.

[Step 104]

Figure 59:
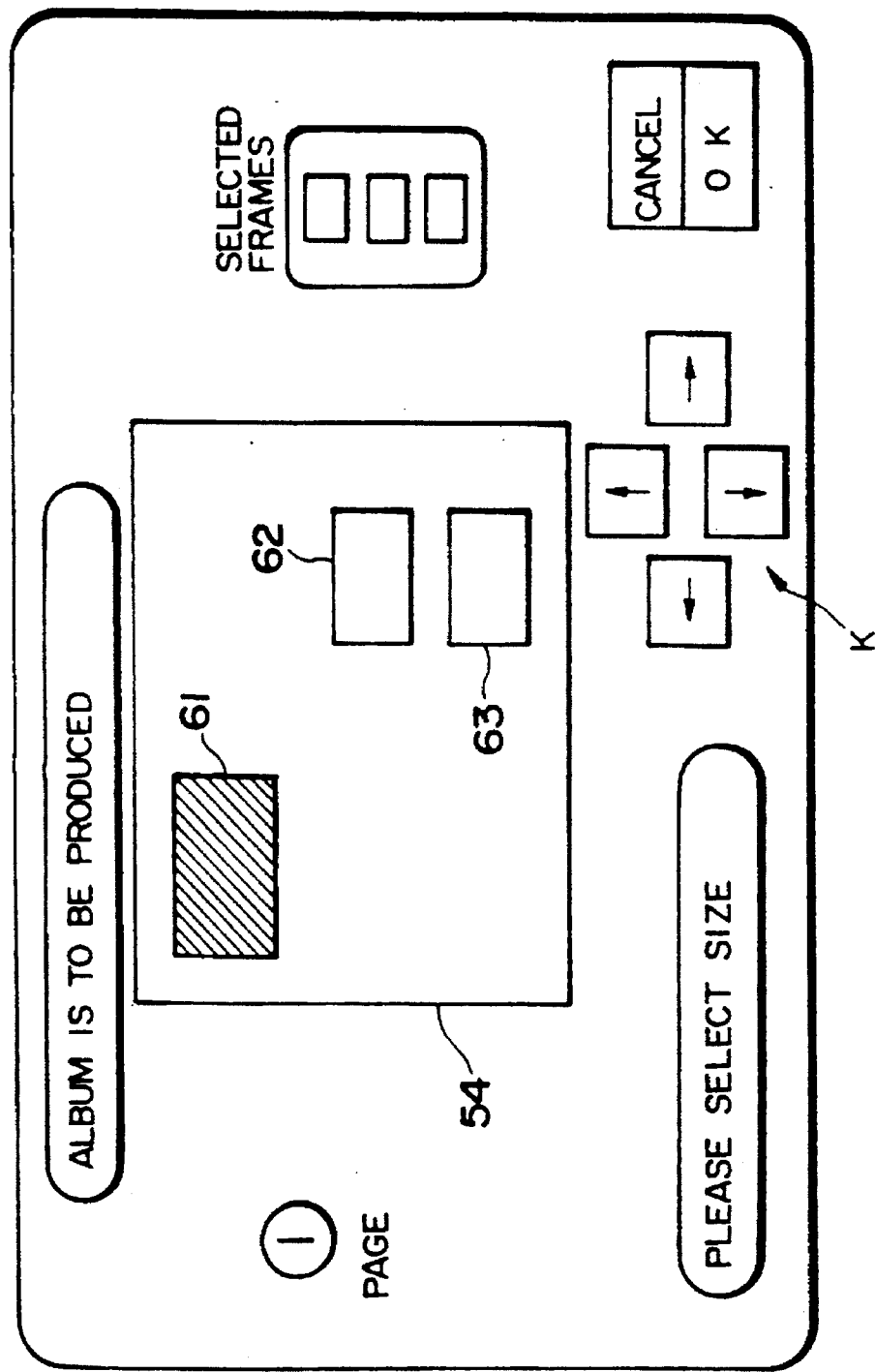
FIG. 59 is a drawing to show an example of indication in the present embodiment.

At Step 104 the controller 13 indicates a message of "Please select size" on the display 15, as shown in FIG. 59. The orderer can specify the size of framework 61–63 by manipulating the cursor keys K on the touch panel 16a. Then, when the orderer presses 'OK' on the touch panel 16a, the controller 13 stores the information concerning the size of framework in the memory 14, and then proceeds to next Step 105.

[Step 105]

Figure 60:
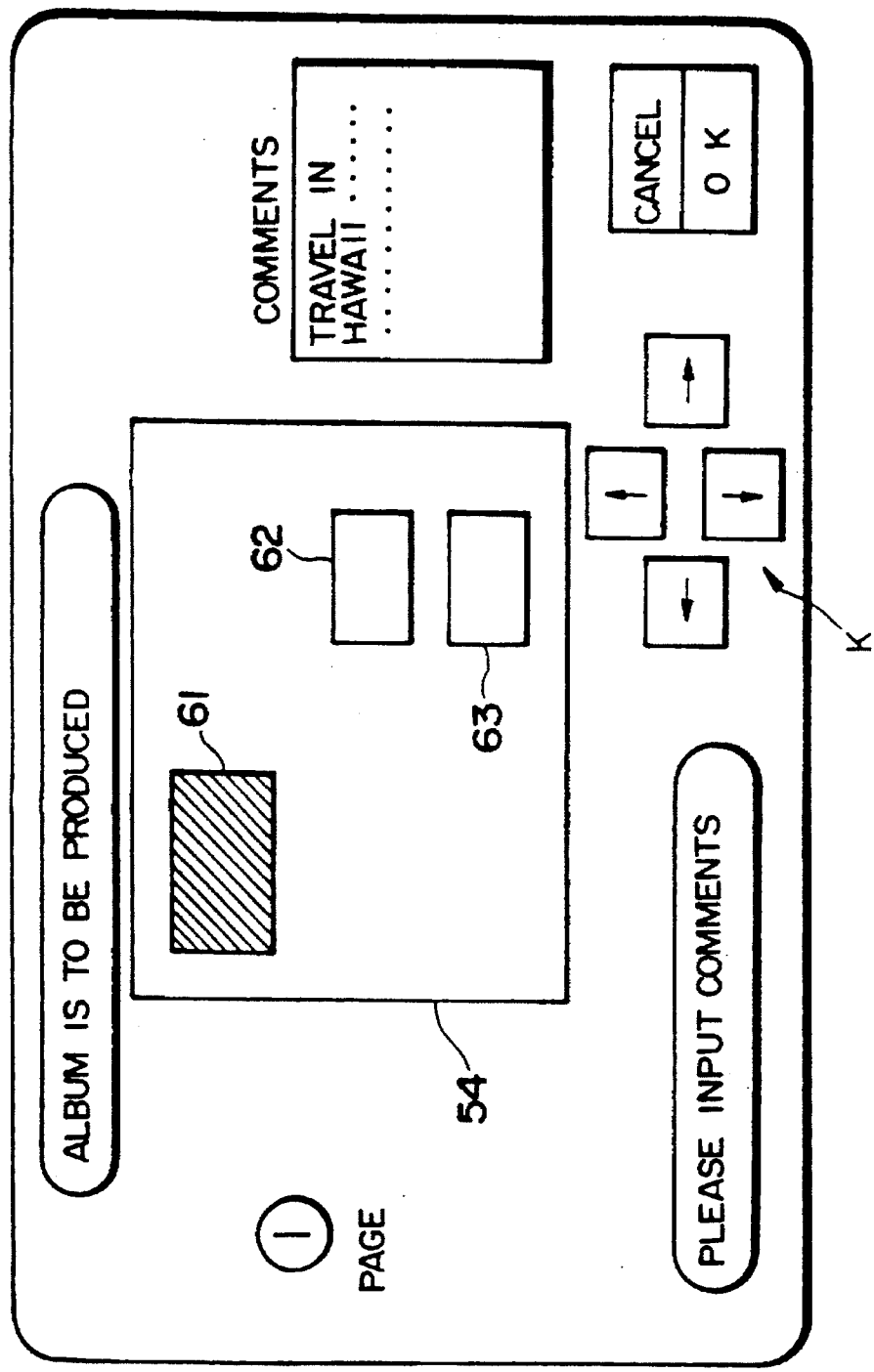
FIG. 60 is a drawing to show an example of indication in the present embodiment.

At Step 105 the controller 13 indicates a message of "Please input comments" on the display 15, as shown in FIG. 60. The orderer can input comments through the pen input unit 16b as shown in FIG. 46 (#504). After the input of comments is finished and when the orderer presses 'OK' on the touch panel 16a, the controller 13 stores character information concerning the comments in the memory 14, and then proceeds to Step 106.

[Step 106]

Figure 61:
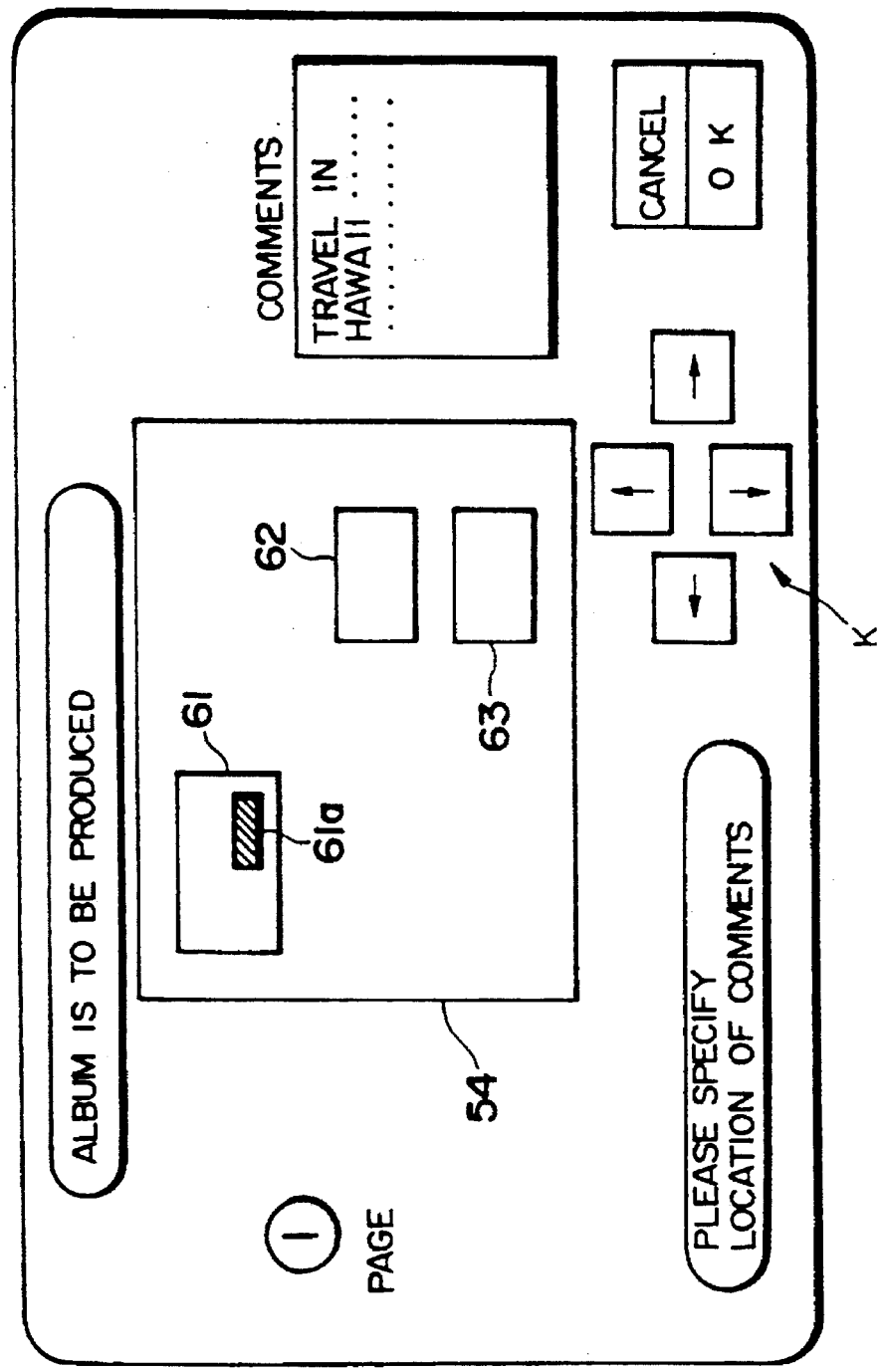
FIG. 61 is a drawing to show an example of indication in the present embodiment.

At Step 106 the controller 13 indicates a message of "Please specify location of comments" on the display 15, as shown in FIG. 61 and also indicates a comment indication region 61a as superimposed on the indication of framework 61. The orderer can move the comment indication region 61a vertically and horizontally in the drawing by manipulating the cursor keys K on the touch panel 16a (so as to specify the location of comment indication region 61a) (#505). The size of comment indication region 61a is determined depending upon the number of characters in the comments input at previous Step 105.

When 'OK' is pressed on the touch panel 16a, the controller 13 stores information concerning the location of comment indication region 61a in the memory 14, and then proceeds to Step 107.

[Step 107]

At Step 107 the controller 13 indicates a message of "Finished editing? If Yes, please press 'OK'" on the display 15 (#506). If 'OK' is pressed, the controller 13 proceeds to next Step 108.

[Step 108]

At Step 108 the controller 13 records the editing information stored in the memory 14 (information concerning the type of selected mount stored in the memory, information concerning the location of framework, information concerning the size of framework, character information and information concerning the location of comment indication region) through the information writing unit 11 in the magnetic layer on the film strip 100 (#507). Then the controller 13 proceeds to Step 109.

[Step 109]

At Step 109 the controller 13 indicates a message of "Do you want to edit another page? (Y/N)" on the display 15 (#508). If (Y) is pressed, the controller proceeds to Step 101. If (N) is pressed, the controller 13 proceeds to next Step 110.

[Step 110]

At Step 110 the controller 13 actuates the film feed motor 17a and also actuates the film feed motors 18a, 19a through the driver 20 to start rewinding the film strip 100 into the cartridge 128. Then the controller 13 proceeds to Step 111.

[Step 111]

At Step 111 the controller 13 makes the information writing unit 12 convert the print size and the print number of each frame stored in the memory 14 into print information of each frame. Then the controller 13 writes the print information and the editing information in the magnetic layer on the film strip 100 through the magnetic head 10a frame by frame. Specifically, the print information and the editing information of each frame is written in the region 71b–74b as shown in FIG. 16B. When the writing operation of print information in the film strip 100 is finished, the controller 13 temporarily stops the rewinding of film strip 100 by the film feed motors 17a, 18a and 19a. This completes the editing operation.

As described above, the orderer can make an order as to the album editing with a film before development.

The above embodiment is so arranged that the second medium having the second image information is the magnetic layer provided on the film, but the second medium may be an IC card. In this arrangement the second image information is stored in the IC card. The orderer sets a film and the IC card in the apparatus according to the present invention and makes an order while observing an indication of second image information stored in the IC card. The IC card may be incorporated with the cartridge.

Although the selection concerning the shooting information is carried out in the above-described embodiments, a camera may be so arranged as to record information concerning a shooting location, information concerning a shooting time, character information concerning comments input by a photographer, and information concerning photographer's voice and to permit selection as to these information.

Also, the embodiments according to the present invention may be so arranged that a selection can be made as to whether the editing information is written over the first image information in a superimposed manner or on the magnetic layer as the second medium.

Embodiment 6

As described in Embodiments 3–5, the film strip 100 in which various order contents are recorded is temporarily stored in the above-described control apparatus C in a wound state in the cartridge 128. Then the cartridge and the DP envelope 40 are transferred to a photo laboratory and printing is conducted based on the order contents. The printing process is schematically described in the following.

Figure 62:
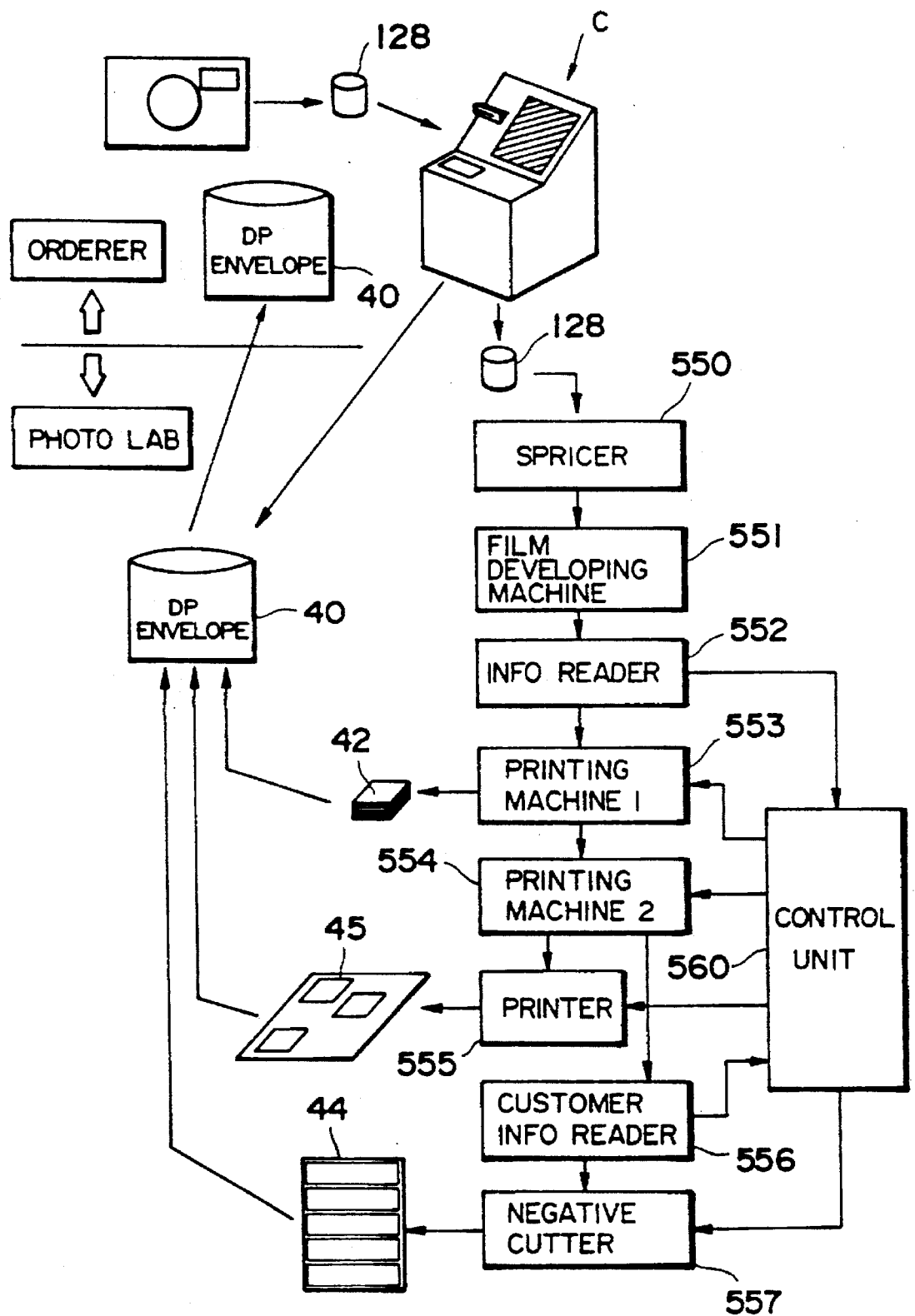
FIG. 62 is a diagrammatic illustration to show a flow of processes between the apparatus of the present embodiment and a photo laboratory.

In FIG. 62, the cartridge 128 is sent from the print information control apparatus C to a laboratory. The film strip 100 in the cartridge 128 is connected to other film strips by a splicer 550 to form a long film. The specific structure of the splicer 550 is disclosed for example in Japanese Laid-open Patent Application No. 1-102566 and therefore reference should be made to the application as to the details thereof.

The long film is then developed by a film developing machine 551. This turns the first image information recorded in the emulsion layer in the film into negative images as visualized. The developed negative film is set in an information reader 552 having a magnetic head. As the negative film is fed by an unrepresented film feed apparatus, the reader 552 once reads all print information recorded in the magnetic layer in the negative film. The thus read print information is output to a control unit 560. The control unit 560 is provided with an unrepresented memory, in which the all print information is stored.

Then the developed negative film is set in a first printing machine 553. The first printing machine 553 produces prints 42 in the service size, based on the print information stored in the memory, i.e., based on the information concerning frames to be printed and print numbers thereof. After that, the developed film is set in a second printing machine 554, which produces prints in the cabinet size, based on the print information stored in the memory. In the present embodiment, the first printing machine 553 and the second printing machine 554 each are composed of an exposure unit for printing the first information from the film on a roll photographic paper and a paper processor for developing the photographic paper. Although the present embodiment is shown as an example in which there are provided only the printing machine for producing the prints in the service size and the printing machine for producing the prints in the cabinet size, another printing machine for producing prints in another size may be added. The specific structure of the apparatus is disclosed for example in U.S. Pat. No. 4,827,109 and therefore reference should be made to the U.S. patent as to the details thereof.

In case a pattern corresponding to the editing information is exposed by the optical writing unit 10b described in Embodiment 5, photographic prints as edited can be obtained by these first and second printing machines 553, 554.

In the next place, if the editing information is recorded in the magnetic layer on the film, the film is set in a printer 555 as disclosed for example in U.S. Pat. No. 4,607,949. The printer 555 is composed for example of an image reader such as a scanner, a thermal sublimation transfer printer, and a minicomputer for controlling these. Then the scanner reads the first image information on the film, and the first image information is printed based on the information concerning the type of selected mount and the information concerning the location of framework as stored in the memory. Further, comment sentences are also printed based on the character information and the information concerning the location of comment indication region as stored in the memory. This produces an album 45. Also, photographic prints may be produced based on the editing information concerning the photographic editing (selected shooting information, character information of comments, information concerning the selected frame, information concerning the location of region 53 where the selected information is to be recorded). The present embodiment employed the scanner and the thermal sublimation printer, but using a silver salt sensitive medium instead, the first image information may be transferred directly on the silver salt sensitive medium based on the information in the memory. The printer of this type is disclosed in U.S. Pat. No. 4,607,949 and reference should be made to the U.S. patent. Also, the album editing system is disclosed for example in Japanese Laid-open Patent Application No. 1-281441, which is preferably applied to the printer in the present embodiment.

Then, the film is set in a customer information reader 556 having a magnetic head. The control unit 560 reads through the customer information reader 556 the customer information and the reception number recorded in the magnetic layer in the film and stores the read information in the memory.

Next, the film is cut in six frames by a negative cutter 557 and the thus cut pieces are put in a negative bag 44. The negative cutter 557 is preferably a device as disclosed for example in Japanese Laid-open Patent Application No. 57-53751. The reception number stored in the memory is printed on the negative bag 44. Here, the film may be arranged to be wound in a cartridge without cut. In this case, the reception number may be printed on the surface of cartridge.

The prints 42 of the service size, the prints 43 of the cabinet size, the album 45 and the negative bag 44 are checked against each other and then set in a DP envelope 40 to be returned to the orderer through the DP agency.

Figure 63:
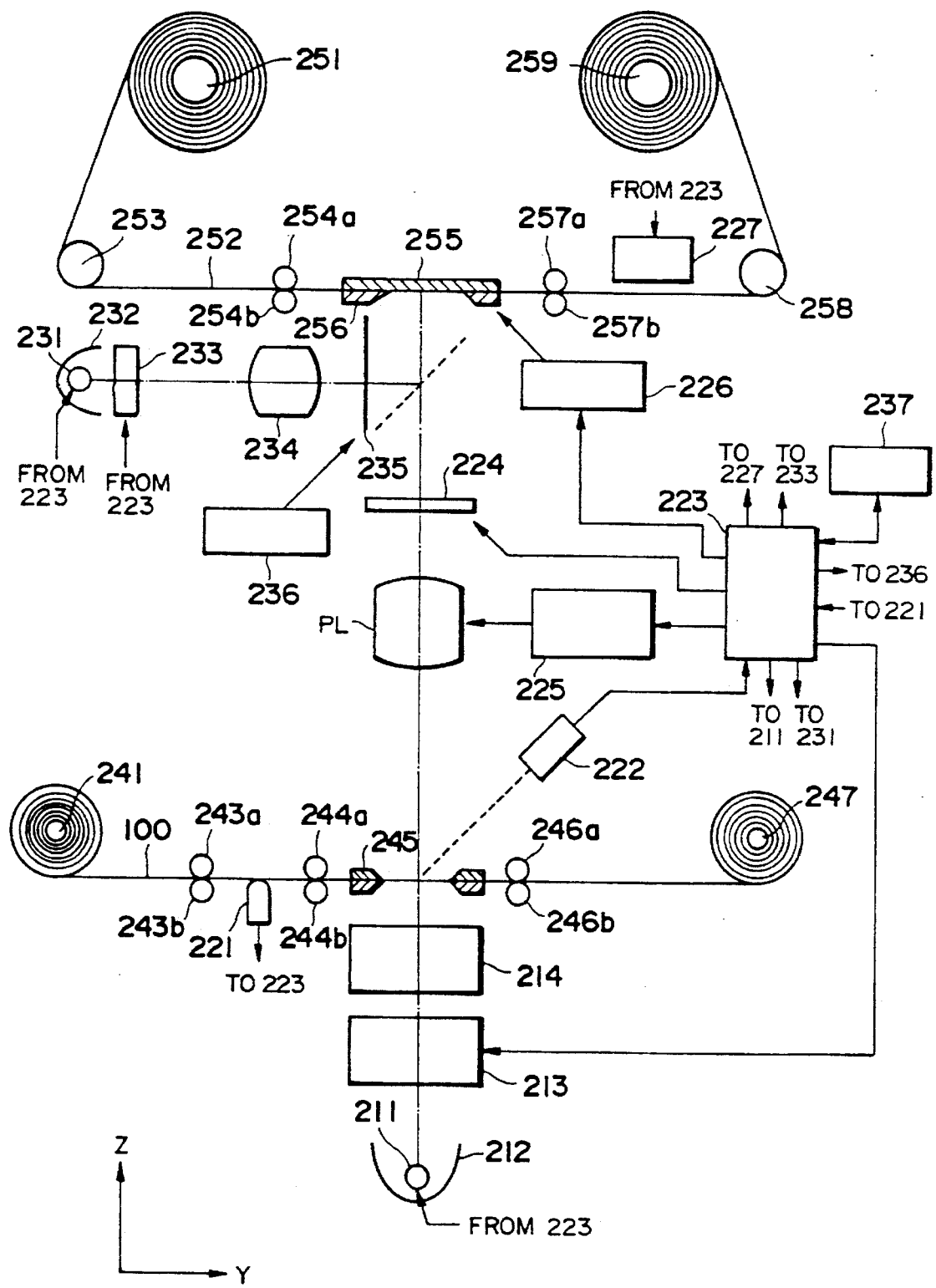
FIG. 63 is a diagrammatic illustration to show an example of structure of a printer.

Now described with reference to the drawings is a preferable photographic printer for such photographic printing. FIG. 63 is a drawing to diagrammatically show the structure of the photographic printer.

In FIG. 63, the film strip 100 as developed is set as a negative film 242 on a spool 241 in the photographic printer. The film developing machine is disclosed for example in U.S. Pat. No. 5,212,367 and reference should be made to the U.S. patent. The negative film 242 is let to pass between a pair of rollers 243a, 243b, between a pair of rollers 244a, 244b, through a negative mask 245 and between a pair of rollers 246a, 246b in order, and the leading end is wrapped around a spool 247. An opening of the negative mask 245 is arranged to have the same size as a frame in the negative film 242.

The paired rollers 243a, 243b; 244a, 244b; and 246a, 246b are driven by an unrepresented motor. This drive feeds the negative film 242 from the spool 241 to the spool 247. An encoder is provided for the paired rollers 244a, 244b and 246a, 246b to detect a rotation amount thereof, and an output from the encoder is transmitted to the control unit 223. Accordingly, the control unit can calculate a feed amount of the negative film 242.

A magnetic head 221 is disposed between the paired rollers 243a, 243b and the paired rollers 244a, 244b. The magnetic layer in the negative film 242 is directed toward the magnetic head 221. The magnetic head 221 reads the information recorded on the magnetic layer in the negative film 242 and transmits the read information to the control unit 223. The surface of the emulsion layer in the negative film 242 is directed upward in the drawing.

Also, photographic paper 252 wound in a roll is set on a spool 251. The photographic paper 252 is let to pass on a roller 253, between a pair of spools 254a and 254b, between a pressure plate 255 and a trimming mask 256, between a pair of spools 257a and 257b, and on a roller 258 in order, and the leading end is wrapped around a spool 259. The surface of emulsion layer of the photographic paper 252 is directed downward in the drawing, i.e., toward the negative film 242. An unrepresented motor controlled by the control unit 223 is provided for the rollers 253, 258 and the paired spools 254a, 254b, and an encoder is provided for outputting a rotation amount of the rollers 253, 258 and the paired spools 254a, 254b to the control unit 223. The control unit 223 can calculate a feed amount of photographic paper 252 from an output from the encoder.

A light source 211 is for example a halogen lamp, which emits white light. The white light is reflected by a reflecting mirror 212 to reach a filter box 213. The filter box 213 has three filters of yellow, magenta and cyan, which can change a color balance of emerging light by arranging a time balance in which the three filters are interposed in the optical path during exposure. The time balance of the three filters in the filter box 213 is controlled by the control unit 223. Light outgoing from the filter box 213 is let to pass through a diffusion box 214 to make a light quantity thereof uniform and then to illuminate the negative film 242 located in the opening of negative mask 245. The light source 211 is so arranged that the light quantity thereof can be selectively changed between two levels of Hi and Low and the light quantity is controlled by the control unit 223.

Light from the thus illuminated negative film 242 is let to pass through a projection lens PL for example of a zoom lens to form an image of the negative film at a predetermined magnification on the photographic paper 252 pinched between the pressure plate 255 and the trimming mask 256. A shutter 224 is provided in the optical path between the projection lens PL and the trimming mask 256. The open and close operation of the shutter 224 is controlled by the control unit 223, whereby an exposure time on the photographic paper can be adjusted.

Also, a liquid crystal light bulb 233 is provided in the present embodiment, for printing characters or a predetermined pattern on the photographic paper. The liquid crystal light bulb 233 is illuminated by light from a light source 231 and via a reflecting mirror 232. The light source 231 is for example a halogen lamp, which supplies white light. Then the light from the liquid crystal light bulb 233 is directed toward a mirror 235 through an objective lens 234. The mirror 235 is disposed in the optical path between the shutter 224 and the trimming mask 256 such that it can move selectively between two positions inside and outside the optical path. Here, the mirror 235 is driven by a mirror drive unit 236.

In case the mirror 235 is located in the optical path between the shutter 224 and the trimming mask 256, as shown by the broken line in the drawing, the light from the liquid crystal light bulb 233 through the objective lens 234 is deflected by the mirror 235 to reach the photographic paper 252 in the trimming mask 256. The photographic paper 252 and the liquid crystal light bulb 233 are made conjugate with each other by the objective lens 234. An EC element may be employed instead of the liquid crystal light bulb 233.

The control unit 223 controls a pattern indicated by the liquid crystal light bulb 233. The mirror drive unit 236 is also controlled by the control unit 223.

The present embodiment is provided with a printing unit 227 between the pair of spools 257a, 257b and the roller 258, for printing characters on the back face of the photographic paper 252 (which is the other surface than the surface of emulsion layer). The printing unit 227 may be for example an ink jet printer or a thermal transfer printer. The printing unit 227 is located in a region where a previous print is located after the photographic paper 252 is fed by a distance of a print size. The printing unit 227 is controlled by the control unit 223.

Figure 64:
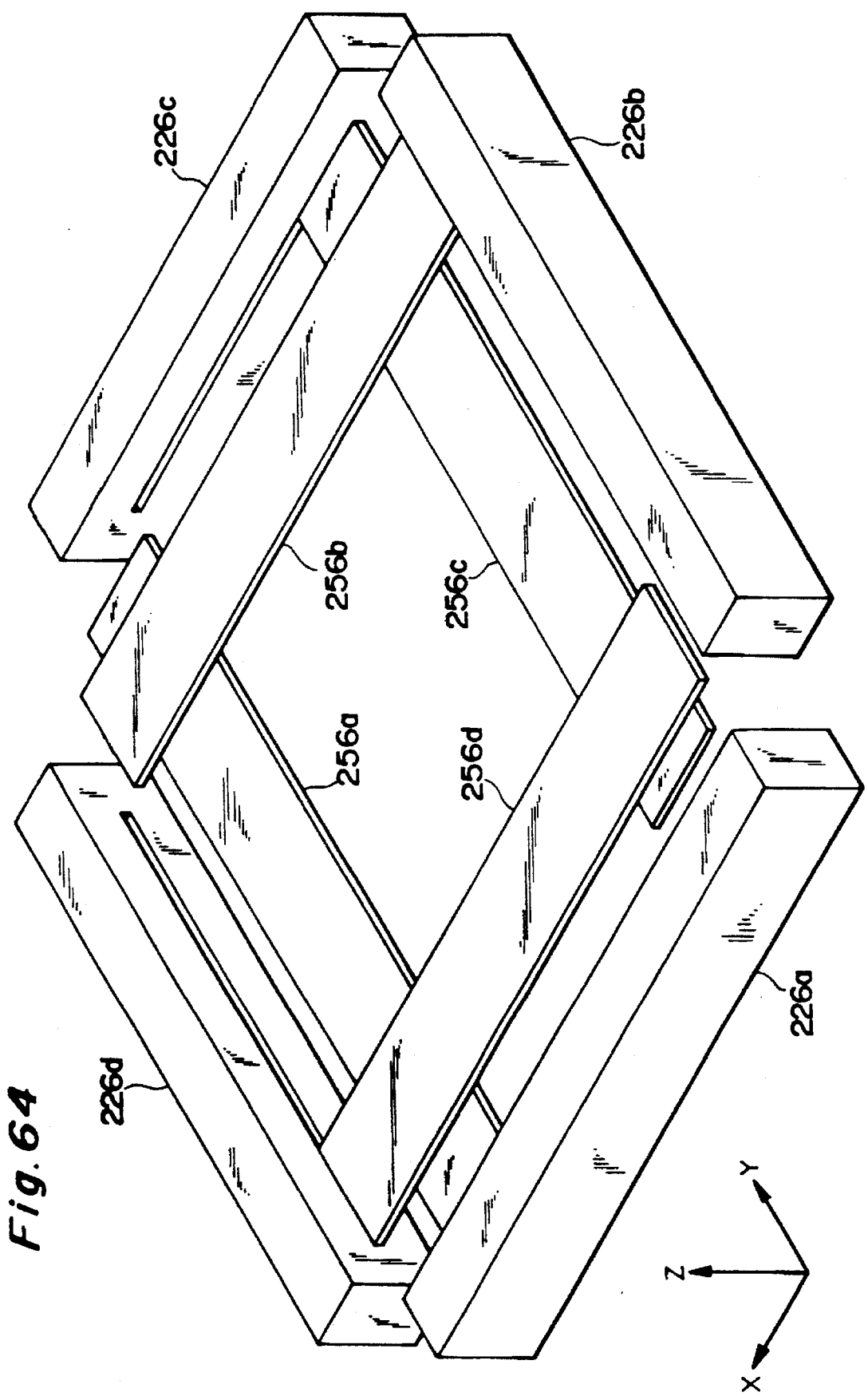
FIG. 64 is a perspective view to show an example of trimming mask.

The trimming mask 256 is driven by a mask drive unit 226 and is arranged as to have an aperture formed thereby with variable size and shape. FIG. 64 is a perspective view to show an example of structure of the trimming mask 256 and the mask drive unit 226. FIG. 64 employs the coordinate system of XYZ. In FIG. 64, the Z direction is taken in the direction of optical axis of projection lens PL in FIG. 63 (the vertical direction in the plane of FIG. 63), the Y direction in the left-to-right direction in the plane of FIG. 63, and the X direction in the normal direction to the plane of FIG. 63.

In FIG. 64, the trimming mask 256 is composed of a pair of blades 256a, 256c arranged movable along the X direction in the drawing and a pair of blades 256b, 256d arranged movable along the Y direction in the drawing. The opening is an inscribed region to a rectangle formed by the four blades 256a-256d. The pair of blades 256a, 256c are driven by respective mask drive units 226a, 226c so as to move to change a spacing in the X direction. The pair of blades 256b, 256d are driven by respective mask drive units 226b, 226d so as to move to change a spacing in the Y direction. The mask drive unit 226 is controlled by the control unit 223 so as to change the length-to-width ratio and the size of the rectangular opening.

Figure 65:
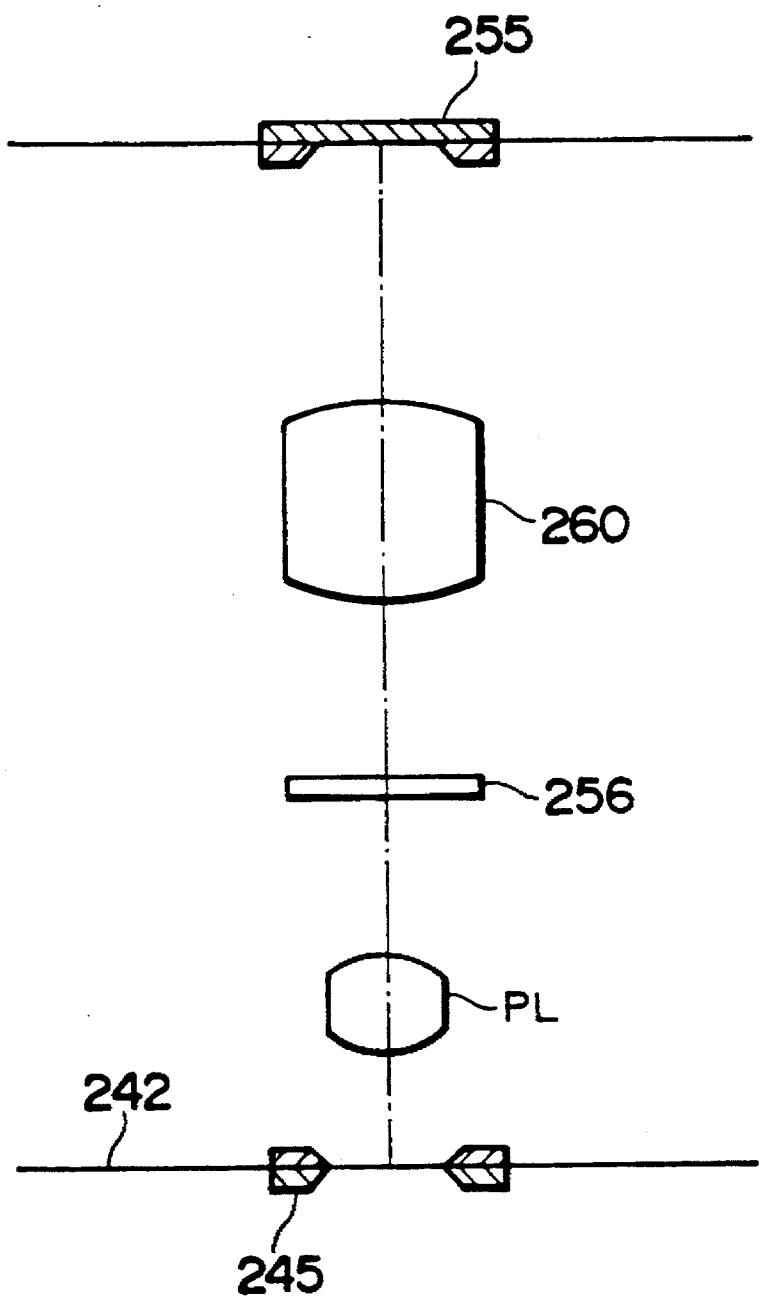
FIG. 65 is a partial drawing to show a modification of the printer.

The trimming mask 256 may be constructed of the four blades as shown in FIG. 64, or, instead, it may be constructed of two L-shaped blades. Instead of such blades, the trimming mask may be constructed as a liquid crystal light bulb or an EC element disposed in place. Further, the place of the trimming mask 256 is not limited to the vicinity of photographic paper 252. For example, as shown in FIG. 65, the trimming mask 256 may be set at a position where an image of negative film is formed by the projection lens PL, and a relay lens 260 refocuses the spatial image formed on the mask, on the photographic paper 252. In case the projection lens PL is not an image-side telecentric optical system, a field lens should be preferably disposed in the vicinity of the trimming mask 256.

Also, in case the trimming mask 256 is constituted by a liquid crystal light bulb or an EC element in the arrangement in FIG. 65, the trimming mask 256 can be arranged also to have the function of liquid crystal light bulb 233 for projecting characters or a pattern.

The trimming mask 256 may be constructed such that a plurality of masks each having an opening of selected shape are arranged as interchangeable. In this arrangement, the mask drive unit 226 is controlled by the control unit 223 such that one of the plurality of masks is located in the optical path between the photographic paper 252 and the projection lens PL.

Now returning to FIG. 63, the projection lens PL in the present embodiment is arranged as a zoom lens which can continuously change its magnification by changing distances between a plurality of lens groups. The present embodiment is thus provided with a magnification control unit 225 for changing the distances between the plurality of lens groups. The magnification control unit 225 has for example a motor, and moves the plurality of lens groups movable in the projection lens PL by a driving force of the motor. This can change the magnification of the projection lens PL. The plurality of lens groups movable in the projection lens PL are provided for example with an encoder for detecting positions of the lens groups. An output from the encoder is transferred to the magnification control unit 225. The magnification control unit 225 has a ROM in which a relation between positions of lens groups and magnifications of projection lens PL is stored. The magnification control unit can calculate a magnification of the projection lens PL by receiving an output from the encoder. The control unit 223 transmits information concerning the magnification to the magnification control unit 225, and the magnification control unit 225 transmits a calculated magnification of the projection lens PL to the control unit 223.

Also, the present embodiment is provided with an analyzer 222 for detecting the density and the hue (color balance) of the negative film 242. The analyzer 222 detects transmission light of the illuminated negative film in the oblique direction. The density and the hue of the negative film 242 detected by the analyzer 222 are transmitted to the control unit 223.

The thus constructed photographic printer reads various information recorded in the magnetic layer in the negative film 242 and executes various types of printing.

Before describing the printing execution process, the information recorded in the magnetic layer in the negative film 242 (film strip 100) is described in detail.

It is first assumed that there is recorded in a track $C_{1b}$ (see FIG. 1A) in the film strip 100 as the negative film 242 after respective ID codes indicating types of information by the print information control apparatus C (order machine), extra printing information (frames to be printed, trimming, number of prints), editing information (information concerning the type of mount, information concerning the location of framework, the information concerning the size of framework, character information and information concerning the location of comment indication region), and output information (print size information, print number information, shooting time information, shooting data information, shooting location information, character information and voice information). Also, a clock signal as reference is recorded in the track $C_{1a}$ next to the track $C_{1b}$.

The above trimming information, framework location information, framework size information, character information and comment indication region location information is recorded as coded data of position of region.

Figure 66C:
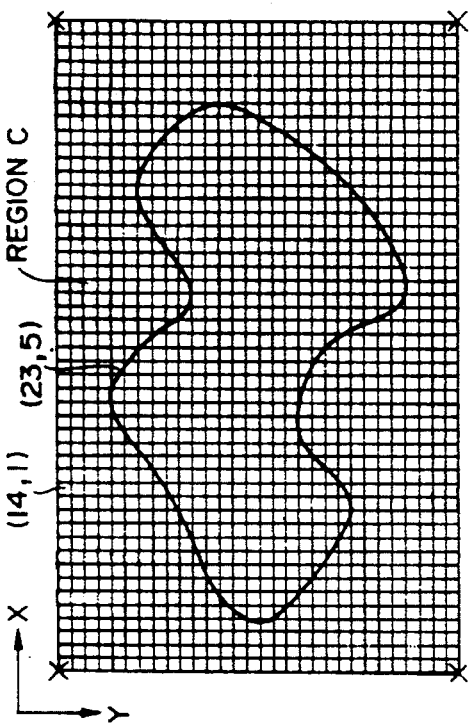
FIGS. 66A to 66D are plan views to show examples of specified area.
Figure 66D:
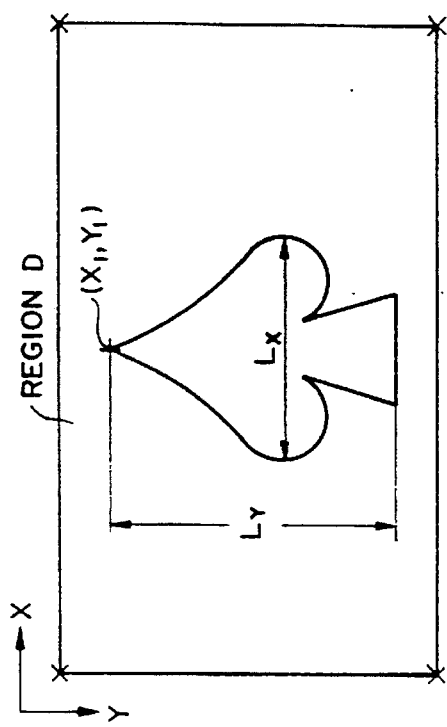
Figure 66A:
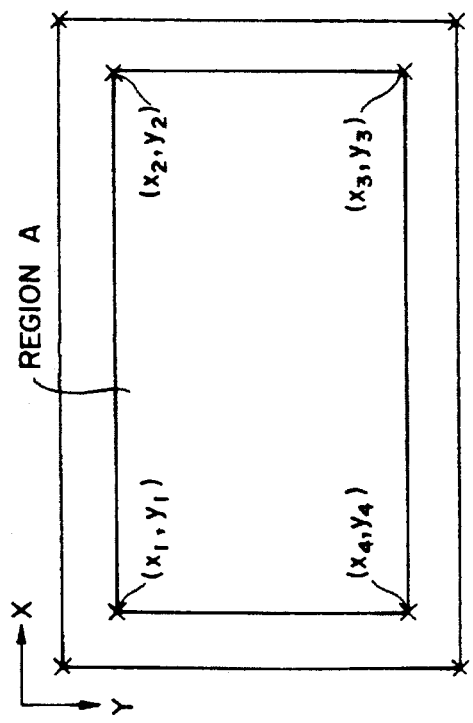

For example, if a trimming region A is rectangular, as shown in FIG. 66A, the trimming information is expressed by four coordinate points $[(x_1,y_1), (x_2,y_2), (x_3,y_3), (x_4,y_4)]$. The trimming information (four coordinate points) is recorded in the track $C_{1b}$ after an ID code indicating that the trimming region is expressed by four coordinate points.

Figure 66B:
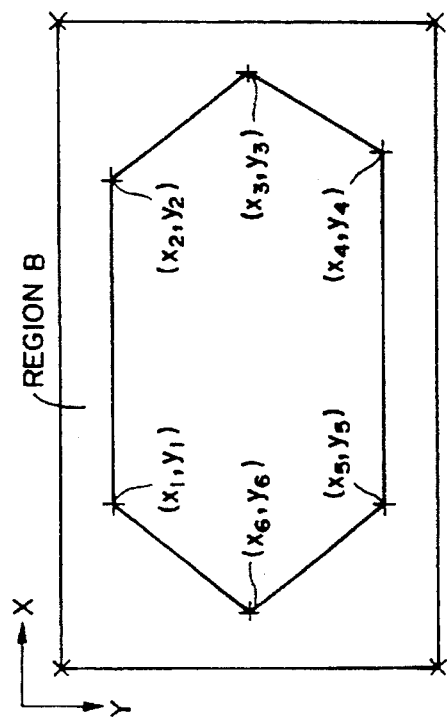

Also, if a region B in the framework is hexagonal as shown in FIG. 66B, the information concerning the position of framework and the size of framework is expressed by six coordinate points $[(x_1,y_1), (x_2,y_2), (x_3,y_3), (x_4,y_4), (x_5,y_5), (x_6,y_6)]$. The information concerning the position of framework and the size of framework (six coordinate points) is recorded in the track $C_{1b}$ after an ID code indicating that the region of framework is expressed by six coordinate points.

Further, if a region C of framework is not rectangular as shown in FIG. 66C, the entire region is first divided into a plurality of sections. Then each divided section is given an address in the X direction and an address in the Y direction. In this case, the information concerning the position of framework and the size of framework corresponds to numbers of sections on which an outline of the region C of framework is located. The information concerning the position of framework and the size of framework (numbers of sections) is recorded in the track $C_{1b}$ after an ID code indicating that the region of framework is expressed by sections.

If a region D of framework is for example of a spade shape as shown in FIG. 66D, the information concerning the position of framework and the size of framework is expressed by the type of shape of framework, coordinates $(X_1,Y_1)$ of the origin of the framework, the size $L_x$ of framework in the X direction and the size $L_y$ of framework in the Y direction. These information is recorded in the track $C_{1b}$ after an ID code indicating that the region D of framework is expressed by the shape and the size. The information coding method as described above is not limited to the case in which the region of framework is of the spade shape.

The trimming information can be converted into information concerning the position of framework and the size of framework as shown in FIGS. 66A–66D, and information concerning the magnification in printing.

Figure 67A:
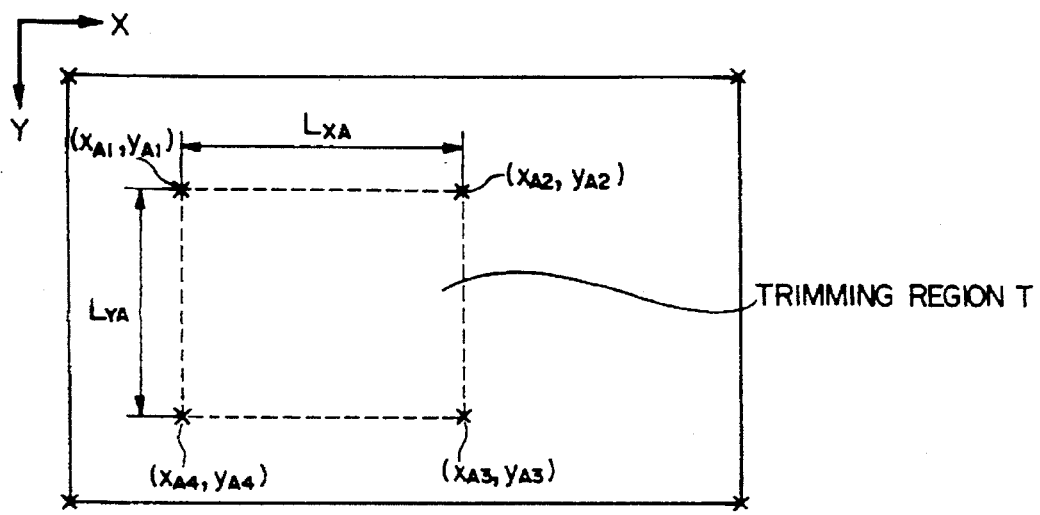
FIGS. 67A and 67B are respectively drawings to show a relation between a trimming area and an area of frame.
Figure 67B:
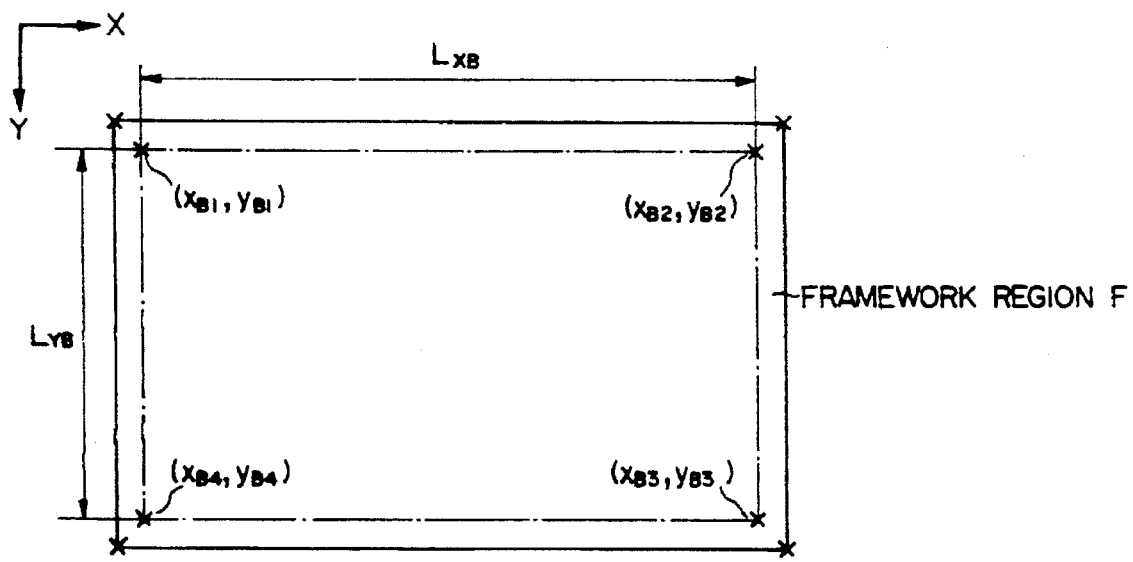

For example, let us consider a case in which a trimming region T on the print information control apparatus is expressed by four coordinates $[(x_{A1},y_{A1}), (x_{A2},y_{A2}), (x_{A3},y_{A3}), (x_{A4},y_{A4})]$ as shown in FIG. 67A and a region F of framework is expressed by four coordinate points $[(x_{B1},Y_{B1}), (x_{B2},y_{B2}), (x_{B3},y_{B3}), (x_{B4},y_{B4})]$ as shown in FIG. 67B. In this case, the X-directional length $L_{XA}$ of the trimming region T is expressed by $L_{XA}=|x_{A1}-x_{A2}|$ and the Y-directional length $L_{YA}$ of the trimming region T by $L_{YA}=|y_{A1}-y_{A4}|$. Also, the X-directional length of the framework region F is expressed by $L_{XB}=|x_{B1}-x_{B2}|$ and the Y-directional length $L_{YB}$ of the framework region F by $L_{YB}=|y_{B1}-y_{B4}|$.

The magnification $\beta$ in printing can be expressed as follows:

$$\beta=L_{YB}/L_{YA} \ [L_{YB}/L_{YA}>L_{XB}/L_{XA}]=L_{XB}/L_{XA} \ [L_{YB}<L_{XB}/L_{XA}].$$

Accordingly, in the print information control apparatus the trimming information is converted into the information concerning the position of framework and the size of framework, and the information concerning the magnification in printing and thereafter the converted information is recorded in the track $C_{1b}$.

Next, returning to FIG. 63, the operation of the control unit 223 is described. First, the negative film 242 is set on the spools 241, 247 in FIG. 63, as described previously.

In this case, there are recorded the information of photographic frame numbers, and the type of film (maker, ISO speed, type of negative film, reversal film or black and white film) in the tracks $C_{2b}$, $C_{3b}$ in the negative film 242, data at least concerning the aperture value in shooting, the shutter speed, the type of camera, the type of taking lens, the type of filter, whether the flash is used or not, the subject distance, the temperature and humidity in shooting, the barometric pressure in shooting, the altitude in shooting, and the shooting location, and data concerning comments in shooting in the track $C_{0b}$, and the print information (frames to be printed or not, the number of prints, information concerning the type of mount, information concerning the position and the size of framework, information concerning the magnification in printing, character information, voice information, shooting time information, shooting data information and shooting location information) in the track $C_{1b}$.

Figure 68A:
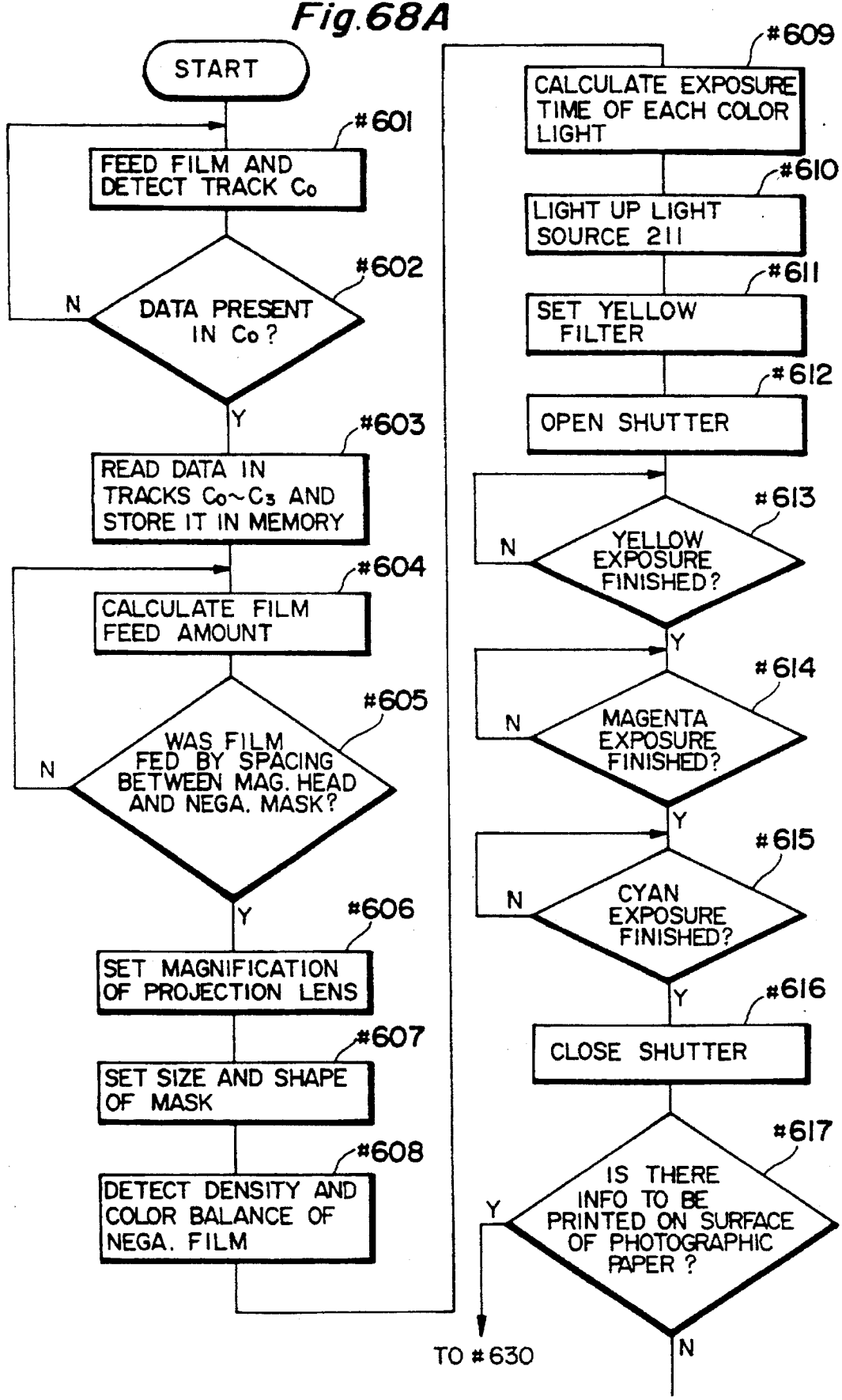

The operation of the control unit in the printer of FIG. 63 is next described with reference to the flowchart in FIG. 68.

[Step 601: #601]

At Step 601 the control unit 223 actuates the unrepresented motor to rotate the paired rollers 243a, 243b; 244a, 244b; and 246a, 246b to feed the negative film 242. In this operation the control unit 223 detects the track $C_{0b}$ in the negative film 242 through the magnetic head 221. Then the control unit 223 proceeds to next Step 602.

[Step 602: #602]

At Step 602 the control unit 223 makes a decision as to if data is present in the track $C_{0b}$. To detect whether data is present or not, the ID code in the track $C_{0b}$ may be used. If there is no data in the track, the control unit 226 proceeds to Step 601. If there is data in the track, the control unit 223 proceeds to Step 603.

[Step 603: #603]

At Step 603 the control unit 223 reads data in the tracks $C_{0b}$ to $C_{3b}$ through the magnetic head 221 and stores it in the memory 237. The data in the tracks $C_{0b}$ to $C_{3b}$ is stored with addresses of respective photographic frames in the memory 237. Then the control unit 223 proceeds to next Step 604.

[Step 604: #604]

At Step 604 the control unit 223 calculates a feed amount of the film 242 based on an output from the encoder mounted to the paired rollers 244a, 244b and 246a, 246b, and then proceeds to Step 605.

[Step 605: #605]

At Step 605 the control unit 223 makes a decision as to if the negative film 242 was fed by a spacing between the magnetic head 221 and the negative mask 245, based on the calculated feed amount of negative film 242. Unless the negative film 242 was fed by the above spacing, the control unit 223 proceeds to Step 604. If the negative film 242 was fed by the above spacing, the control unit 223 proceeds to Step 606.

[Step 606: #606]

At Step 606 the control unit 223 controls the magnification control unit 225, based on the information concerning the magnification in printing in the memory 237, to set the projection lens PL to a selected magnification. Then the control unit 223 proceeds to next Step 607.

[Step 607: #607]

At Step 607 the control unit 223 controls the mask drive unit 226, based on the information concerning the position and the size of framework in the memory 237, to set the size and the shape of opening in the trimming mask 256. Then the control unit 223 proceeds to Step 608.

Here, let us consider a case in which the trimming mask 256 is a liquid crystal light bulb. First, in case the information concerning the position and size of framework in the memory 237 is expressed by a plurality of coordinates as shown in FIGS. 66A and 66B, the control unit 223 divides the liquid crystal light bulb into a plurality of sections. It is preferred in this case that a segmental section corresponds to a pixel in the liquid crystal light bulb. Then the control unit 223 assigns each segmental section an X-directional address and a Y-directional address and thereafter converts the plurality of coordinates indicating the position and the size of framework into X-directional and Y-directional addresses. Then the control unit 223 indicates on the liquid crystal light bulb such a pattern that a light transmission region is within a region surrounded by these addresses and a light shielding region is outside the surrounded region.

Also, in case the information concerning the position and size of framework in the memory 237 is expressed by a plurality of sections as shown in FIG. 66C, the control unit converts the addresses in the information concerning the position and size of framework into addresses each corresponding to a pixel in the liquid crystal light bulb. After that, the control unit 223 indicates on the liquid crystal light bulb such a pattern that a light transmission region is within a region surrounded by the thus converted addresses and a light shielding region is outside the surrounded region.

Further, if the information concerning the position and size of framework in the memory 237 is expressed by the information including the coordinates of the origin of framework $(X_1, Y_1)$, the X-directional size of framework $L_x$ and the Y-directional size of framework $L_y$ as shown in FIG. 66D, the control unit 223 calculates an outline of the framework based on the information. The control unit 223 assigns an address to a section corresponding to a pixel in the liquid crystal light bulb. After that, the control unit 223 indicates on the liquid crystal light bulb such a pattern that a light transmission region is within a region surrounded by addresses corresponding to sections on which the calculated outline of framework is located and a light shielding region is outside the surrounded region.

As described above, the arrangement with the trimming mask 256 being the liquid crystal light bulb permits trimming with a framework having arbitrary shape and size.

[Step 608: #608]

At Step 608 the control unit 223 detects the density and the hue (color balance) of the negative film 242 located in the opening of negative mask 245 by the analyzer 222. Here, the light source 211 stays lit up with a light quantity of Low level, and the analyzer 222 detects transmission light from the light source 211 through the filter box 213 and the diffusion box 214. Then the control unit 223 proceeds to Step 609.

[Step 609: #609]

At Step 609 the control unit 223 determines an exposure time of each color light (exposure time of yellow light, exposure time of magenta light and exposure time of cyan light), based on the density and the hue of the negative film 242 detected by the analyzer 222 and the information concerning the type of film stored in the memory 237. The exposure times of color beams are stored in the memory 237. Then the control unit 223 proceeds to next Step 610.

[Step 610: #610]

At Step 610 the control unit 223 makes the light source 211 light up with a light quantity of Hi level, and then proceeds to Step 611.

[Step 611: #611]

At Step 611 the control unit 223 controls the filter box 213 as to locate the yellow filter in the optical path of filter box 213. Then control unit 223 proceeds to next Step 612.

[Step 612: #612]

At Step 612 the control unit 223 controls the shutter 224 to the open state, and then proceeds to Step 613.

[Step 613: #613]

At Step 613 the control unit 223 compares the exposure time of yellow light stored in the memory 237 with a time passing after the shutter opening. If the time from the shutter opening is shorter than the exposure time of yellow light, this Step 213 is repeated. When the time from the shutter opening becomes equal to the exposure time of yellow light, the control unit proceeds to next Step 614.

[Step 614: #614]

At Step 614 the control unit 223 compares the exposure time of magenta light stored in the memory 237 with a time from the shutter opening. If the time from the shutter opening is shorter than the exposure time of magenta light, this Step 214 is repeated. If the time from the shutter opening becomes equal to the exposure time of magenta light, the control unit proceeds to next Step 615.

[Step 615: #615]

At Step 615 the control unit 223 compares the exposure time of cyan light stored in the memory 237 with a time from the shutter opening. If the time from the shutter opening is shorter than the exposure time of cyan light, this Step 614 is repeated. If the time from the shutter opening becomes equal to the exposure time of cyan light, the control unit proceeds to next Step 616.

[Step 616: #616]

At Step 616 the control unit 223 controls the shutter 224 to the closed state, and then proceeds to Step 617.

[Step 617: #617]

At Step 617 the control unit 223 makes a decision as to if there is information to be printed on the surface of photographic paper (on the emulsion layer surface) in the information based on the character information, the voice information, the shooting time information, the shooting data information and the shooting location information as stored in the memory 237. If there is information to be printed, the control unit 223 proceeds to next Step 618. Unless there is information to be printed on the surface of photographic paper, the control unit 223 proceeds to Step 630.

[Step 618: #618]

At Step 618 the control unit 223 indicates on the liquid crystal light bulb 233 the information based on the character information, the voice information, the shooting time information, the shooting data information and the shooting location information as stored in the memory 237.

For example, let us consider a case in which the character information is indicated. Here, the character information includes character region information indicating a region where characters are to be indicated and information concerning contents of characters. It is assumed in the following description that the character region information is expressed by coordinates of four points and the information concerning contents of characters by JIS codes. The control unit 223 converts the characters expressed by JIS codes into characters composed of a plurality of dots. The plurality of dots are arranged corresponding to pixels in the liquid crystal light bulb 233. Then the control unit 223 arranges the characters converted into the dots in a predetermined region, based on the character region information. This results in indicating the character information by dots corresponding to pixels in the liquid crystal light bulb 233. Finally, the control unit indicates the dot character information on the liquid crystal light bulb 233.

For indicating the voice information, the voice information is first converted into character information and thereafter the character information is indicated on the liquid crystal light bulb 233 similarly as in case of the character information as described above. As for the shooting time information, the shooting data information and the shooting location information, it is indicated on the liquid crystal light bulb 233 similarly as in case of the above character information, based on the information indicating a region Where the information is to be indicated.

Then the control unit 223 proceeds to Step 619.

[Step 619: #619]

At Step 619 the control unit 223 controls the mirror drive unit 236 to move the mirror 235 to the position in the optical path as indicated by the broken line in FIG. 63. Then the control unit proceeds to Step 620.

[Step 620: #620]

At Step 620 the control unit 223 turns on the light source 231 to illuminate the liquid crystal light bulb 233, and then proceeds to next Step 621.

[Step 621: #621]

At Step 621 the control unit 223 makes a decision as to if a lighting time of the light source 231, which is an exposure time of pattern on the photographic paper 252, reaches a predetermined exposure time. If the exposure time of pattern is shorter than the predetermined exposure time, the control unit 223 repeats this Step 621. If the exposure time of pattern becomes equal to the predetermined exposure time, the control unit 223 proceeds to next Step 622. Incidentally, the predetermined exposure time is determined by the photographic speed of photographic paper 252, and the information concerning the predetermined exposure time is preliminarily stored in the memory 237.
[Step 622: #622]
At Step 622 the control unit 223 turns off the light source 231 and then proceeds to next Step 623.
[Step 623: #623]
At Step 623 the control unit 223 controls the mirror drive unit 236 to move the mirror 235 to the position outside the optical path as shown by the solid line in FIG. 63. Then the control unit proceeds to Step 624.
[Step 624: #624]
At Step 624 the control unit 223 makes a decision as to if printing was executed by a number of requested extra prints, based on the extra printing information. Unless the requested extra printing number of prints were made, the control unit 223 proceeds to Step 606. If the requested extra printing number of prints were made, the control unit 223 proceeds to Step 625.
[Step 625: #625]
At Step 625 the control unit 223 actuates the unrepresented motor to rotate the rollers 256, 258 and the paired spools 254a, 254b. This results in feeding the photographic paper 252. Then the control unit 223 proceeds to Step 626.
[Step 626: #626]
At Step 626 the control unit 223 receives an output from the encoder provided for the rollers 253, 258 and the paired spools 254a, 254b to calculate a feed amount of photographic paper 252. The thus calculated feed amount is stored in order in the memory 237. Then control unit proceeds to Step 627.
[Step 627: #627]
At Step 627 the control unit 223 makes a judgement as to if the feed amount of photographic paper 252 reaches a print size. Unless the photographic paper 252 is fed by the print size, the control unit 223 repeats this Step 637. If the feed amount of photographic paper 252 reaches the print size, the control unit 223 proceeds to next Step 628.
[Step 628: #628]
At Step 628 the control unit 223 stops the unrepresented motor to stop the rollers 253, 258 and the paired spools 254a, 254b. Then control unit 223 proceeds to Step 629.
[Step 629: #629]
At Step 629 the control unit 223 makes a judgement as to if there is information to be printed on the back surface of photographic paper in the information based on the character information, the voice information, the shooting time information, the shooting data information and the shooting location information as stored in the memory 237. If there is information to be printed, the control unit 223 proceeds to next Step 630. Unless there is information to be printed on the back surface of photographic paper, the control unit 223 proceeds to Step 631.
[Step 630: #630]
At Step 630 the control unit 223 actuates the printing unit 227 to print the information to be printed on the back surface among the information based on the character information, the voice information, the shooting time information, the shooting data information and the shooting location information as stored in the memory 237. Then the control unit 223 proceeds to next Step 631.
[Step 631: #631]
At Step 631 the control unit 223 actuates the unrepresented motor to rotate the paired rollers 243a, 243b; 244a, 244b; and 246a, 246b to feed the negative film 242. On this occasion, the control unit 223 detects data in the tracks $C_{0b}$–$C_{3b}$ in the negative film 242 through the magnetic head 221 and stores the data in the memory 237 with an address for each photographic frame. Then the control unit 223 proceeds to next Step 632.
[Step 632: #632]
At Step 632 the control unit 223 calculates a feed amount of film 242 based on an output from the encoder set to the paired rollers 244a, 244b and 246a, 246b, and then proceeds to Step 633.
[Step 633: #633]
At Step 633 the control unit 223 makes a decision as to if the negative film 242 was fed by a photographic frame, based on the calculated feed amount of negative film 242. Unless the negative film 242 was fed by a photographic frame, the control unit 223 proceeds to Step 632. If the negative film 242 was fed by the distance of photographic frame, the control unit 223 proceeds to Step 634.
[Step 634: #634]
At Step 634 the control unit 223 makes a decision as to if the magnetic head 221 detects the data in the tracks $C_{0b}$–$C_{3b}$. If the data in the tracks $C_{0b}$–$C_{3b}$ is detected, the control unit proceeds to Step 606. Unless the data is detected, the control unit makes a decision that it is the trailing end portion of the negative film 242, and then finishes the operation.

Although the above-described embodiments are so arranged that the print information concerning the print size and the print number is written in the magnetic layer in film, a modification may be such that the print information is changed into bar codes and the bar codes are printed on a DP envelope. It is preferred in such a modification that the aforementioned photographic print apparatus is arranged with a bar code reader for detecting the bar codes. The printer provided with a bar code reader is described for example in U.S. Pat. No. 5,212,367 and reference should be made to the U.S. patent. Also, in case an IC card is applied as the second medium as described previously, the print information is preferably written in the IC card. In this case, a preferable arrangement is such that an identification code for each order is attached to the film and the control unit 560 stores the print information from the IC card in the internal memory for each order. Then the photographic print apparatus performs printing based on the identification code and the print information stored in the memory.

The above-described embodiments are so arranged that the orderer's information (customer information and reception number) is printed on the DP envelope 40, but another arrangement may be such that the customer information and the reception number are printed on a seal or the like and the printed seal is attached to the DP envelope.

Also, the cartridge 128 is arranged to be put in the DP envelope 40 on which the customer information and the reception number are printed, but the customer information and the reception number may be printed on the cartridge 128 itself. Also, the customer information and the reception number may be printed on a seal or the like so that the seal may be attached to the cartridge 128.

What is claimed is:

1. A camera which records a subject image as an optical image in a silver salt medium layer provided on one surface of a photographic film strip and which also records the subject image as magnetic information in a magnetic layer provided on the other surface of the photographic film strip, comprising:

a first reflector set in an optical path between a taking lens and said photographic film strip to be exposed, for reflecting sad subject image incident thereinto through said taking lens out of the optical path, said first reflector being displaced to move out of the optical path upon exposure;

an optical system for guiding said subject image reflected by said first reflector to a finder;

a shutter curtain set in the optical path between said taking lens and said photographic film strip to be exposed, having a slit for letting part of said subject image incident through said taking lens pass, and being displaced across said optical path, said shutter curtain having a second reflector thereon, and said second reflector reflecting said subject image out of the optical path and moving with movement of the slit during the exposure;

an image pickup element having an image pickup surface for receiving said subject image reflected by said second reflector, for converting said subject image focused on the image pickup surface into electric image data;

feed means for feeding said photographic film strip; and a magnetic head set to face a feed path of said photographic film strip, for writing said image data converted by said image pickup element as the magnetic information in said magnetic layer on said photographic film strip;

wherein said first reflector is located in said optical path until immediately before exposure, while reflecting said subject image toward said optical system;

wherein said first reflector is displaced out of said optical path upon exposure to let said subject image pass, and said second reflector being displaced together with said shutter curtain reflects said subject image toward the image pickup surface of said image pickup element; and wherein said magnetic head writes said image data obtained by said image pickup element in said magnetic layer on the photographic film strip while said feed means is feeding said photographic film strip.

2. A camera according to claim 1, wherein while the shutter curtain is displaced across said optical path, said second reflector successively reflects parts of said subject image out of the optical path, whereby the subject image is scanned on the image pickup surface of said image pickup element.

3. A camera according to claim 1, wherein said image data is written in said magnetic layer as binary data of a bit number determined by a gradient of said image data to be written.

4. A camera according to claim 3, wherein said binary data indicates only a contour of said subject image.

5. A camera according to claim 1, wherein said image pickup element is an area CCD image sensor having a photoelectric conversion area arranged in a two-dimensional manner.

\* \* \* \* \*